United States Patent
Wolrich et al.

(10) Patent No.: US 9,100,184 B2
(45) Date of Patent: Aug. 4, 2015

(54) INSTRUCTIONS PROCESSORS, METHODS, AND SYSTEMS TO PROCESS BLAKE SECURE HASHING ALGORITHM

(75) Inventors: Gilbert M. Wolrich, Framingham, MA (US); Kirk S. Yap, Framingham, MA (US); James D. Guilford, Northborough, MA (US); Vinodh Gopal, Westborough, MA (US); Erdinc Ozturk, Marlborough, MA (US); Sean M. Gulley, Boston, MA (US); Wajdi K. Feghali, Boston, MA (US); Martin G. Dixon, Portland, OR (US)

(73) Assignee: Intel Corporation, Santa Clara, CA (US)

(*) Notice: Subject to any disclaimer, the term of this patent is extended or adjusted under 35 U.S.C. 154(b) by 11 days.

(21) Appl. No.: 13/976,741

(22) PCT Filed: Dec. 22, 2011

(86) PCT No.: PCT/US2011/066898
§ 371 (c)(1),
(2), (4) Date: Sep. 13, 2013

(87) PCT Pub. No.: WO2013/095521
PCT Pub. Date: Jun. 27, 2013

(65) Prior Publication Data
US 2014/0016773 A1 Jan. 16, 2014

(51) Int. Cl.
*H04L 29/00* (2006.01)
*H04L 9/28* (2006.01)
(Continued)

(52) U.S. Cl.
CPC *H04L 9/28* (2013.01); *G06F 21/72* (2013.01); *H04L 9/0643* (2013.01); *H04L 2209/122* (2013.01)

(58) Field of Classification Search
CPC ............................................. H04L 9/32
USPC ................................. 713/169; 380/28
See application file for complete search history.

(56) References Cited

U.S. PATENT DOCUMENTS 8,184,804 B2 * 5/2012 Farrugia et al. ............. 380/28
8,838,997 B2 9/2014 Wolrich et al.
(Continued)

FOREIGN PATENT DOCUMENTS

TW          I264208 B      10/2006
TW         200945847 A     11/2009
WO       2013/095521 A1    6/2013

OTHER PUBLICATIONS

Jean-Philippe Aumasson, Luca Henzen, Willi Meier, Raphael C. W. Phan, 'SHA-3 proposal BLAKE,' version 1.3, Dec. 2010, Available at http://131002.net/blake/blake.pdf, pp. 1-79.
(Continued)

*Primary Examiner* — Brandon Hoffman
*Assistant Examiner* — Michael D Anderson
(74) *Attorney, Agent, or Firm* — Vecchia Patent Agent, LLC

(57) ABSTRACT

A method of an aspect includes receiving an instruction indicating a first source having at least one set of four state matrix data elements, which represent a complete set of four inputs to a G function of a cryptographic hashing algorithm. The algorithm uses a sixteen data element state matrix, and alternates between updating data elements in columns and diagonals. The instruction also indicates a second source having data elements that represent message and constant data. In response to the instruction, a result is stored in a destination indicated by the instruction. The result includes updated state matrix data elements including at least one set of four updated state matrix data elements. Each of the four updated state matrix data elements represents a corresponding one of the four state matrix data elements of the first source, which has been updated by the G function.

22 Claims, 30 Drawing Sheets

(51) Int. Cl.
*H04L 9/06* (2006.01)
*G06F 21/72* (2013.01)

(56) References Cited

U.S. PATENT DOCUMENTS

| | | |
|---|---|---|
| 8,856,546 B2 | 10/2014 | Gueron et al. |
| 8,874,933 B2 | 10/2014 | Wolrich et al. |
| 8,924,741 B2 | 12/2014 | Wolrich et al. |
| 8,954,754 B2 | 2/2015 | Yap et al. |
| 2005/0089160 A1* | 4/2005 | Crispin et al. .......... 380/28 |
| 2010/0250966 A1 | 9/2010 | Olson et al. |
| 2010/0281256 A1 | 11/2010 | Farrugia et al. |
| 2014/0093068 A1 | 4/2014 | Wolrich et al. |
| 2014/0095844 A1 | 4/2014 | Gopal et al. |

OTHER PUBLICATIONS

PCT Search Report, PCT/2011/066898, Intel Corporation, Mail date Sep. 21, 2012, 10 pages.

Jean-Philippe Aumasson, et al., SHA-3 proposal Blake, Dec. 16, 2010, version 1.3, NIST, Gaithersburg, MD.

International Preliminary Report on Patentability with Written Opinion received for PCT Application No. PCT/US2011/066898, mailed on Jul. 3, 2014.

Office Action received for Taiwan Patent Application No. 101145905, mailed on Jan. 29, 2015, 1 Page of Search Report and 4 pages of Taiwan Office Action.

* cited by examiner

BLAKE HASHING
ALGORITHM
STATE MATRIX
104

$$\begin{vmatrix} V_0 & V_1 & V_2 & V_3 \\ V_4 & V_5 & V_6 & V_7 \\ V_8 & V_9 & V_{10} & V_{11} \\ V_{12} & V_{13} & V_{14} & V_{15} \end{vmatrix}$$

FIG. 2
*PRIOR ART*

ROUND OF
BLAKE
302

| COLUMN STEP<br>305 | DIAGONAL STEP<br>306 |
|---|---|
| $G_0(V_0, V_4, V_8, V_{12})$ | $G_4(V_0, V_5, V_{10}, V_{15})$ |
| $G_1(V_1, V_5, V_9, V_{13})$ | $G_5(V_1, V_6, V_{11}, V_{12})$ |
| $G_2(V_2, V_6, V_{10}, V_{14})$ | $G_6(V_2, V_7, V_8, V_{13})$ |
| $G_3(V_3, V_7, V_{11}, V_{15})$ | $G_7(V_3, V_4, V_9, V_{14})$ |

627 — RECEIVE INSTRUCTION INDICATING FIRST SOURCE HAVING PACKED STATE MATRIX DATA ELEMENTS INCLUDING AT LEAST ONE SET OF FOUR STATE MATRIX DATA ELEMENTS THAT REPRESENT COMPLETE SET OF FOUR INPUTS TO G FUNCTION OF CRYPTOGRAPHIC HASHING ALGORITHM, CRYPTOGRAPHIC HASHING ALGORITHM USING STATE MATRIX HAVING SIXTEEN STATE MATRIX DATA ELEMENTS AND ALTERNATING BETWEEN UPDATING STATE MATRIX DATA ELEMENTS IN COLUMNS AND DIAGONALS, INSTRUCTION ALSO INDICATING SECOND SOURCE HAVING PACKED DATA ELEMENTS THAT REPRESENT MESSAGE AND CONSTANT DATA

628 — STORE RESULT IN DESTINATION INDICATED BY INSTRUCTION IN RESPONSE TO INSTRUCTION, RESULT HAVING PACKED UPDATED STATE MATRIX DATA ELEMENTS INCLUDING AT LEAST ONE SET OF FOUR UPDATED STATE MATRIX DATA ELEMENTS, EACH OF FOUR UPDATED STATE MATRIX DATA ELEMENTS IN ONE SET REPRESENTING A CORRESPONDING ONE OF FOUR STATE MATRIX DATA ELEMENTS IN ONE SET OF FIRST SOURCE THAT HAS BEEN UPDATED BY G FUNCTION

FIG. 16

BLAKE 256/224 G FUNCTION OPERATIONS 1633

$$a \leftarrow a + b + (m_{\sigma_r(2i)} \oplus c_{\sigma_r(2i+1)})$$
$$d \leftarrow (d \oplus a) \ggg 16$$
$$c \leftarrow c + d$$
$$b \leftarrow (b \oplus c) \ggg 12$$
$$a \leftarrow a + b + (m_{\sigma_r(2i+1)} \oplus c_{\sigma_r(2i)})$$
$$d \leftarrow (d \oplus a) \ggg 8$$
$$c \leftarrow c + d$$
$$b \leftarrow (b \oplus c) \ggg 7$$

$\oplus$ = Boolean exclusive OR (XOR)

$\ggg k$ = rotation of k bits toward less significant bits $\lll k$ = rotation of k bits toward more significant bits ⊞ = addition modulo $2^{32}$

FIG. 17

BLAKE 512/384 G FUNCTION OPERATIONS 1733

$a \leftarrow a + b + (m_{\sigma_r(2i)} \oplus c_{\sigma_r(2i+1)})$ $d \leftarrow (d \oplus a) \ggg 32$ $c \leftarrow c + d$ $b \leftarrow (b \oplus c) \ggg 25$ $a \leftarrow a + b + (m_{\sigma_r(2i+1)} \oplus c_{\sigma_r(2i)})$ $d \leftarrow (d \oplus a) \ggg 16$ $c \leftarrow c + d$ $b \leftarrow (b \oplus c) \ggg 11$

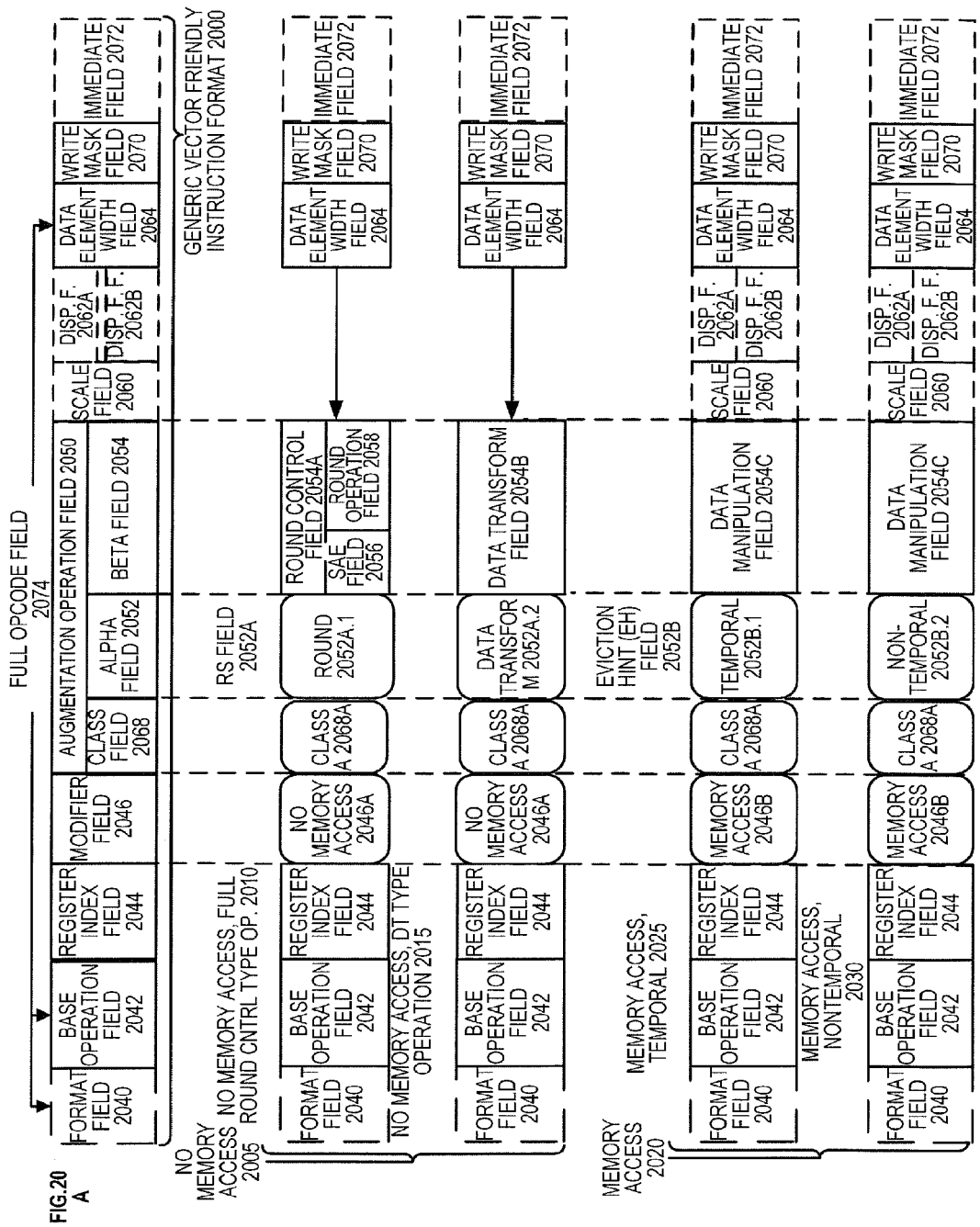

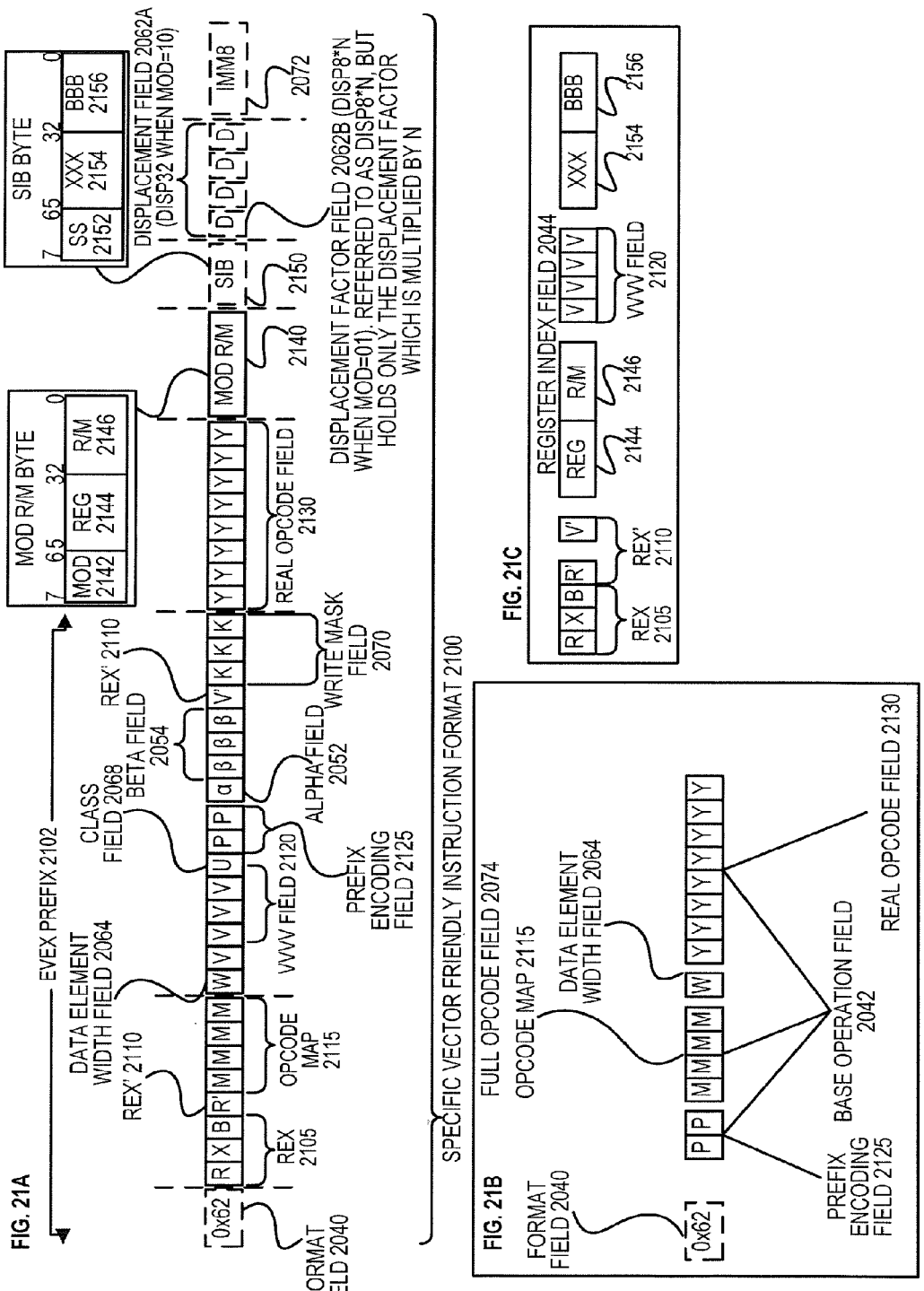

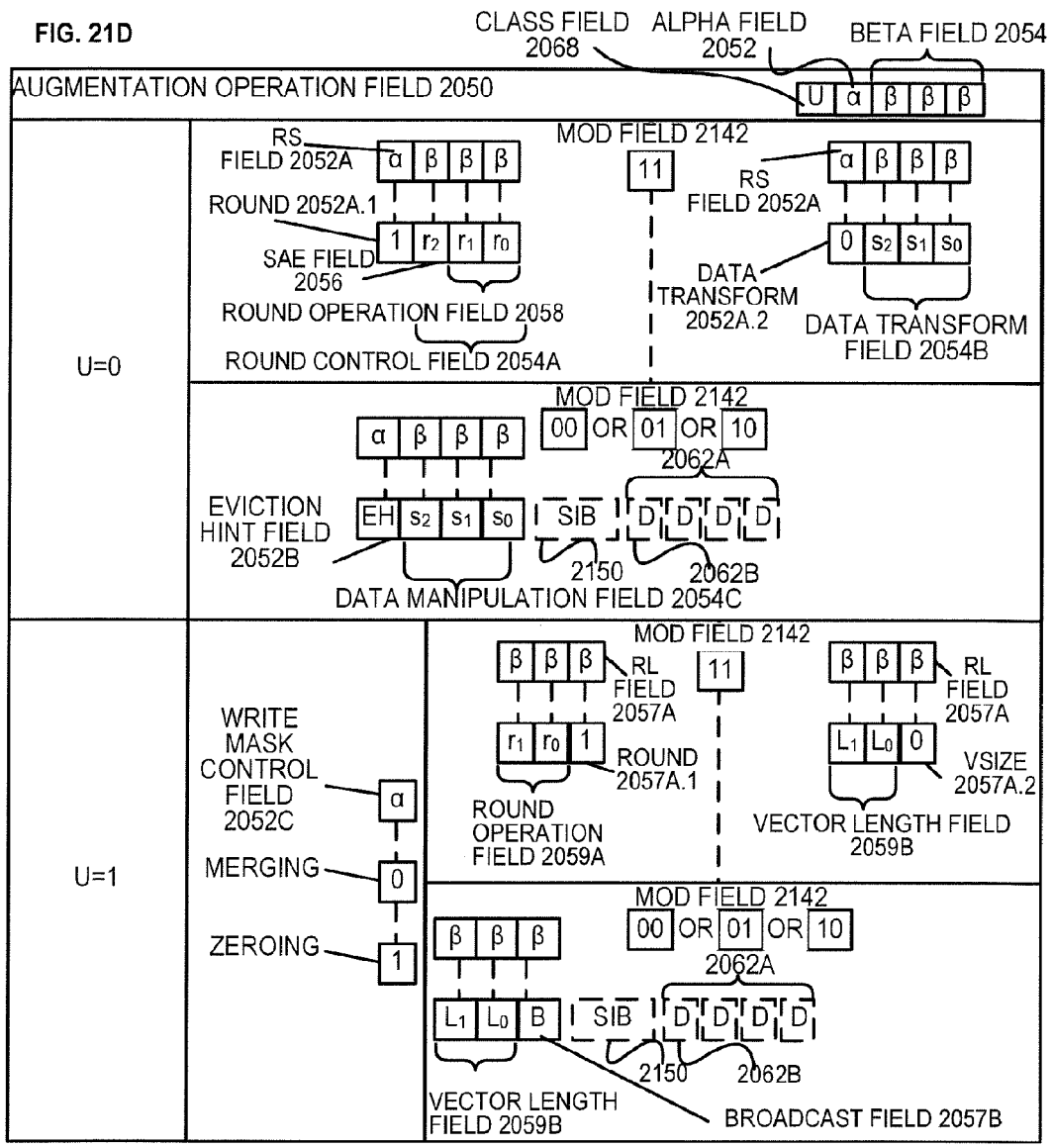

FIG. 22
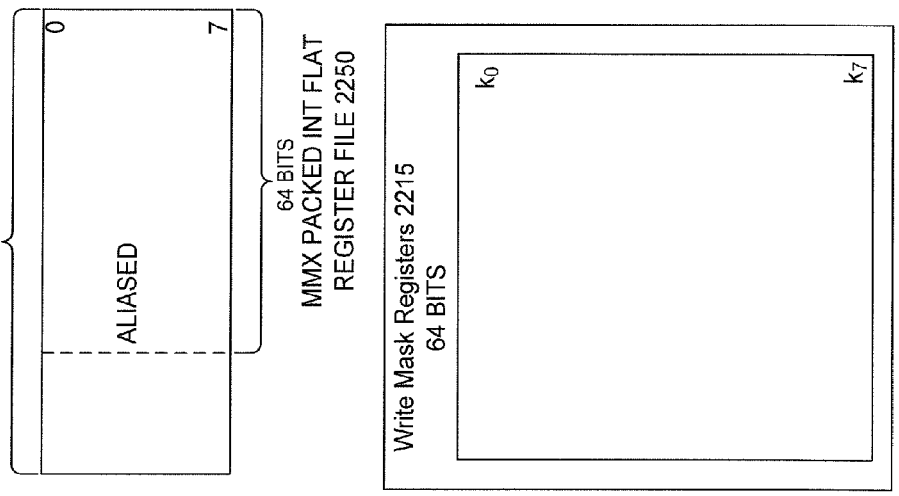
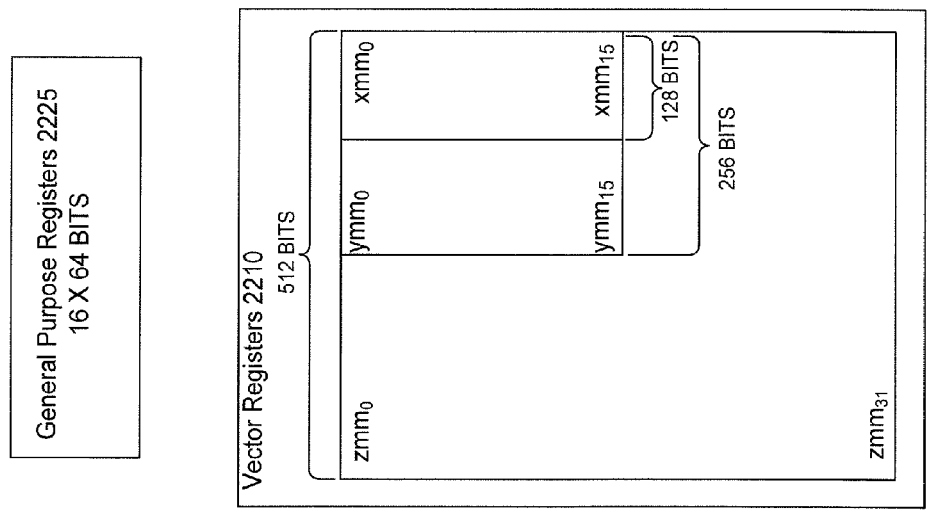

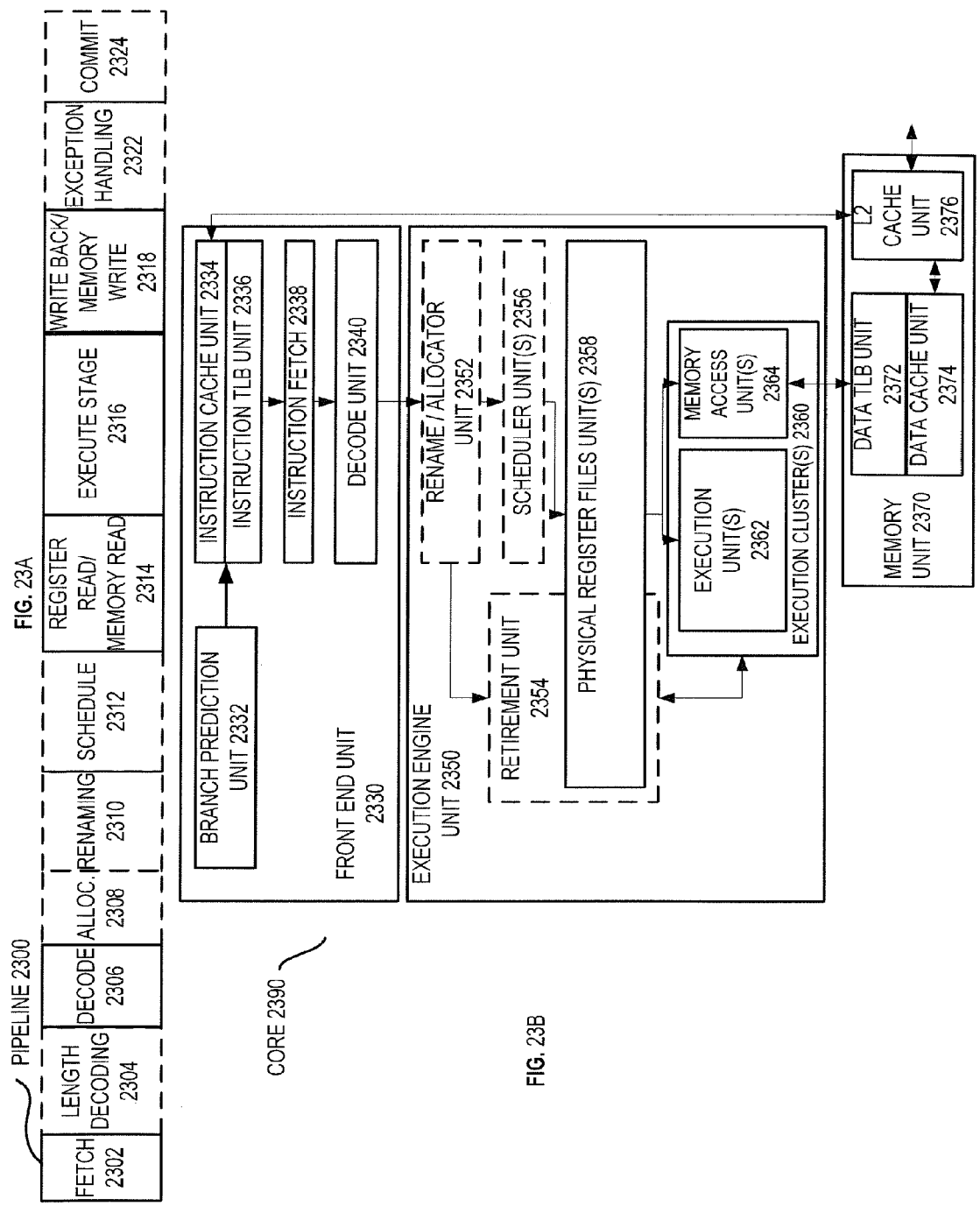

though this is an implementation choice. In the finalization stage 103, the intermediate hash is finally compressed to return the next chain value. The last chain value representing the final hash.
INSTRUCTIONS PROCESSORS, METHODS, AND SYSTEMS TO PROCESS BLAKE SECURE HASHING ALGORITHM

CROSS-REFERENCE TO RELATED APPLICATION

This patent application is a U.S. National Phase Application under 35 U.S.C. §371 of International Application No. PCT/US2011/066898, filed Dec. 22, 2011, entitled INSTRUCTIONS PROCESSORS, METHODS, AND SYSTEMS TO PROCESS BLAKE SECURE HASHING ALGORITHM.

BACKGROUND

1. Field

Embodiments relate to processors. In particular, embodiments relate to processors to execute instructions to process the BLAKE secure hashing algorithm.

2. Background Information

Cryptographic hash functions are widely used in electronic devices. A message or input data may be input to the cryptographic hash function, the message or input data may be processed, and a cryptographic hash may be output. The cryptographic hash is sometimes referred to as a message digest, a digest, or a hash. The cryptographic hash functions generally are such that a change to the input data will also change the output hash. Cryptographic hash functions are commonly used for security, authentication, verification, or identification. Examples of particular applications of cryptographic hash functions include, but are not limited to, use in generating digital signatures, message authentication codes, verifying the integrity of files or messages, identifying files or data, and pseudorandom generation and key derivation.

BLAKE is a family of hash functions or algorithms that are among five finalists to be selected for SHA-3 by the National Institute of Standards and Technology (NIST). BLAKE is described in SHA-3 proposal BLAKE, by Jean-Jean-Philippe Aumasson et al., version 1.3, Dec. 16, 2010. BLAKE includes four hash functions known as BLAKE-224, BLAKE-256, BLAKE-384, and BLAKE-512. BLAKE-256 is a 32-bit version of the algorithm. BLAKE-224 is derived from BLAKE-256 using different initial values, different padding, and truncating the output or digest from 256-bits to 224-bits. BLAKE-512 is a 64-bit version of the algorithm. BLAKE-384 is derived from BLAKE-512 using different initial values, different padding, and truncating the digest from 512-bits to 384-bits. Table 1 lists properties of the four BLAKE hash functions.

TABLE 1

| Hash Function | Word Size | Salt Size | Message Size | Block | Digest |
|---|---|---|---|---|---|
| BLAKE-224 | 32 | 128 | 512 | $<2^{64}$ | 224 |
| BLAKE-256 | 32 | 128 | 512 | $<2^{64}$ | 256 |
| BLAKE-384 | 64 | 256 | 1024 | $<2^{128}$ | 384 |
| BLAKE-512 | 64 | 256 | 1024 | $<2^{128}$ | 512 |

FIG. 1 is a block diagram illustrating the construction of the BLAKE secure hashing algorithm 100. The construction is that of a local wide-pipe and includes an initialization stage 101, followed by a number of rounds 102, followed by a finalization stage 103. The iteration mode of BLAKE is HAIFA. Its compression function depends on an optional salt and a counter representing the number of bits hashed so far. In the initialization stage, an inner state is initialized from an initial chain value, an optional salt, a counter, and constants. Following the initialization stage, a number of message-dependent rounds are employed and a different message representing the data to be hashed is introduced into each of the rounds. In the illustration, a first round 102-1 receives a first message, a second round 10202 receives a second message, and an $N^{th}$ round 102-N receives an $N^{th}$ message. BLAKE permits a variable number of rounds. Often, at least ten or more rounds are recommended, although this is an implementation choice. In the finalization stage 103, the intermediate hash is finally compressed to return the next chain value. The last chain value representing the final hash.

FIG. 2 illustrates a BLAKE hashing algorithm state matrix 104. The state matrix is used during the rounds of the BLAKE hashing algorithm. The state matrix includes a four row-by-four column (4×4) matrix of state words. These state words are labeled from left-to-right and top-to-bottom as v0-v15. In BLAKE-224 and BLAKE-256 each of these words is 32-bits. In BLAKE-384 and BLAKE-512 each of these words is 64-bits.

FIG. 3 is a block diagram illustrating that a round 302 of the BLAKE secure hashing algorithm includes a column step 305 followed by a diagonal step 306. The term "step" is used in the BLAKE SHA-3 proposal, and is used herein for consistency, rather than to imply a "step for performing" interpretation. In the column step, all four columns are updated by application of a BLAKE compression G function. The BLAKE compression G function will be referred to herein simply as the G function. The G function takes four input state words (i.e., a, b, c, d), as in the expression G(a, b, c, d), and produces four corresponding output updated state words (i.e., a', b', c', d').

In a given round of BLAKE, the column step involves four instances of the G function ($G_0$-$G_3$), each evaluated with state words from a different one of the four columns of the state matrix. $G_0$ is evaluated with $v_0$, $v_4$, $v_8$, and $v_{12}$. $G_1$ is evaluated with $v_1$, $v_5$, $v_9$, and $v_{13}$. $G_2$ is evaluated with $v_2$, $v_6$, $v_{10}$, and $v_{14}$. $G_3$ is evaluated with $v_3$, $v_7$, $v_{11}$, and $v_{15}$. The subsequent diagonal step of the same round involves an additional four instances of the G function ($G_4$-$G_7$) each evaluated with state words from a different one of four (in some cases disjoint) "diagonals" of the state matrix. The state matrix used by the diagonal step is the updated state matrix resulting from the column step. $G_4$ is evaluated with $v_0$, $v_5$, $v_{10}$, and $v_{15}$. $G_5$ is evaluated with $v_1$, $v_6$, $v_{11}$, and $v_{12}$. $G_6$ is evaluated with $v_2$, $v_7$, $v_8$, and $v_{13}$. $G_7$ is evaluated with $v_3$, $v_4$, $v_9$, and $v_{14}$. The algorithm iterates between column steps and diagonal steps for as many rounds as are used in the particular implementation. Each of these G functions involves a number of instructions.

BRIEF DESCRIPTION OF THE SEVERAL VIEWS OF THE DRAWINGS

The invention may best be understood by referring to the following description and accompanying drawings that are used to illustrate embodiments. In the drawings:

FIG. 2 illustrates a BLAKE hashing algorithm state matrix.

FIG. 3 is a block diagram illustrating that a round of the BLAKE secure hashing algorithm includes a column step followed by a diagonal step.

FIG. 6 is a block flow diagram of an embodiment of a method of processing an embodiment of an instruction useful for processing the BLAKE secure hashing algorithm.

FIG. 16 illustrates the BLAKE-256/224 G function operations.

FIG. 17 illustrates the BLAKE-512/384 G function operations.

FIG. 20A is a block diagram illustrating a generic vector friendly instruction format and class A instruction templates thereof according to embodiments of the invention.

FIG. 21A is a block diagram illustrating an exemplary specific vector friendly instruction format according to embodiments of the invention.

FIG. 21B is a block diagram illustrating the fields of the specific vector friendly instruction format that make up the full opcode field according to one embodiment of the invention.

FIG. 21C is a block diagram illustrating the fields of the specific vector friendly instruction format that make up the register index field according to one embodiment of the invention.

FIG. 21D is a block diagram illustrating the fields of the specific vector friendly instruction format that make up the augmentation operation field according to one embodiment of the invention.

FIG. 22 is a block diagram of a register architecture according to one embodiment of the invention.

FIG. 23A is a block diagram illustrating both an exemplary in-order pipeline and an exemplary register renaming, out-of-order issue/execution pipeline according to embodiments of the invention.

FIG. 23B shows processor core including a front end unit coupled to an execution engine unit, and both are coupled to a memory unit.

DETAILED DESCRIPTION

Disclosed herein are instructions that are useful to implement the BLAKE secure hashing algorithm, processors to execute the instructions, methods performed by the processors when processing or executing the instructions, and systems incorporating one or more processors to process or execute the instructions. In the following description, numerous specific details are set forth (e.g., specific processor configurations, sequences of operations, instruction formats, data formats, data arrangements within registers, execution logic, microarchitectural details, etc.). However, embodiments may be practiced without these specific details. In other instances, well-known circuits, structures and techniques have not been shown in detail to avoid obscuring the understanding of the description.

The instructions disclosed herein help to improve the efficiency and/or speed of implementing the BLAKE secure hashing algorithm. BLAKE tends to be computationally intensive and to take a significant amount of time to implement through conventional approaches. Conventionally, many instructions are used to implement BLAKE. As discussed above, BLAKE typically involves many implementations of the G function (e.g., eight G functions per round and commonly at least ten or more rounds). Moreover, conventionally several or many instructions are needed to implement each instance of the G function. For example, separate instructions may be used to perform each exclusive or (xor), addition, and rotation within the G function. The G function involves a number of operations, some of which have data dependencies on other operations (e.g., one operation cannot begin until another operation finishes), which tend to limit the amount of parallelism that can be exploited. Many of these instructions need to access source data and writing back results. Significant overhead may be incurred just in getting data into and out of the execution logic. Furthermore, many data rearrangement operations are commonly needed in conventional implementations. For example, state data word rearrangement operations are generally needed to rearrange the order of the state data words in a result of one G function (e.g., in a column step) so that they are appropriate as input to a subsequent G function (e.g., in a diagonal step). In other words, there is a large overhead cost in moving state matrix data elements around when switching between column and diagonal portions of a round. The instructions disclosed herein help to improve the efficiency and/or speed of implementing the BLAKE secure hashing algorithm.

Figure 1:
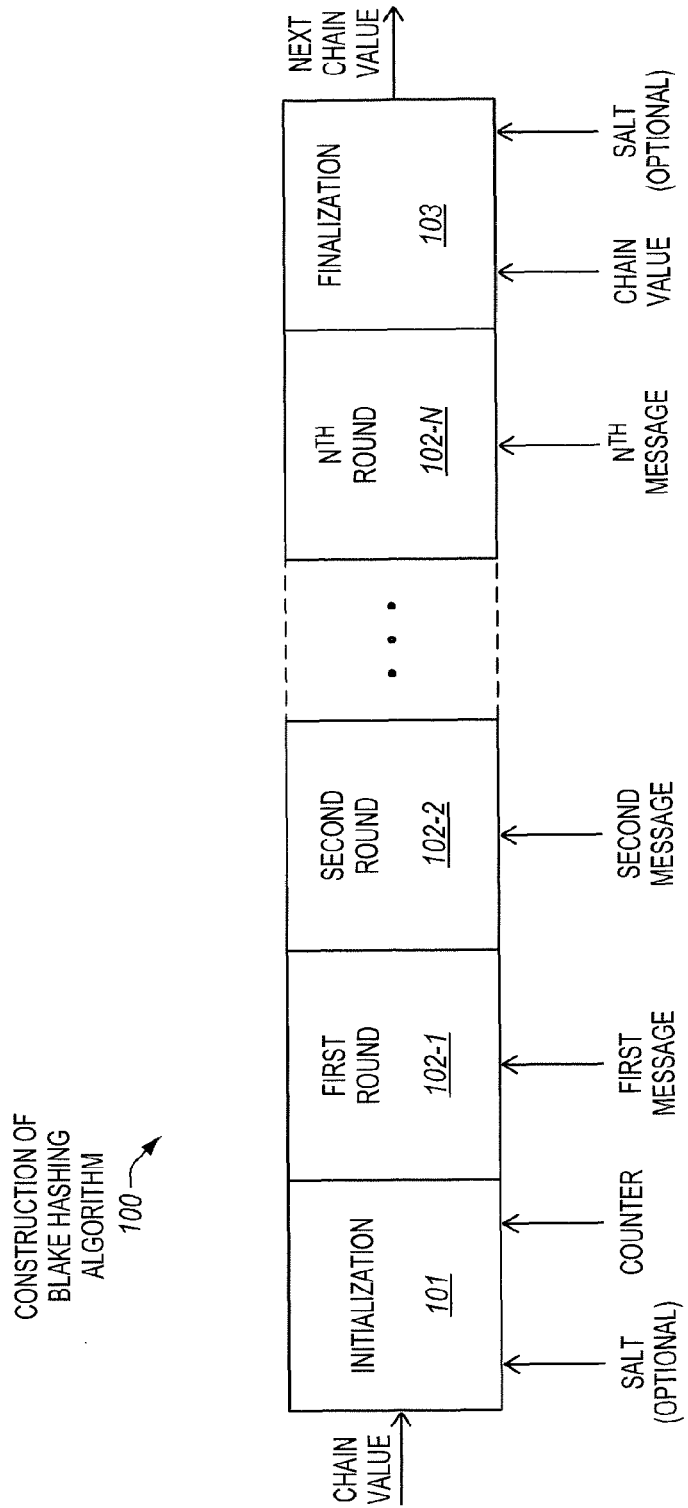
FIG. 1 is a block diagram illustrating the construction of the BLAKE secure hashing algorithm.
Figure 4:
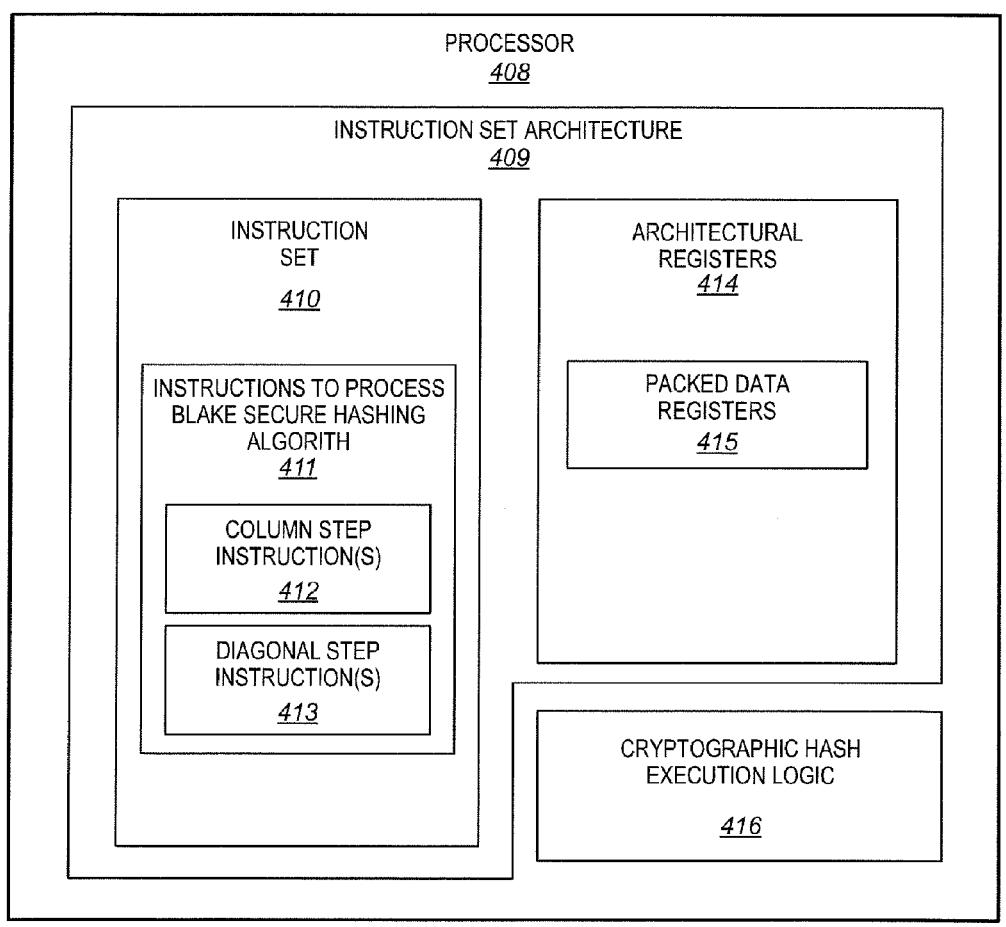
FIG. 4 is a block diagram of an embodiment of a processor having an instruction set that includes one or more instructions that are useful to implement the BLAKE secure hashing algorithm.

FIG. 4 is a block diagram of an example embodiment of a processor 408 having an instruction set 410 that includes one or more instructions 411 that are useful to implement the BLAKE secure hashing algorithm. The processor may be any of various complex instruction set computing (CISC) processors, various reduced instruction set computing (RISC) processors, various very long instruction word (VLIW) processors, various hybrids thereof, or other types of processors entirely. In some embodiments, the processor may be a general-purpose processor (e.g., a general-purpose microprocessor of the type used in desktop, laptop, and like computers). Alternatively, the processor may be a special-purpose processor. Examples of suitable special-purpose processors include, but are not limited to, network processors, communications processors, cryptographic processors, graphics processors, co-processors, embedded processors, digital signal processors (DSPs), and controllers (e.g., microcontrollers), to name just a few examples.

The processor has an instruction set architecture (ISA) 409. The ISA represents a part of the architecture of the processor related to programming and commonly includes the native instructions, architectural registers, data types, addressing modes, memory architecture, interrupt and exception handling, and external input and output (I/O) of the processor. The ISA is distinguished from the microarchitecture, which generally represents the particular processor design techniques selected to implement the ISA. Processors with different microarchitectures may share a common ISA.

The ISA includes an instruction set 410. The instructions of the instruction set represent macroinstructions (e.g., instructions provided to the processor for execution), as opposed to microinstructions or micro-ops (e.g., those which result from a decoder of the processor decoding macroinstructions). The instruction set includes one or more instructions 411 that are each useful to process the BLAKE secure hashing algorithm. In some embodiments, these may include one or more column step instructions 412 to implement column step and/or one or more diagonal step instructions 413 to implement a diagonal step.

The ISA also includes architecturally-visible registers (e.g., an architectural register file) 414. The architectural registers generally represent on-die processor storage locations. The architectural registers may also be referred to herein simply as registers. The phrases architectural register, register file, and register are used herein to refer to registers that are visible to the software and/or programmer (e.g., software-visible) and/or the registers that are specified by macroinstructions to identify operands. These registers are contrasted to other non-architectural or non-architecturally visible registers in a given microarchitecture (e.g., temporary registers used by instructions, reorder buffers, retirement registers, etc.). The illustrated architectural registers include packed data registers 415. Each of the packed data registers is operable to store packed data, vector data, or SIMD data. The cryptographic hash instructions to process the BLAKE secure hashing algorithm 411 may access source data from, and store result data in, the packed data registers.

The processor also includes cryptographic hash execution logic 416. The cryptographic hash execution logic is operable to execute or process the instructions 411. The processor also typically includes other instructions and other execution logic which are not shown to avoid obscuring the description.

Figure 5:
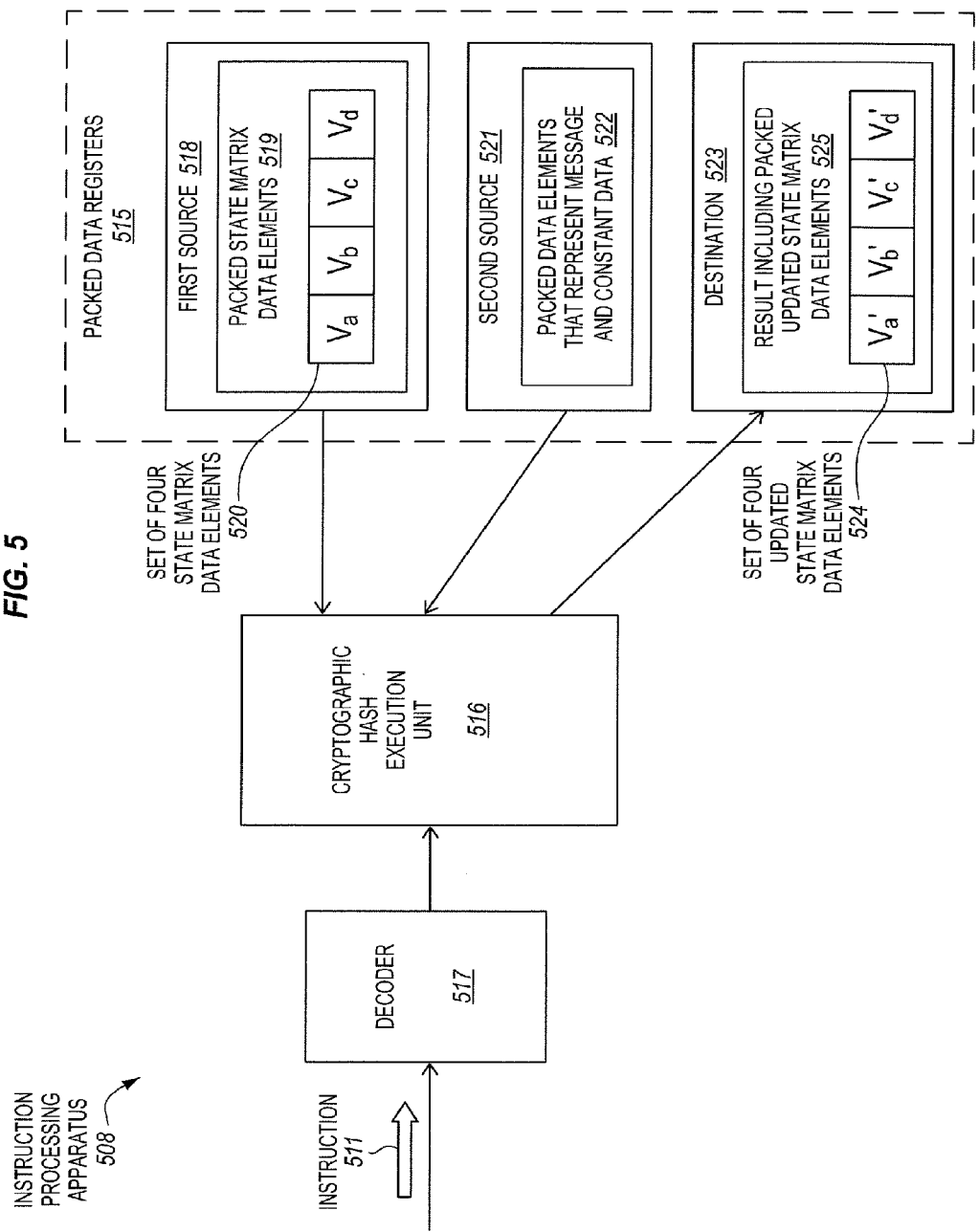
FIG. 5 is a block diagram of an embodiment of an instruction processing apparatus having a cryptographic hash execution unit that is operable to execute instructions including an embodiment of an instruction that is useful to process the BLAKE secure hashing algorithm.

FIG. 5 is a block diagram of an example embodiment of an instruction processing apparatus 508 having a cryptographic hash execution unit 516 that is operable to execute instructions including an example embodiment of an instruction 511 that is useful to process the BLAKE secure hashing algorithm. In some embodiments, the instruction processing apparatus may be a processor and/or may be included in a processor. For example, in some embodiments, the instruction processing apparatus may be, or may be included in, the processor 408 of FIG. 4, or one similar. Alternatively, the instruction processing apparatus may be included in a different processor or electronic device.

The instruction processing apparatus 508 may receive the instruction 511. For example, the instruction may be received from an instruction fetch unit, an instruction queue, or a memory. The instruction may represent a machine instruction, macroinstruction, or control signal that is recognized by the instruction processing apparatus and that controls the apparatus to perform a particular operation. The instruction may explicitly specify (e.g., through bits or one or more fields) or otherwise indicate (e.g., implicitly indicate) a first source 518 having packed state matrix data elements 519 including at least one set of four state matrix data elements 520 (shown as Va, Vb, Vc, and Vd) that represent a complete set of four inputs to a G function of a cryptographic hashing algorithm. The instruction also explicitly specifies or otherwise indicates a second source 521 having packed data elements that represent message and constant data 522. The instruction also explicitly specifies or otherwise indicates a destination 523 (e.g., a destination storage location) where a result 525 is to be stored.

The illustrated instruction processing apparatus includes an instruction decode unit or decoder 517. The decoder may receive and decode higher-level machine instructions or macroinstructions, and output one or more lower-level micro-operations, micro-code entry points, microinstructions, or other lower-level instructions or control signals that reflect and/or are derived from the original higher-level instruction. The one or more lower-level instructions or control signals may implement the operation of the higher-level instruction through one or more lower-level (e.g., circuit-level or hardware-level) operations. The decoder may be implemented using various different mechanisms including, but not limited to, microcode read only memories (ROMs), look-up tables, hardware implementations, programmable logic arrays (PLAs), and other mechanisms used to implement decoders known in the art.

In other embodiments, instead of having the decoder 517, an instruction emulator, translator, morpher, interpreter, or other instruction conversion logic may be used. Various different types of instruction conversion logic are known in the arts and may be implemented in software, hardware, firmware, or a combination thereof. The instruction conversion logic may receive the instruction, emulate, translate, morph, interpret, or otherwise convert the received instruction into one or more corresponding derived instructions or control signals. In still other embodiments, both instruction conversion logic and a decoder may be used. For example, the apparatus may have instruction conversion logic to convert the received instruction into one or more intermediate instructions, and a decoder to decode the one or more intermediate instructions into one or more lower-level instructions or control signals executable by native hardware of the instruction processing apparatus. Some or all of the instruction conversion logic may be located off-die from the rest of the instruction processing apparatus, such as on a separate die or in an off-die memory.

The instruction processing apparatus also includes a set of packed data registers 515. The packed data registers may represent architectural on-processor (e.g., on-die) processor storage locations each operable to store packed data or vector data. The packed data registers may be implemented in different ways in different microarchitectures using well-known techniques, and are not limited to any particular type of circuit. Various different types of registers are suitable as long as they are capable of storing and providing data as described herein. Examples of suitable types of registers include, but are not limited to, dedicated physical registers, dynamically allocated physical registers using register renaming, and combinations thereof. As shown, in some embodiments, the first source 518, the second source 521, and the destination 523, may each be one of the packed data registers. Alternatively, memory locations or other storage locations suitable may be used.

The cryptographic hash execution unit 516 is coupled with the packed data registers 515 and with the decoder 517. The execution unit may receive from the decoder one or more micro-operations, micro-code entry points, microinstructions, other instructions, or other control signals, which reflect, or are derived from, the instruction 511. As previously mentioned, the instruction may specify or otherwise indicate the first source 518 having the packed state matrix data elements 519 including at least the one set of the four state matrix data elements 520 that represent a complete set of four inputs to a G function of a cryptographic hashing algorithm. The instruction may also specify or otherwise indicate a second source 521 having packed data elements that represent message and constant data 522.

The execution unit is operable, in response to and/or as a result of the instruction 511 to store a result 525 including packed updated state matrix data elements in the destination 523 specified or otherwise indicated by the instruction. The result may include at least one set of four updated state matrix data elements 524. Each of the four updated state matrix data elements in the one set may represent a corresponding one of the four state matrix data elements in the one set 520 of the first source that has been updated by the G function. The G function represents the hashing function used in the BLAKE algorithm and includes addition, rotation, and xor operations. The cryptographic hashing algorithm may be one that utilizes a state matrix having sixteen state matrix data elements and may alternate between updating state matrix data elements in columns and diagonals of the state matrix (e.g., the cryptographic hashing algorithm may be the BLAKE secure hashing algorithm). The cryptographic hash execution unit and/or the apparatus may include specific or particular logic (e.g., circuitry or other hardware potentially combined with software and/or firmware) operable to execute and/or process the instruction, and store the result in response to the instruction (e.g., in response to one or more microinstructions or other control signals derived from the instruction).

Advantageously, a single instruction is used to implement the entire G-function performed on a set of four state matrix data elements (e.g., representing a given column or diagonal). This may help to significantly improve the efficiency and/or speed of implementing the BLAKE secure hashing algorithm. As discussed above, BLAKE typically involves many implementations of the G function (e.g., eight G functions per round and commonly at least ten or more rounds). Without the instructions disclosed herein, several or many instructions are needed to implement each instance of the G function. This compounded with the many instances of the G function leads to a large number of instructions being executed, and slow performance, without the instructions disclosed herein. However, embodiments of the instructions disclosed herein allow the data for a G function, or for two or four G functions, to be brought in all at once, performing all of the operations on the G function, and then writing the data back once after all of the G-function operations have been performed (i.e., one retrieve from the register and one store back to the register) tends to significantly reduce the overall amount of time.

To avoid obscuring the description, a relatively simple instruction processing apparatus 508 has been shown and described. In other embodiments, the instruction processing apparatus may optionally include other well-known components, such as, for example, an instruction fetch unit, an instruction scheduling unit, a branch prediction unit, instruction and data caches, instruction and data translation lookaside buffers, prefetch buffers, microinstruction queues, microinstruction sequencers, bus interface units, second or higher level caches, a retirement unit, a register renaming unit, other components included in general-purpose and/or special-purpose processors, and various combinations thereof. Embodiments may have multiple cores, logical processors, or execution engines. A cryptographic hash execution unit operable to execute an embodiment of an instruction disclosed herein may be included in at least one of the cores, logical processors, or execution engines. There are literally numerous different combinations and configurations of components in processors, and embodiments are not limited to any particular combination or configuration.

FIG. 6 is a block flow diagram of an example embodiment of a method 626 of processing an example embodiment of an instruction useful for processing the BLAKE secure hashing algorithm. In various embodiments, the method may be performed by a general-purpose processor, a special-purpose processor (e.g., a graphics processor or a digital signal processor), or another type of digital logic device or instruction processing apparatus. In some embodiments, the method 626 may be performed by the processor 408 of FIG. 4, or the instruction processing apparatus 508 of FIG. 5, or a similar processor or instruction processing apparatus. Alternatively, the method 626 may be performed by different embodiments of processors or instruction processing apparatus. Moreover, the processor 408, and the instruction processing apparatus 508, may perform embodiments of operations and methods either the same as, similar to, or different than those of the method 626.

The method includes receiving the instruction, at block 627. In various aspects, the instruction may be received at a processor, an instruction processing apparatus, or a portion thereof (e.g., a decoder, instruction converter, etc.). In various aspects, the instruction may be received from an off-processor source (e.g., from a main memory, a disc, or a bus or interconnect), or from an on-processor source (e.g., from an instruction cache).

The instruction specifies or otherwise indicates a first source having packed state matrix data elements. The packed state matrix data elements include at least one set of four state matrix data elements that represent a complete set of four inputs to a G function of a cryptographic hashing algorithm (e.g., the BLAKE secure hashing algorithm). As mentioned above, the BLAKE secure hashing algorithm uses a state matrix having sixteen state matrix data elements and alternates between updating state matrix data elements in columns and diagonals of the state matrix. The instruction also specifies or otherwise indicates a second source having packed data elements that represent message and constant data.

Then, a result is stored in the destination that is specified or otherwise indicated by the instruction in response to, as a result of, and/or as specified by the instruction, at block 628. The result has packed updated state matrix data elements including at least one set of four updated state matrix data elements. Each of the four updated state matrix data elements in the one set represent a corresponding one of the four state matrix data elements in the one set of the first source that has been updated by the G function. By way of example, an execution unit, instruction processing apparatus, or processor may perform the operation specified by the instruction and store the result.

The illustrated method includes operations that are visible from outside a processor or instruction processing apparatus (e.g., visible from a software perspective). In other embodiments, the method may optionally include one or more operations occurring internally within the processor. By way of example, the instructions may be fetched, and then decoded, translated, emulated, or otherwise converted, into one or more other instructions or control signals. The source operands may be accessed and/or received. An execution unit may be enabled to perform the operation specified by the instruction, and may perform the operation (e.g., microarchitectural operations to implement the operations of the instructions may be performed). Different microarchitectural ways of performing the operation are contemplated.

Figure 7:
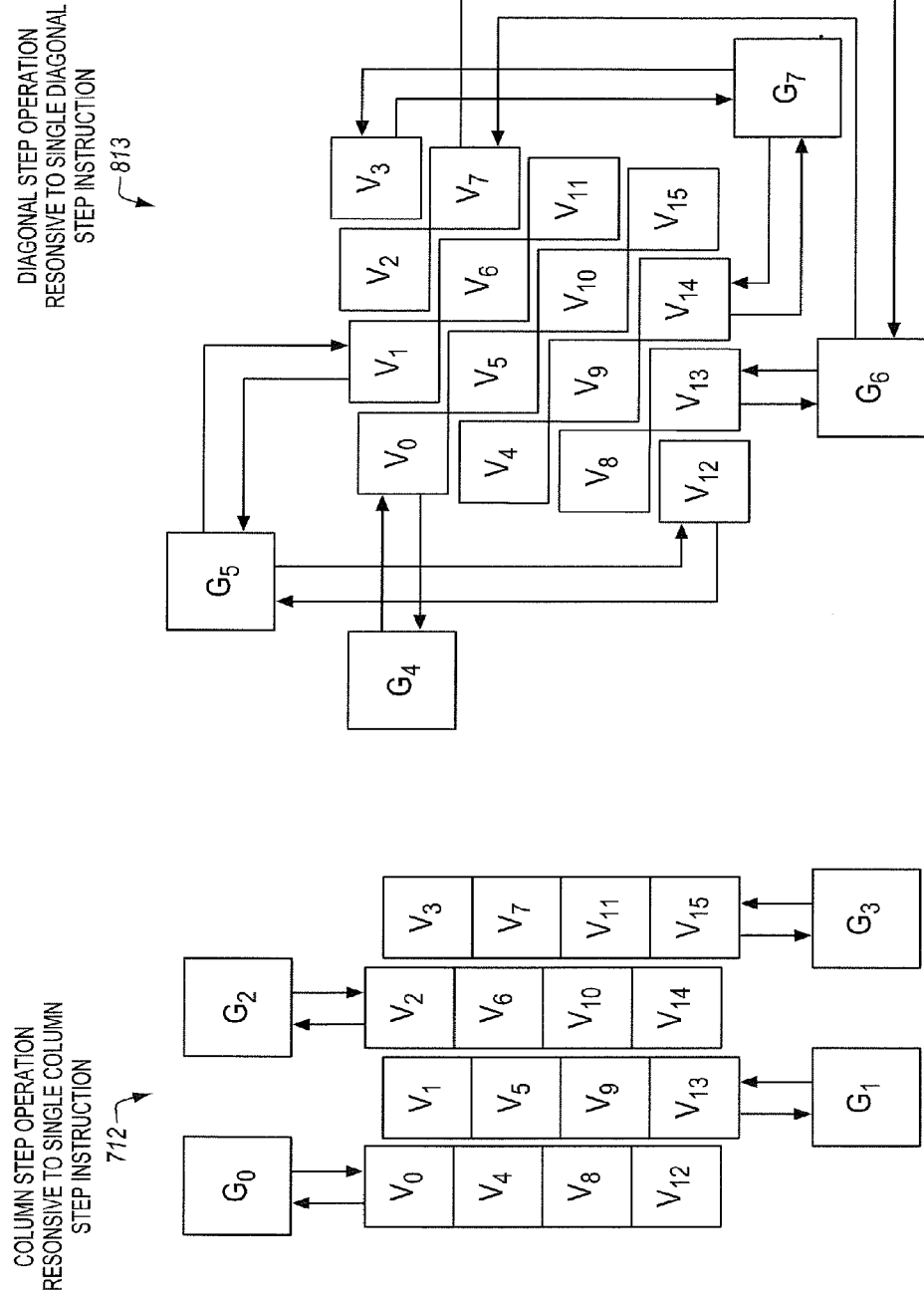
FIG. 7 is a block diagram of an embodiment of a column step operation that may be performed responsive to an embodiment of single column step instruction.

FIG. 7 is a block diagram of an embodiment of a column step operation 712 that may be performed responsive to an embodiment of single column step instruction. In this embodiment, the single column step instruction indicates all sixteen state matrix data elements $v_0$-$v_{15}$, and the column step operation updates all sixteen state matrix data elements responsive to the single column step instruction (e.g., within the confines of the execution of the single instruction). In this embodiment, the column step operation includes evaluation of multiple instances of the G function each with a different corresponding set of state matrix data elements. The column updates using $G_0$-$G_3$ are independent and are executed in parallel. A first set of four state matrix data elements $v_0$, $v_4$, $v_8$, and $v_{12}$ in a first column are provided to a first instance $G_0$ of the G function, and represent a first complete set of four inputs to $G_0$. A second set of four state matrix data elements $v_1$, $v_5$, $v_9$, and $v_{13}$ in a second column are provided to a second instance $G_1$ of the G function, and represent a second complete set of four inputs to $G_1$. A third set of four state matrix data elements $v_2$, $v_6$, $v_{10}$, and $v_{14}$ in a third column are provided to a third instance $G_2$ of the G function, and represent a third complete set of four inputs to $G_2$. A fourth set of four state matrix data elements $v_3$, $v_7$, $v_{11}$, and $v_{15}$ in a fourth column are provided to a fourth instance $G_3$ of the G function, and represent a fourth complete set of four inputs to $G_3$. Advantageously, this instruction/operation allows implementing a half a round of the BLAKE secure hashing algorithm in a single instruction.

Figure 8:
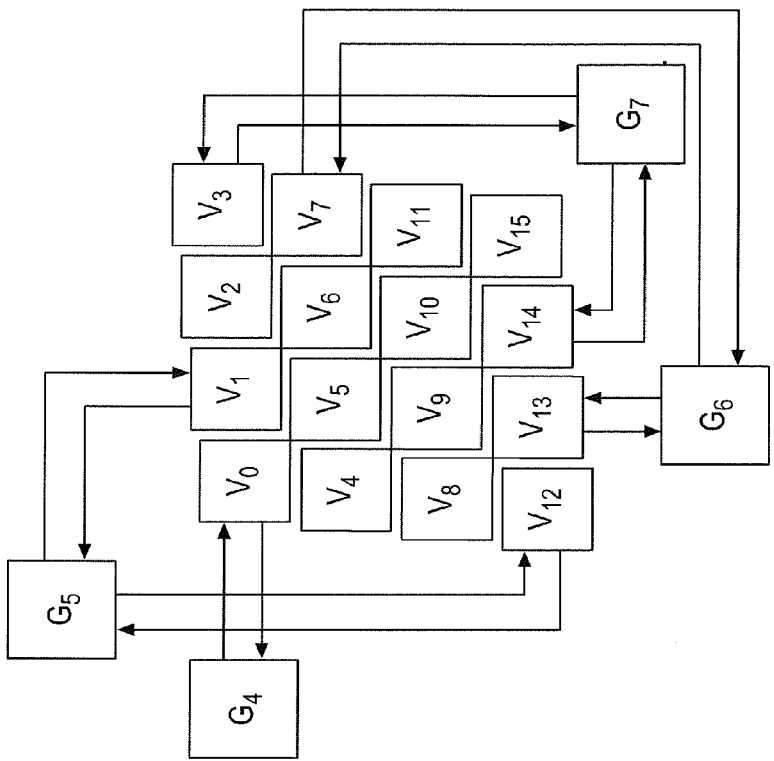
FIG. 8 is a block diagram of an embodiment of a diagonal step operation that may be performed responsive to an embodiment of single diagonal step instruction.

FIG. 8 is a block diagram of an embodiment of a diagonal step operation 813 that may be performed responsive to an embodiment of single diagonal step instruction. In this embodiment, the single diagonal step instruction indicates all sixteen state matrix data elements $v_0$-$v_{15}$, and the diagonal step operation updates all sixteen state matrix data elements responsive to the single diagonal step instruction. The diagonal updates using $G_4$-$G_7$ are independent and are executed in parallel. A first set of four state matrix data elements $v_0$, $v_5$, $v_{10}$, and $v_{15}$ in a first diagonal are provided to a first instance $G_4$ of the G function, and represent a first complete set of four inputs to $G_4$. A second set of four state matrix data elements $v_1$, $v_6$, $v_{11}$, and $v_{12}$ in a second diagonal are provided to a second instance $G_5$ of the G function, and represent a second complete set of four inputs to $G_5$. A third set of four state matrix data elements $v_2$, $v_7$, $v_8$, and $v_{13}$ in a third diagonal are provided to a third instance $G_6$ of the G function, and represent a third complete set of four inputs to $G_6$. A fourth set of four state matrix data elements $v_3$, $v_4$, $v_9$, and $v_{13}$ in a fourth diagonal are provided to a fourth instance $G_7$ of the G function, and represent a fourth complete set of four inputs to $G_7$. Advantageously, this instruction/operation allows implementing a half a round of the BLAKE secure hashing algorithm in a single instruction.

Figure 9:
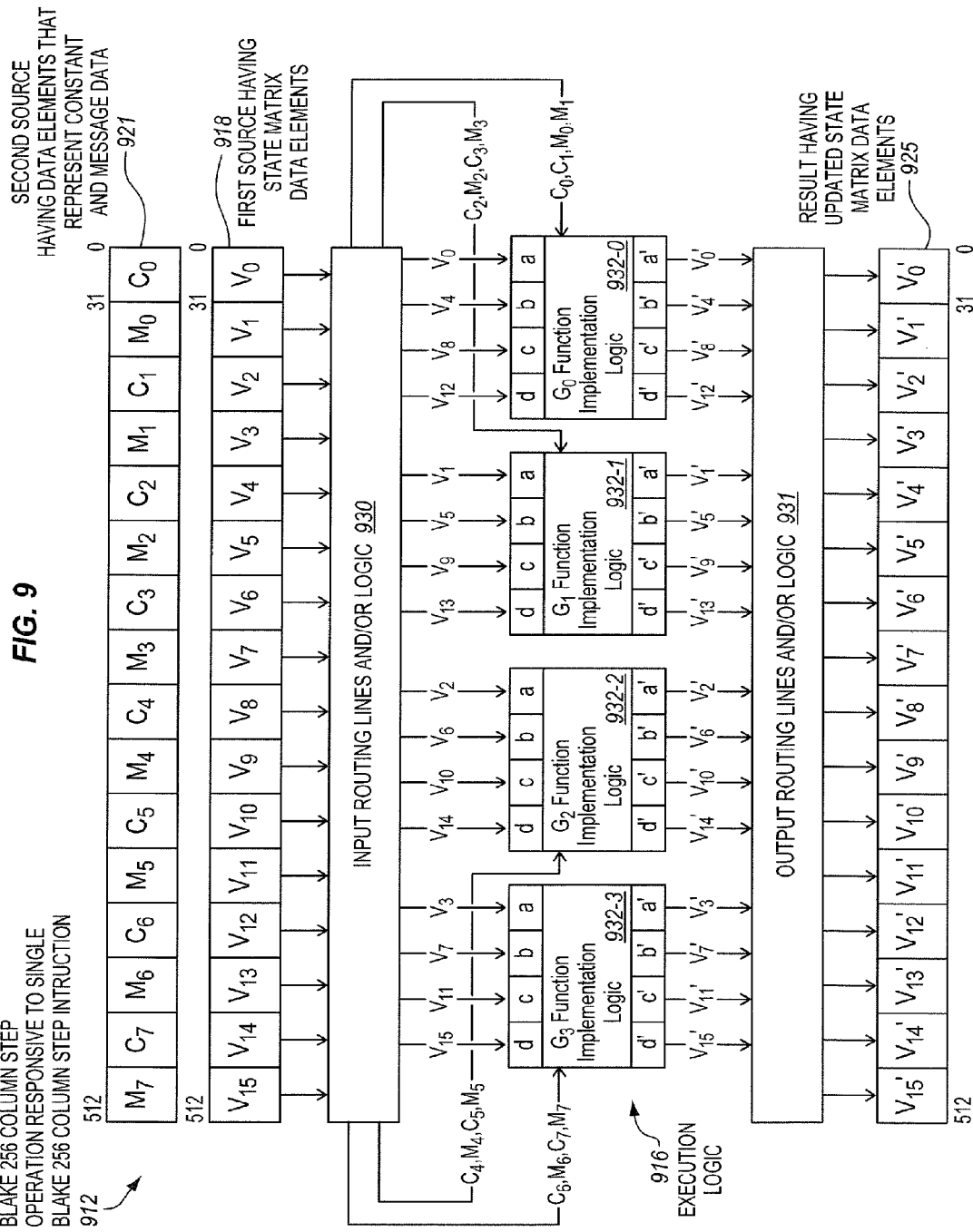
FIG. 9 is a block diagram of an embodiment of a BLAKE-256 column step operation that may be performed responsive to an embodiment of a single BLAKE-256 column step instruction.

FIG. 9 is a block diagram of an embodiment of a BLAKE-256 column step operation 912 that may be performed responsive to an embodiment of a single BLAKE-256 column step instruction. The BLAKE-256 column step instruction indicates a first source 918 having sixteen 32-bit state matrix data elements $v_0$-$v_{15}$, and indicates a second source 921 having data elements that represent constant and message data. In the illustrated embodiment, the sixteen state matrix data elements $v_0$-$v_{15}$ are arranged in order from a least significant bit to most significant bit, although this is not required. Other arrangements of the state matrix data elements are also suitable. In the illustrated embodiment, the data elements that represent the constant and message data includes interleaved 32-bit constants $c_0$-$c_7$ and 32-bit messages $m_0$-$m_7$, although this is not require. Other arrangements of the constants and messages are also suitable. Moreover, in an alternate embodiment, rather than storing separate constant and message data elements, data elements that each represents a constant data element xor'd with a message data element may be stored in the second source. In the illustrated embodiment, each of the first and second sources is 512-bits wide (e.g., is a 512-bit register), although this is not required. In other embodiments, either or both of the first and second sources may optionally be logically partitioned into two or more packed data or storage locations. Either larger or smaller than 512-bit registers may be used.

Execution logic 916 responsive to the BLAKE-256 column step instruction to perform the BLAKE-256 column step operation is also shown. The execution logic includes input routing lines and/or logic 930, four sets of G function implementation logic 932, and output routing lines and/or logic 931. The input and output routing lines and/or logic may include hardwired interconnects (e.g., lines, wires, traces, or other conductive paths), selection logic (e.g., mux), or a combination thereof. Various examples of such lines and logic are contemplated, and the scope of the invention is not limited to any known such lines and/or logic as long as the data can be routed appropriately. The four sets of G function implementation logic includes a $G_0$ function implementation logic 932-0, a $G_1$ function implementation logic 932-1, a $G_2$ function implementation logic 932-2, and a $G_3$ function implementation logic 932-3. Each G function implementation logic has four inputs a, b, c, and d, and four outputs a', b', c', and d'.

The first source has four sets, of four state matrix data elements each, which each represent a different complete set of four inputs to a different corresponding one of the G function implementation logics. A first set of four state matrix data elements $v_0$, $v_4$, $v_8$, and $v_{12}$ are routed or otherwise provided to inputs a, b, c, and d, respectively, of the $G_0$ function implementation logic. Updated state matrix data elements $v_0'$, $v_4'$, $v_8'$, and $v_{12}'$ are output from output a', b', c', and d', respectively, of the $G_0$ function implementation logic. These represent a set of four updated state matrix data elements that represent a complete column of the state matrix. A second set of four state matrix data elements $v_1$, $v_5$, $v_9$, and $v_{13}$ are routed or otherwise provided to inputs a, b, c, and d, respectively, of the $G_1$ function implementation logic. Updated state matrix data elements $v_1'$, $v_5'$, $v_9'$, and $v_{13}'$ are output from output a', b', c', and d', respectively, of the $G_1$ function implementation logic. A third set of four state matrix data elements $v_2$, $v_6$, $v_{10}$, and $v_{14}$ are routed or otherwise provided to inputs a, b, c, and d, respectively, of the $G_2$ function implementation logic. Updated state matrix data elements $v_2'$, $v_6'$, $v_{10}'$, and $v_{14}'$ are output from output a', b', c', and d', respectively, of the $G_2$ function implementation logic. A fourth set of four state matrix data elements $v_3$, $v_7$, $v_{11}$, and $v_{15}$ are routed or otherwise provided to inputs a, b, c, and d, respectively, of the $G_3$ function implementation logic. Updated state matrix data elements $v_3'$, $v_7'$, $v_{11}'$, and $v_{15}'$ are output from output a', b', c', and d', respectively, of the $G_3$ function implementation logic.

The outputs of the four G function implementation logics represent four sets of four updated state matrix data elements each. The updated state matrix data elements $v_0'$-$v_{15}'$ are routed, otherwise provided, or otherwise stored in a result 925 having updated state matrix data elements. In the illustrated embodiment, the sixteen updated state matrix data elements $v_0'$-$v_{15}'$ are arranged in order from a least significant bit to most significant bit, although this is not required. In the illustrated embodiment, the result is 512-bits wide, although this is not required. Advantageously, this instruction/operation allows implementing a half a round (e.g., a column step) of the BLAKE-256 secure hashing algorithm, and updating all sixteen state matrix data elements, in a single instruction.

Figure 10:
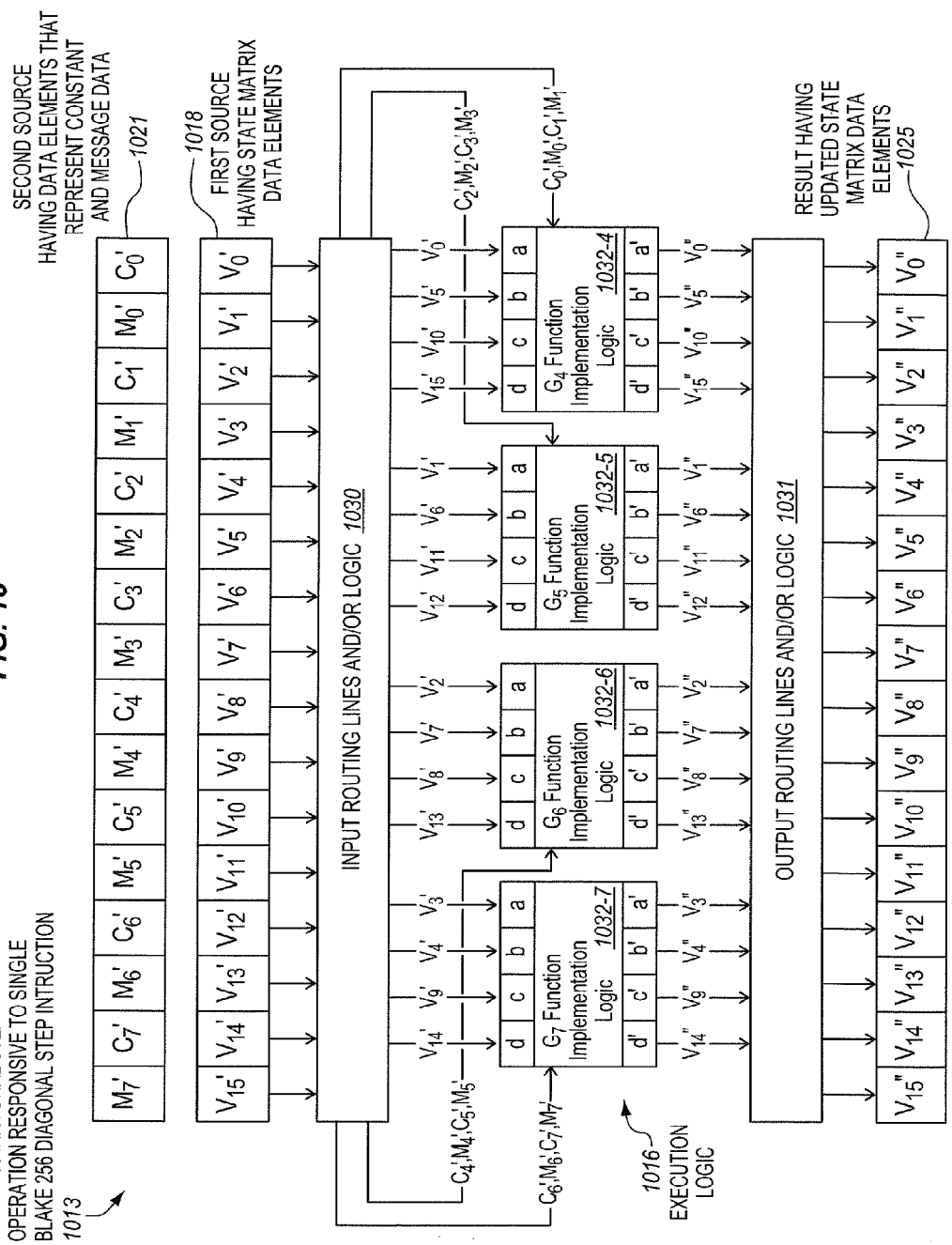
FIG. 10 is a block diagram of an embodiment of a BLAKE-256 diagonal step operation that may be performed responsive to an embodiment of a single BLAKE-256 diagonal step instruction.

FIG. 10 is a block diagram of an embodiment of a BLAKE-256 diagonal step operation 1013 that may be performed responsive to an embodiment of a single BLAKE-256 diagonal step instruction. The BLAKE-256 diagonal step instruction indicates a first source 1018 having sixteen 32-bit state matrix data elements $v_0'$-$v_{15}'$, and indicates a second source 1021 having data elements that represent constant and message data. In the illustrated embodiment, the sixteen state matrix data elements $v_0'$-$v_{15}'$ are arranged in order from a least significant bit to most significant bit, although this is not required. Other arrangements of the state matrix data elements are also suitable. In the illustrated embodiment, the data elements that represent the constant and message data includes interleaved 32-bit constants $c_0'$-$c_7'$ and 32-bit messages $m_0'$-$m_7'$, although this is not require. Other arrangements of the constants and messages are also suitable. Moreover, in an alternate embodiment, rather than storing separate constant and message data elements, data elements that each represents a constant data element xor'd with a message data element may be stored in the second source. In the illustrated embodiment, each of the first and second sources is 512-bits wide (e.g., is a 512-bit register), although this is not required. In other embodiments, either or both of the first and second sources may optionally be logically partitioned into two or more packed data or storage locations.

Execution logic 1016 responsive to the BLAKE-256 diagonal step instruction to perform the BLAKE-256 diagonal step operation is also shown. The execution logic includes input routing lines and/or logic 1030, four sets of G function implementation logic 1032, and output routing lines and/or logic 1031. The input and output routing lines and/or logic may include hardwired interconnects (e.g., lines, wires, traces, or other conductive paths), selection logic (e.g., mux), or a combination thereof. Various examples of such lines and logic are contemplated, and the scope of the invention is not limited to any known such lines and/or logic as long as the data can be routed appropriately. The four sets of G function implementation logic includes a $G_4$ function implementation logic 1032-4, a $G_5$ function implementation logic 1032-5, a $G_6$ function implementation logic 1032-6, and a $G_7$ function implementation logic 1032-7. Each G function implementation logic has four inputs a, b, c, and d, and four outputs a', b', c', and d'.

A first set of four state matrix data elements $v_0'$, $v_5'$, $v_{10}'$, and $v_{15}'$ are routed or otherwise provided to inputs a, b, c, and d, respectively, of the $G_4$ function implementation logic. Updated state matrix data elements $v_0''$, $v_5''$, $v_{10}''$, and $v_{15}''$ are output from output a', b', c', and d', respectively, of the $G_4$ function implementation logic. These represent a set of four updated state matrix data elements that represent a complete diagonal of the state matrix. A second set of four state matrix data elements $v_1'$, $v_6'$, $v_{11}'$, and $v_{12}'$ are routed or otherwise provided to inputs a, b, c, and d, respectively, of the $G_5$ function implementation logic. Updated state matrix data elements $v_1''$, $v_5''$, $v_9''$, and $v_{13}''$ are output from output a', h', c', and d', respectively, of the $G_5$ function implementation logic. A third set of four state matrix data elements $v_2'$, $v_7'$, $v_8'$, and $v_{13}'$ are routed or otherwise provided to inputs a, b, c, and d, respectively, of the $G_6$ function implementation logic. Updated state matrix data elements $v_2''$, $v_7''$, $v_8''$, and $v_{13}''$ are output from output a', b', c', and d', respectively, of the $G_6$ function implementation logic. A fourth set of four state matrix data elements $v_3'$, $v_4'$, $v_9'$, and $v_{14}'$ are routed or otherwise provided to inputs a, b, c, and d, respectively, of the $G_7$ function implementation logic. Updated state matrix data elements $v_3''$, $v_4''$, $v_9''$, and $v_{14}''$ are output from output a', b', c', and d', respectively, of the $G_7$ function implementation logic. The updated state matrix data elements $v_0''$-$v_{15}''$ are routed, otherwise provided, or otherwise stored in a result 1025 having updated state matrix data elements. In the illustrated embodiment, the sixteen updated state matrix data elements $v_0''$-$v_1''$ are arranged in order from a least significant bit to most significant bit, although this is not required. In the illustrated embodiment, the result is 512-bits wide, although this is not required. Advantageously, this instruction/operation allows implementing a half a round (e.g., a diagonal step) of the BLAKE-256 secure hashing algorithm, and updating all sixteen state matrix data elements, in a single instruction.

In some embodiments, BLAKE column and diagonal step instructions may optionally be implemented in a pipelined manner. Initially, a BLAKE column step instruction may be introduced into the pipeline and allowed to proceed at least part way through the pipeline. While the BLAKE column step instruction is being processed in the pipeline (e.g., one or more cycles) code (e.g., other instructions) may prepare constant and message inputs for the BLAKE diagonal step instruction. Then, the BLAKE diagonal step instruction may be introduced into the pipeline. In an aspect, each instruction may complete in on the order of around 3-5 cycles, although this is not required.

Figure 11:
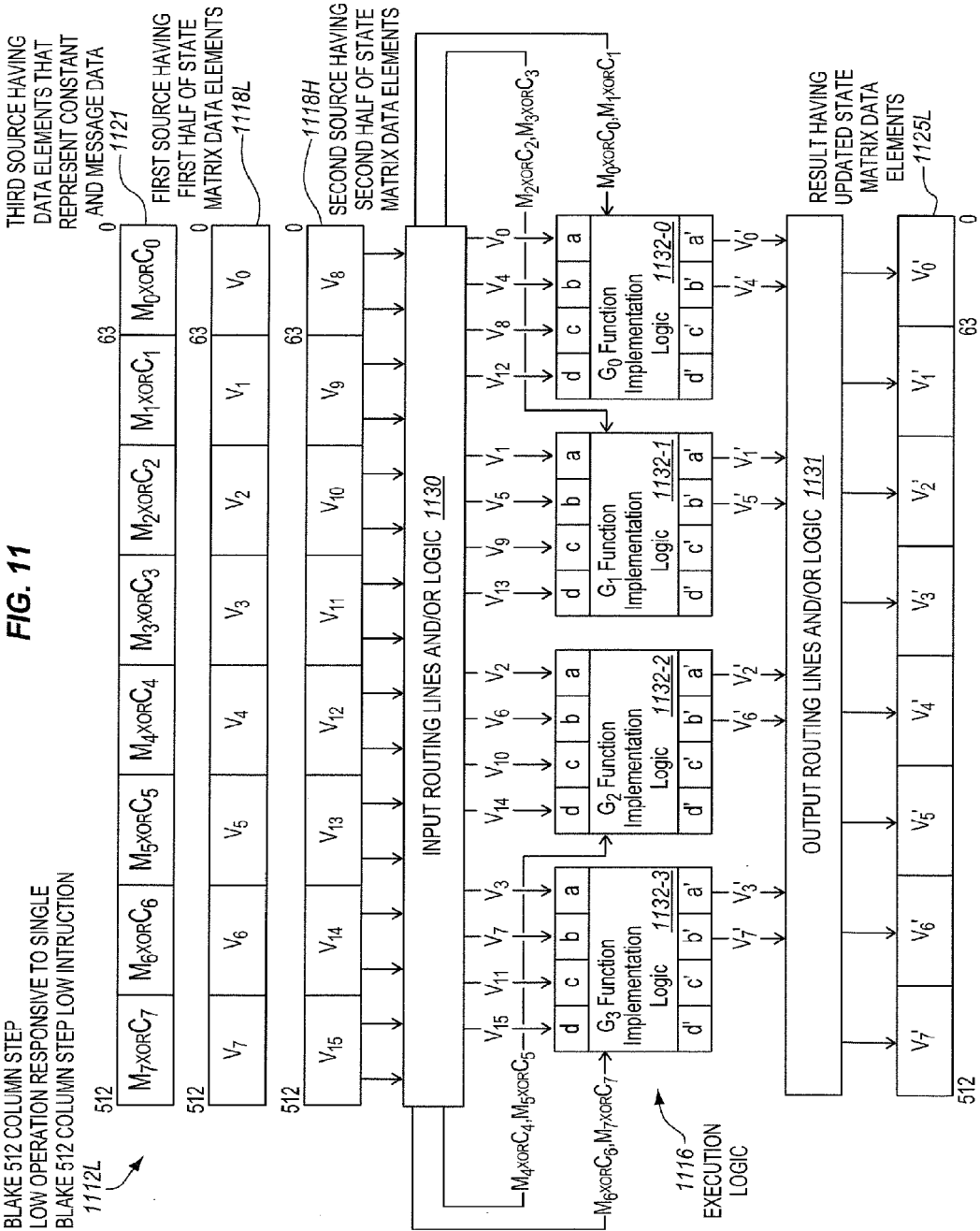
FIG. 11 is a block diagram of an embodiment of a BLAKE-512 column step low operation that may be performed responsive to an embodiment of a single BLAKE-512 column step low instruction.
Figure 12:
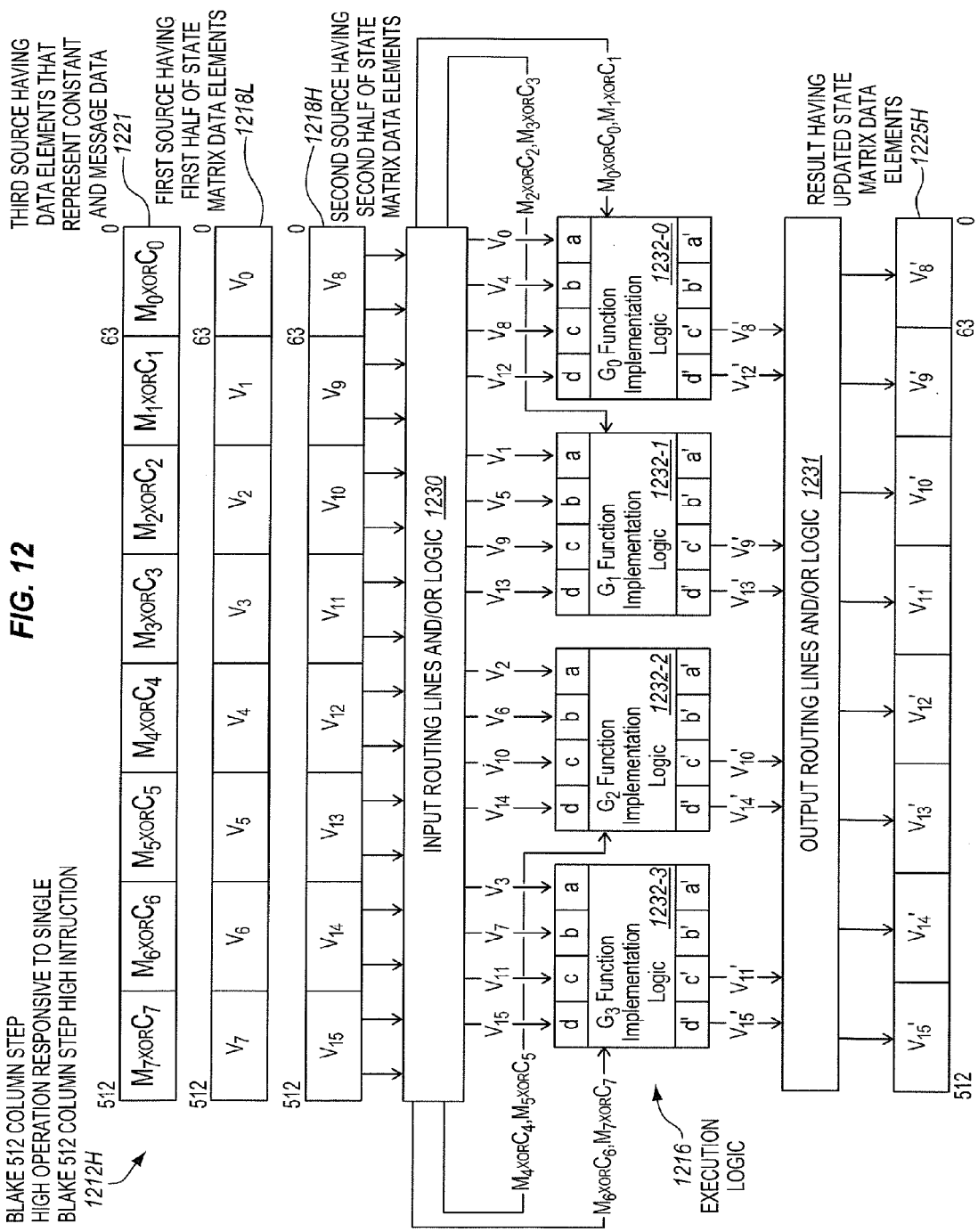
FIG. 12 is a block diagram of an embodiment of a BLAKE-512 column step high operation that may be performed responsive to an embodiment of a single BLAKE-512 column step high instruction.

FIG. 11 is a block diagram of an embodiment of a BLAKE-512 column step low operation 1112L that may be performed responsive to an embodiment of a single BLAKE-512 column step low instruction. FIG. 12 is a block diagram of an embodiment of a BLAKE-512 column step high operation 1212H that may be performed responsive to an embodiment of a single BLAKE-512 column step high instruction. The BLAKE-512 column step low and high operations 1112L/1212H have certain similarities to the BLAKE-256 column step operation 912 of FIG. 9. To avoid obscuring the following description, the discussion below will primarily focus on the different and/or additional features without repeating all of the similarities. However, it is to be understood that, unless expressed or apparent otherwise, the BLAKE-512 column step low and high operations may have similar attributes, and alternatives, to the previously described BLAKE-256 column step operation.

The state matrix data elements $v_0$-$v_{15}$ in BLAKE-512 are 64-hits. In the illustrated embodiment, 512-bit sources are used, although this is not required. Only eight 64-bit state matrix data elements fit within a 512-bit source. The instruction indicates a first source 1118L which includes $v_0$-$v_7$ and a second source 1118H which includes $v_8$-$v_{15}$. In other embodiments, the state matrix data elements may be split differently between the sources. The instruction also indicates a third source 1121 having data elements that represent constant and message data. In the illustrated embodiment, eight 64-bit data elements $M_0 \text{xor} C_0$-$M_7 \text{xor} C_7$, which each represent a different one of eight 64-bit messages xor'd with a different corresponding one of 64-bit eight constants, are stored in the third source. The xor operation consolidates two 64-bit data elements into one 64-bit data element, and allows eight 64-bit xor'd values to be stored in a single 512-bit source. The xor'd values are used by the G function. Notice that this xor operation is performed outside of the bounds of the execution of the BLAKE-512 column step low instruction (i.e., the xor'd values are stored in a source of the instruction). Alternatively, all of the un-xor'd messages and constants may be stored in additional source space (e.g., 1024-bits total source space to store the sixteen 64-bit message and constants). As mentioned before, use of 512-bit sources is not required. In other embodiments, wider (e.g., 1024-bit) sources may be used.

Also shown is execution logic 1116, which is responsive to the BLAKE-512 column step low instruction, to perform the BLAKE-512 column step low operation. The execution logic includes input routing lines and/or logic 1130 to route the input state matrix data elements to appropriate instances of G function implementation logic 1132. As before, $v_0$, $v_4$, $v_8$, and $v_{12}$ are routed to a $G_0$ function implementation logic 1132-0, etc. As shown, in the illustrated embodiment, only a lower half of the outputs from each of the G function implementation logics is stored in a low result 1125L. In particular, updated state matrix data elements $v_0'$ and $v_4'$ are output from a $G_0$ function implementation logic 1132-0. Similarly, updated state matrix data elements $v_1'$ and $v_5'$ are output from the $G_1$ function implementation logic 1132-1. Updated state matrix data elements $v_2'$ and $v_6'$ are output from the $G_2$ function implementation logic 1132-2. Similarly, updated state matrix data elements $v_3'$ and $v_7'$ are output from the $G_3$ function implementation logic 1132-3. Output routing lines and/or logic is used to route the updated state matrix data elements $v_0'$-$v_7'$ to appropriate locations in a low result 1125L. In some embodiments, one of the sources 1118L/1118H may be reused as the destination where the result is stored (i.e., the source data may be overwritten by the result), in which case the source data may be stored elsewhere so that it is not lost. Alternatively, the destination may be a different location than the sources. As before, the illustrated order of $v_0'$-$v_7'$ offers certain advantages, but is not required. Advantageously, this instruction/operation allows implementing a quarter a round (e.g., a half a column step) of the BLAKE-512 secure hashing algorithm, and updating eight state matrix data elements, in a single instruction.

FIG. 12 is a block diagram of an embodiment of a BLAKE-512 column step high operation 1212H that may be performed responsive to an embodiment of a single BLAKE-512 column step high instruction. The instruction indicates a first source 1218L which includes $v_0$-$v_7$ and a second source 1218H which includes $v_8$-$v_{15}$. In other embodiments, the state matrix data elements may be split differently between the sources. The instruction also indicates a third source 1221 having data elements that represent constant and message data $M_0 \text{xor} C_0$-$M_7 \text{xor} C_7$.

Execution logic 1216 is responsive to the BLAKE-512 column step high instruction to perform the BLAKE-512 column step high operation. The execution logic includes input routing lines and/or logic 1230 to route the input state matrix data elements to appropriate instances of G function implementation logic 1232. As shown, in the illustrated embodiment, only a high half of the outputs from each of the G function implementation logics is stored in a high result 1225H. In particular, updated state matrix data elements $v_8'$ and $v_{12}'$ are output from a $G_0$ function implementation logic 1232-0. Similarly, updated state matrix data elements $v_9'$ and $v_{13}'$ are output from the $G_1$ function implementation logic 1232-1. Updated state matrix data elements $v_{10}'$ and $v_{14}'$ are output from the $G_2$ function implementation logic 1232-2. Similarly, updated state matrix data elements $v_{11}'$ and $v_{15}'$ are output from the $G_3$ function implementation logic 1232-3. Output routing lines and/or logic is used to route the high half of the updated state matrix data elements $v_8'$-$v_{15}'$ to appropriate locations in a high result 1225H. In some embodiments, one of the sources 1218L/1218H may be reused as the destination where the result is stored (i.e., the source data may be overwritten by the result), in which case the source data may be stored elsewhere so that it is not lost. Alternatively, the destination may be a different location than the sources. As before, the illustrated order of $v_8'$-$v_{15}'$ offers certain advantages, but is not required. Advantageously, this instruction/operation allows implementing a quarter a round (e.g., a half a column step) of the BLAKE-512 secure hashing algorithm, and updating eight state matrix data elements, in a single instruction.

Figure 13:
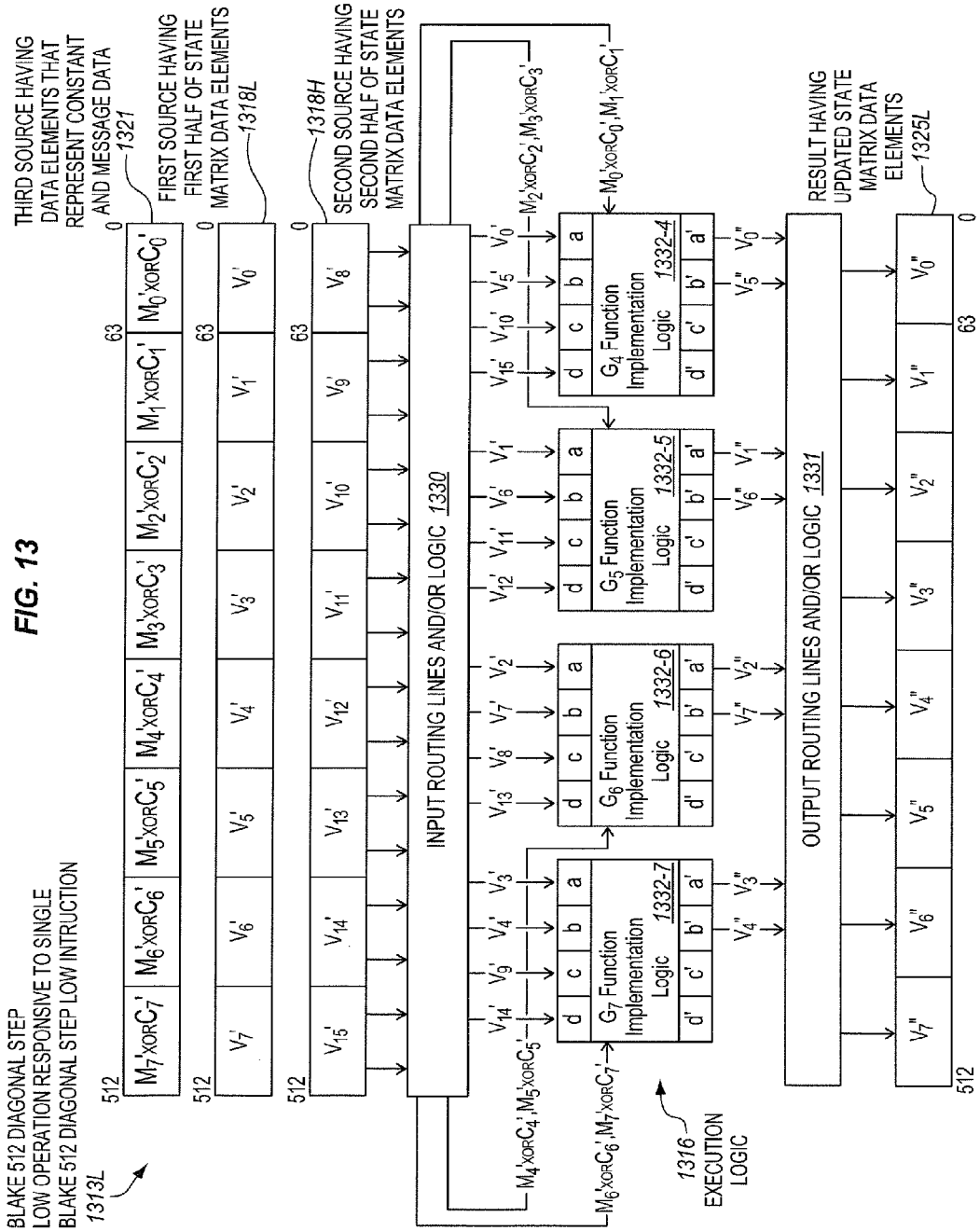
FIG. 13 is a block diagram of an embodiment of a BLAKE-512 diagonal step low operation that may be performed responsive to an embodiment of a single BLAKE-512 diagonal step low instruction.
Figure 14:
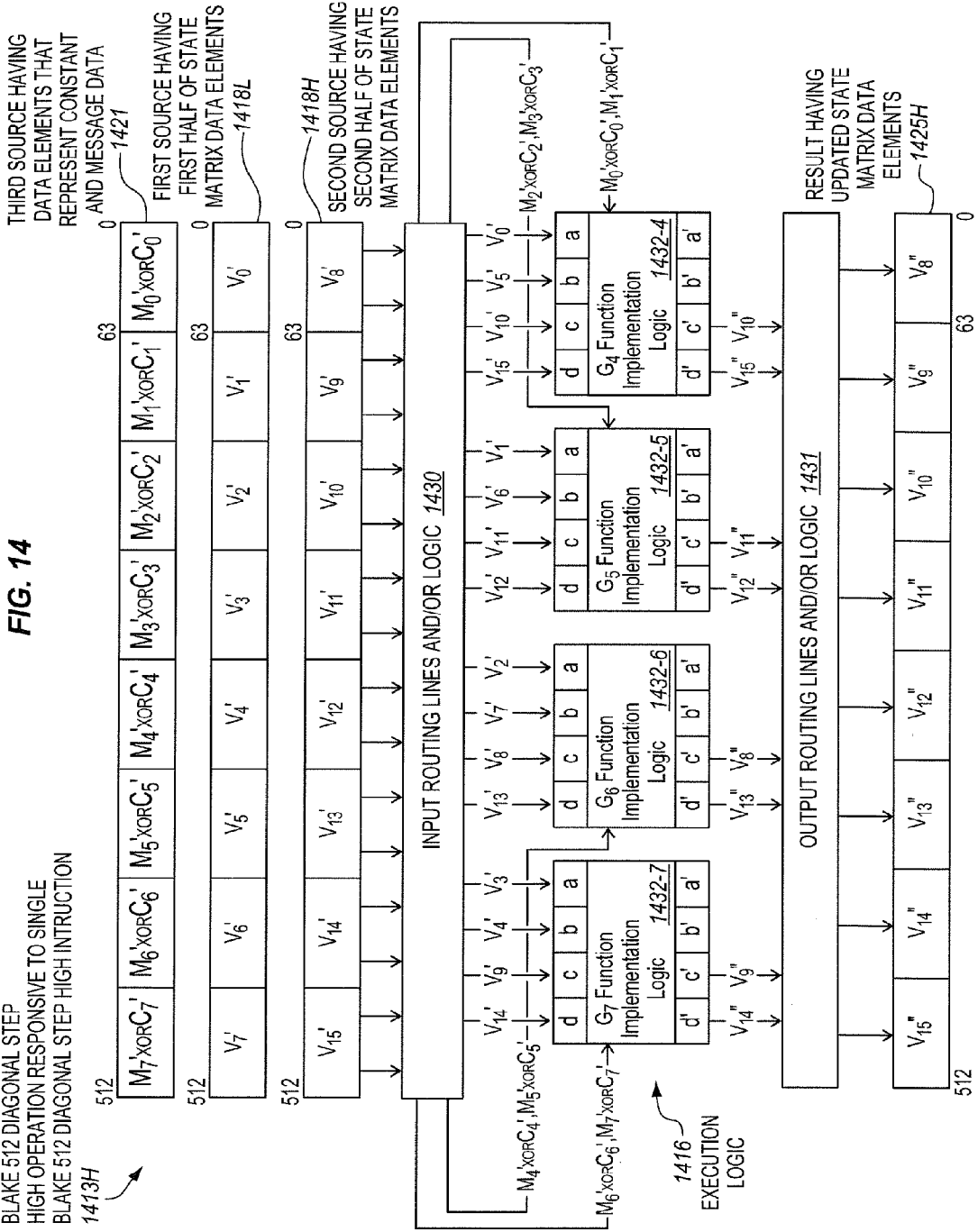
FIG. 14 is a block diagram of an embodiment of a BLAKE-512 diagonal step high operation that may be performed responsive to an embodiment of a single BLAKE-512 diagonal step high instruction.

FIG. 13 is a block diagram of an embodiment of a BLAKE-512 diagonal step low operation 1313L that may be performed responsive to an embodiment of a single BLAKE-512 diagonal step low instruction. FIG. 14 is a block diagram of an embodiment of a BLAKE-512 diagonal step high operation 1413H that may be performed responsive to an embodiment of a single BLAKE-512 diagonal step high instruction. The BLAKE-512 diagonal step low and high operations 1313L/1413H have certain similarities to the BLAKE-256 diagonal step operation 1013 of FIG. 10. To avoid obscuring the following description, the discussion below will primarily focus on the different and/or additional features without repeating all of the similarities. However, it is to be understood that, unless expressed or apparent otherwise, the BLAKE-512 diagonal step low and high operations may have similar attributes, and alternatives, to the previously described BLAKE-256 diagonal step operation.

The instruction indicates a first source 1318L which includes a first lower half of the state matrix data elements $v_0'$-$v_7'$ and a second source 1318H which includes a second higher half of the state matrix data elements $v_8$-$v_{15}$. In other embodiments, the state matrix data elements may be arranged differently between the sources. The instruction also indicates a third source 1321 having eight 64-bit data elements that represent constant and message data. In particular, the third source includes $M_0'xorC_0'$-$M_7'xorC_7'$, which each represent a different one of eight 64-bit messages (M) xor'd with a different corresponding one of 64-bit eight constants (C). As before, the xor operations are performed outside of the bounds of the execution of the BLAKE-512 diagonal step low instruction, which offers advantages in consolidated storage space but is not required. As mentioned before, use of 512-bit sources is not required. In other embodiments, wider (e.g., 1024-bit) sources may be used. 1024-bit sources may fit all of the sixteen 64-bit state matrix data elements or all of sixteen un-consolidated (e.g., not xor'd) message and constant data elements.

Execution logic 1316 is responsive to the BLAKE-512 diagonal step low instruction to perform the BLAKE-512 diagonal step low operation. The execution logic includes input routing lines and/or logic 1330 to route the input state matrix data elements to appropriate instances of G function implementation logic 1332. In the illustrated embodiment, only a lower half of the outputs from each of the G function implementation logics is stored in a low result 1325L. In particular, updated state matrix data elements $v_0''$ and $v_5''$ are output from a $G_4$ function implementation logic 1332-4. Similarly, updated state matrix data elements $v_1''$ and $v_6''$ are output from the $G_5$ function implementation logic 1332-5. Updated state matrix data elements $v_2''$ and $v_7''$ are output from the $G_6$ function implementation logic 1332-6. Similarly, updated state matrix data elements $v_3''$ and $v_4''$ are output from the $G_7$ function implementation logic 1332-7. Output routing lines and/or logic is used to route the updated state matrix data elements $v_0''$-$v_7''$ to appropriate locations in a low result 1325L. In some embodiments, one of the sources 1318L/1318H may be reused as the destination where the result is stored (i.e., the source data may be overwritten by the result), in which case the source data may be stored elsewhere so that it is not lost. Alternatively, the destination may be a different location than the sources. As before, the illustrated in-order arrangement of $v_0''$-$v_7''$ in the result offers certain advantages, but is not required. Advantageously, this instruction/operation allows implementing a quarter a round (e.g., a half a diagonal step) of the BLAKE-512 secure hashing algorithm, and updating eight state matrix data elements, in a single instruction.

FIG. 14 is a block diagram of an embodiment of a BLAKE-512 diagonal step high operation 1413H that may be performed responsive to an embodiment of a single BLAKE-512 diagonal step high instruction. The instruction indicates a first source 1418L which includes a first lower half of the state matrix data elements $v_0'$-$v_7'$ and a second source 1418H which includes a second higher half of the state matrix data elements $v_8'$-$v_{15}'$. In other embodiments, the state matrix data elements may be split differently between the sources. The instruction also indicates a third source 1421 having data elements that represent constant and message data $M_0'xorC_0'$-$M_7'xorC_7'$.

Execution logic 1416 is responsive to the BLAKE-512 diagonal step high instruction to perform the BLAKE-512 diagonal step high operation. The execution logic includes input routing lines and/or logic 1430 to route the input state matrix data elements to appropriate instances of G function implementation logic 1432. As shown, in the illustrated embodiment, only a high half of the outputs from each of the G function implementation logics is stored in a high result 1425H. In particular, updated state matrix data elements $v_{10}''$ and $v_{15}''$ are output from a $G_4$ function implementation logic 1432-4. Similarly, updated state matrix data elements $v_{11}''$ and $v_{12}''$ are output from the $G_5$ function implementation logic 1432-5. Updated state matrix data elements $v_8''$ and $v_{13}''$ are output from the $G_6$ function implementation logic 1432-6. Similarly, updated state matrix data elements $v_9''$ and $v_{14}''$ are output from the $G_7$ function implementation logic 1432-7. Output routing lines and/or logic is used to route the high half of the updated state matrix data elements $v_8''$-$v_{15}''$ to appropriate locations in a high result 1425H. As before, the illustrated order of $v_8''$-$v_{15}''$ offers certain advantages, but is not required. Advantageously, this instruction/operation allows implementing a quarter a round (e.g., a half a diagonal step) of the BLAKE-512 secure hashing algorithm, and updating eight state matrix data elements, in a single instruction.

In some embodiments, BLAKE column step low and high instructions and/or BLAKE diagonal step low and high instructions may be implemented on the same four instances of G function implementation logic in a pipelined manner. For example, one of the low and high instructions may be introduced into a pipeline having the instances of the G function implementation logic and allowed to proceed part way through the pipeline, and then subsequently the other of the low and high instructions may be introduced into the pipeline having the same instances of the G function implementation logic. The same G function implementation logics may perform operations for the low and high instructions at different times. In other embodiments, BLAKE column step low and high instructions and/or BLAKE diagonal step low and high instructions may be implemented on different corresponding sets of four instances of G function implementation logic each in a parallel manner (e.g., two separate data paths).

The embodiments of FIGS. 9-14 are just a few illustrative embodiments. It is to be appreciated that the scope of the invention is not limited to just these embodiments. In these embodiments, the source(s) of the instruction include all sixteen of the state matrix data elements, and four implementations of the G function are performed, although this is not required. In another embodiment, the source(s) of the instruction may include only one set of inputs for one G function and only one implementation of the one G function may be performed. In yet another embodiment, the source(s) of the instruction may include only two sets of inputs for two instances of the G functions and only the two implementations of the two G functions may be performed. This may sacrifice some performance but may allow smaller sources (e.g., 128-bit or 256-bit sources) and/or a lesser number of sources to be used. Moreover, the embodiments of FIGS. 11-14 separate the low and high halves of the updated state matrix data elements in their respective results, although this is not required. In other embodiments, other splits of the updated state matrix data elements may be performed by the instructions.

Figure 15:
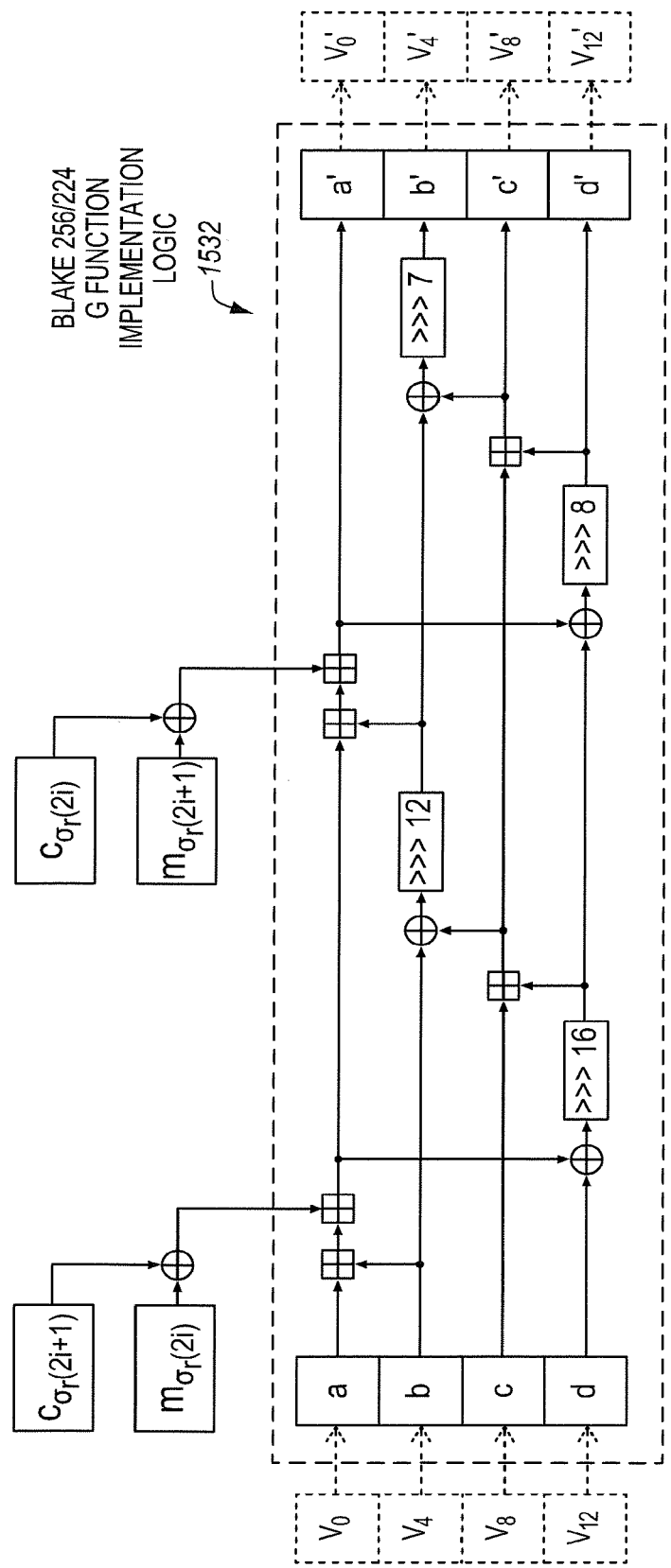
FIG. 15 is a logic block diagram of BLAKE-256/224 G function implementation logic.

FIG. 15 is a logic block diagram of BLAKE-256/224 G function implementation logic 1532. FIG. 16 illustrates the BLAKE-256/224 G function operations 1633. FIG. 17 illustrates the BLAKE-512/384 G function operations. The implementation logic and operations are well known in the art (i.e., described in detail in the BLAKE specification). Only a brief description will be provided here, although further details may be obtained from the public literature. A processor as disclosed herein may include various different types and configurations of logic (e.g., hardware, software, firmware, microcode, or a combination thereof) to realize an implementation of the illustrated logic and/or perform the illustrated operations.

The logic 1532 includes four inputs a, b, c, and d, and four outputs a', b', c', and d'. The symbol illustrated as a plus sign (i.e., +) with a square box around it represents an addition operation, the symbol shown as a plus sign (i.e., +) with a circle around it represents an exclusive or (xor) operation, and the symbol >>>k represents rotation of k bits toward the less significant bits. The $c_{or(2i+1)}$ and $c_{or(2i)}$ are constant inputs and the $m_{or(2i)}$ and $m_{or(2i+1)}$ message inputs. A dashed box around a subset of the logic 1532 is used to indicate that in some embodiments the xor of the message and constant inputs may be outside of the G function implementation logic used by the instructions as disclosed herein. The G function implementation logic used by the instructions as disclosed herein accordingly may implement either four or six xor operations, six addition operations, and four rotation operations. Notice that there are multiple data dependencies within the U-function operations, which as mentioned before without the instructions disclosed herein tend to limit the amount of data parallelism that may be exploited.

In some embodiments, the column step and diagonal step instructions may have different opcodes. Alternatively, in other embodiments, the column step and diagonal step instructions may have the same opcode and an immediate may be used to specify whether a column step operation or a diagonal step operation is to be performed. In some embodiments, the low (e.g., column or diagonal step low) and high (e.g., column or diagonal step high) instructions may have different opcodes. Alternatively, in other embodiments, the low and high instructions may have the same opcode and an immediate may be used to specify whether a low or a high operation is to be performed.

As discussed above, in some embodiments, the instructions useful to process the BLAKE secure hashing algorithm may each implement one or more G entire functions. Alternatively, in other embodiments, the instructions useful to process the BLAKE secure hashing algorithm may each implement one of a first and a second half of one or more G functions. For example, approximately a first half of the operations of one or more G functions may be performed by a first instruction, and approximately a second complementary half of the operations of the one or more G functions may be performed by a second instruction. Breaking up the G functions into two portions generally tends to sacrifice some performance, but may be desirable when there are constraints on the number of cycles, in order to save power, etc.

Embodiments have been described in particular for the BLAKE secure hashing algorithm. However, other embodiments are not limited to BLAKE, but rather apply to other algorithms derived from BLAKE, based on BLAKE, using a similar approach as BLAKE (e.g., using a state matrix and a hashing function with four inputs and four outputs), or otherwise falling within the scope of the claims.

Figure 18:
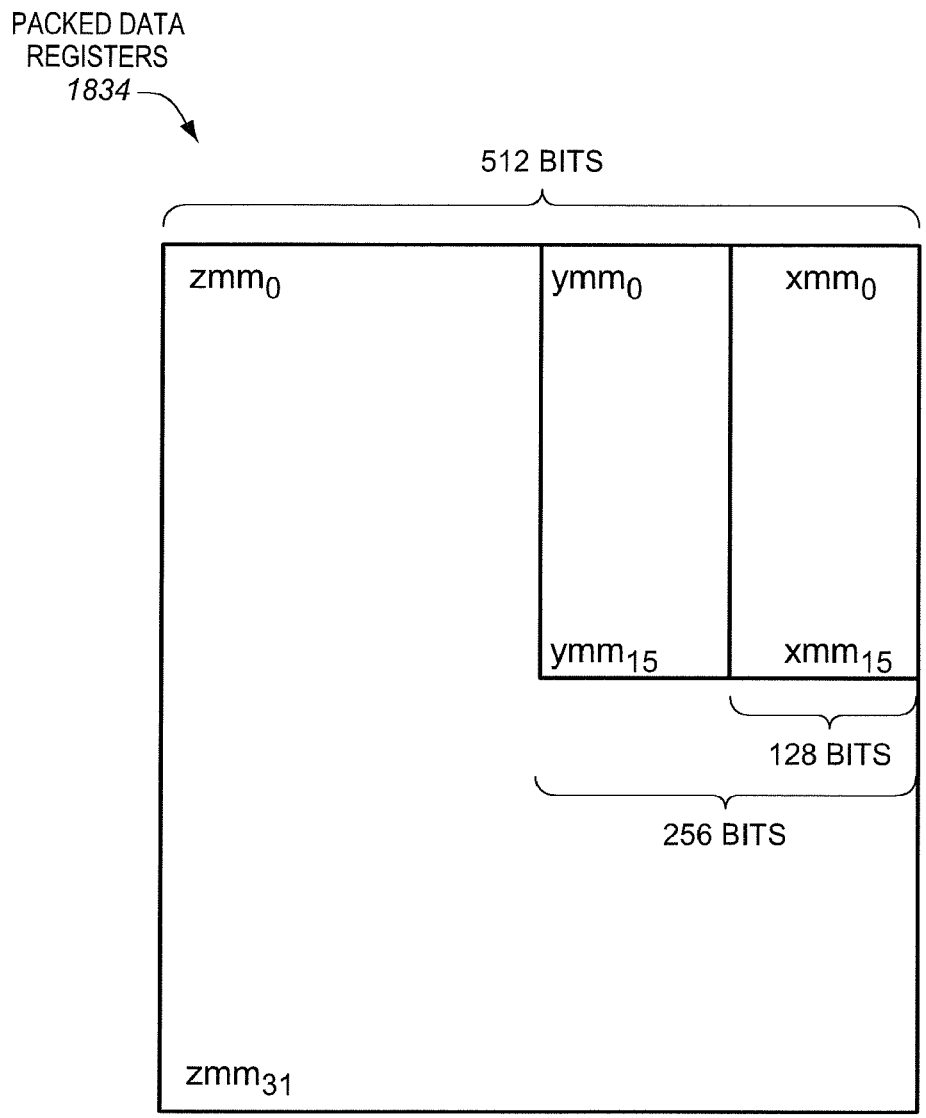
FIG. 18 is a block diagram of an example embodiment of a suitable set of packed data registers.

FIG. 18 is a block diagram of an example embodiment of a suitable set of packed data registers 1834. The illustrated packed data registers include thirty-two 512-bit packed data or vector registers. These thirty-two 512-bit registers are labeled ZMM0 through ZMM31. In the illustrated embodiment, the lower order 256-bits of the lower sixteen of these registers, namely ZMM0-ZMM15, are aliased or overlaid on respective 256-bit packed data or vector registers labeled YMM0-YMM15, although this is not required. Likewise, in the illustrated embodiment, the lower order 128-bits of YMM0-YMM15 are aliased or overlaid on respective 128-bit packed data or vector registers labeled XMM0-XMM1, although this also is not required. The 512-bit registers ZMM0 through ZMM31 are operable to hold 512-bit packed data, 256-bit packed data, or 128-bit packed data. The 256-bit registers YMM0-YMM15 are operable to hold 256-bit packed data, or 128-bit packed data. The 128-bit registers XMM0-XMM1 are operable to hold 128-bit packed data. Each of the registers may be used to store either packed floating-point data or packed integer data. Different data element sizes are supported including at least 8-bit byte data, 16-bit word data, 32-bit doubleword or single precision floating point data, and 64-bit quadword or double precision floating point data. Alternate embodiments of packed data registers may include different numbers of registers, different sizes of registers, and may or may not alias larger registers on smaller registers.

Figure 19:
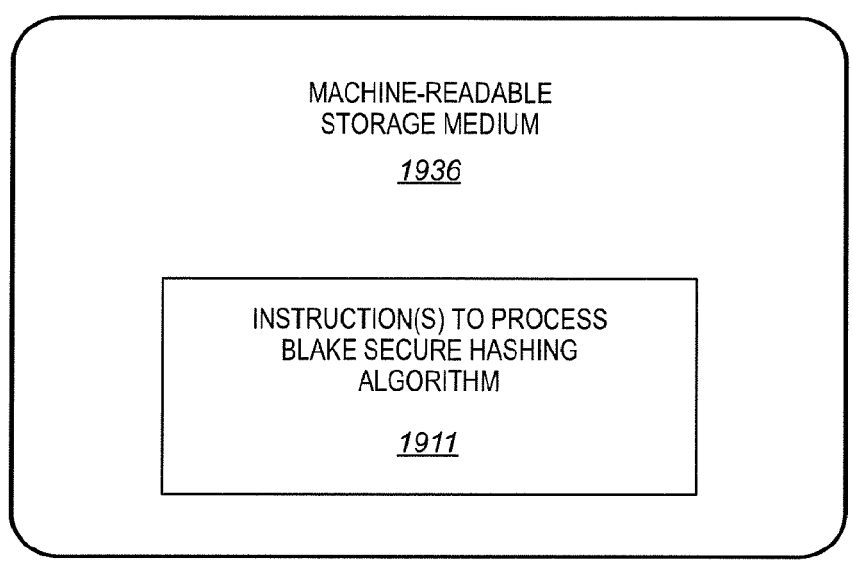
FIG. 19 is a block diagram of an article of manufacture including a machine-readable storage medium.

FIG. 19 is a block diagram of an article of manufacture (e.g., a computer program product) 1935 including a machine-readable storage medium 1936. In some embodiments, the machine-readable storage medium may be a tangible and/or non-transitory machine-readable storage medium. In various example embodiments, the machine-readable storage medium may include a floppy diskette, an optical disk, a CD-ROM, a magnetic disk, a magneto-optical disk, a read only memory (ROM), a programmable ROM (PROM), an erasable-and-programmable ROM (EPROM), an electrically-erasable-and-programmable ROM (EEPROM), a random access memory (RAM), a static-RAM (SRAM), a dynamic-RAM (DRAM), a Flash memory, a phase-change memory, a semiconductor memory, other types of memory, or a combinations thereof. In some embodiments, the medium may include one or more solid data storage materials, such as, for example, a semiconductor data storage material, a phase-change data storage material, a magnetic data storage material, an optically transparent solid data storage material, etc.

The machine-readable storage medium stores one or more 1911 instructions useful to process the BLAKE secure hashing algorithm. Each of the 1911 instructions, if executed by a machine, is operable to cause the machine to perform one or more operations or a method as disclosed herein and store a result in a destination storage location indicated by the instruction. Any of the instructions and results disclosed herein are suitable.

Examples of different types of machines include, but are not limited to, processors (e.g., general-purpose processors and special-purpose processors), instruction processing apparatus, and various electronic devices having one or more processors or instruction processing apparatus. A few representative examples of such electronic devices include, but are not limited to, computer systems, desktops, laptops, notebooks, servers, network routers, network switches, nettops, set-top boxes, cellular phones, video game controllers, etc.

An instruction set includes one or more instruction formats. A given instruction format defines various fields (number of bits, location of bits) to specify, among other things, the operation to be performed (opcode) and the operand(s) on which that operation is to be performed. Some instruction formats are further broken down though the definition of instruction templates (or subformats). For example, the instruction templates of a given instruction format may be defined to have different subsets of the instruction format's fields (the included fields are typically in the same order, but at least some have different bit positions because there are less fields included) and/or defined to have a given field interpreted differently. Thus, each instruction of an ISA is expressed using a given instruction format (and, if defined, in a given one of the instruction templates of that instruction format) and includes fields for specifying the operation and the operands. For example, an exemplary ADD instruction has a specific opcode and an instruction format that includes an opcode field to specify that opcode and operand fields to select operands (source1/destination and source2); and an occurrence of this ADD instruction in an instruction stream will have specific contents in the operand fields that select specific operands. A set of SIMD extensions referred to the Advanced Vector Extensions (AVX) (AVX1 and AVX2) and using the Vector Extensions (VEX) coding scheme, has been, has been released and/or published (e.g., see Intel® 64 and IA-32 Architectures Software Developers Manual, October 2011; and see Intel® Advanced Vector Extensions Programming Reference, June 2011).

Exemplary Instruction Formats

Embodiments of the instruction(s) described herein may be embodied in different formats. Additionally, exemplary systems, architectures, and pipelines are detailed below. Embodiments of the instruction(s) may be executed on such systems, architectures, and pipelines, but are not limited to those detailed.

Generic Vector Friendly Instruction Format

A vector friendly instruction format is an instruction format that is suited for vector instructions (e.g., there are certain fields specific to vector operations). While embodiments are described in which both vector and scalar operations are supported through the vector friendly instruction format, alternative embodiments use only vector operations the vector friendly instruction formal.

Figure 20B:
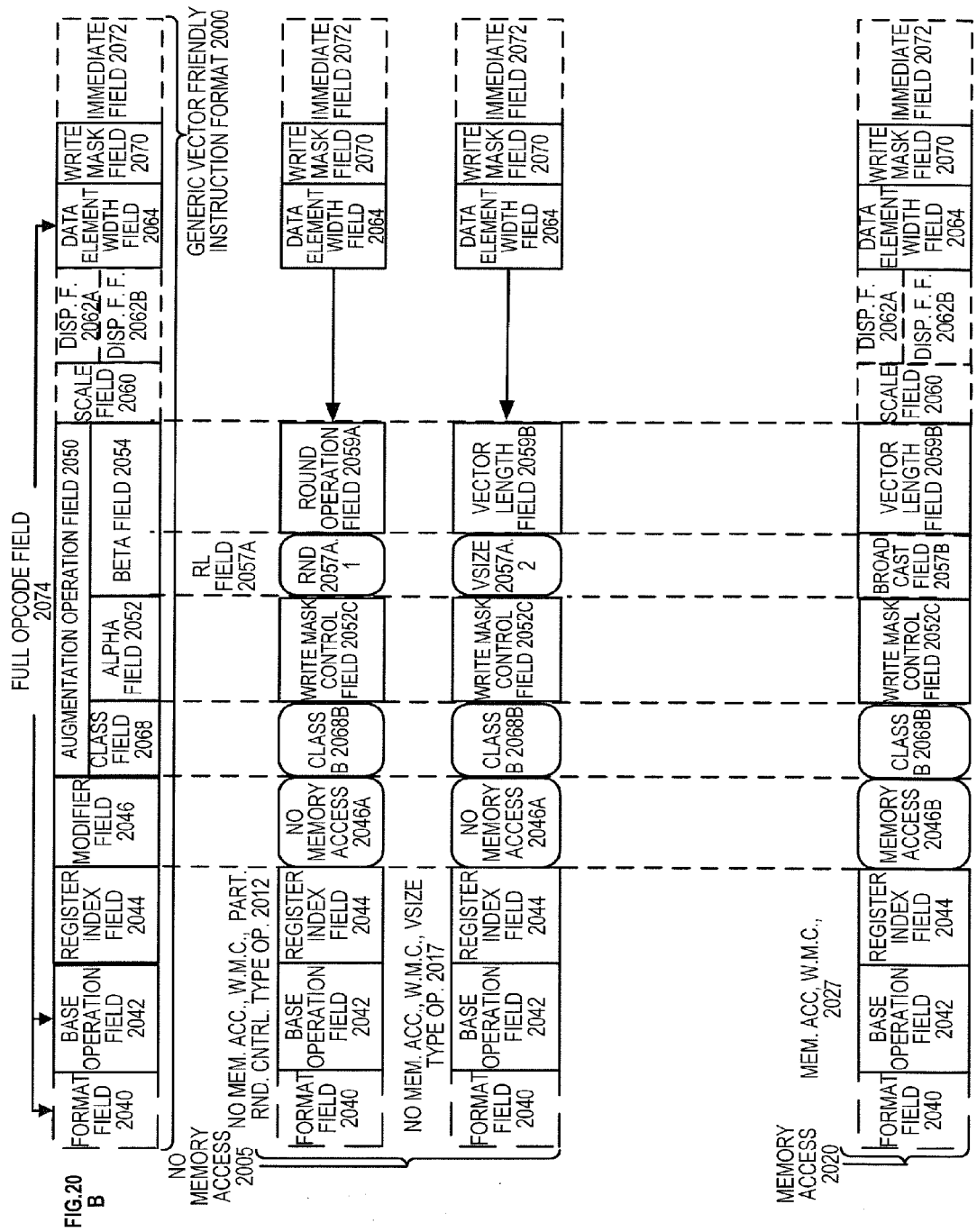
FIG. 20B is a block diagram illustrating the generic vector friendly instruction format and class B instruction templates thereof according to embodiments of the invention.

FIGS. 20A-20B are block diagrams illustrating a generic vector friendly instruction format and instruction templates thereof according to embodiments of the invention. FIG. 20A is a block diagram illustrating a generic vector friendly instruction format and class A instruction templates thereof according to embodiments of the invention; while FIG. 20B is a block diagram illustrating the generic vector friendly instruction format and class B instruction templates thereof according to embodiments of the invention. Specifically, a generic vector friendly instruction format 2000 for which are defined class A and class B instruction templates, both of which include no memory access 2005 instruction templates and memory access 2020 instruction templates. The term generic in the context of the vector friendly instruction format refers to the instruction format not being tied to any specific instruction set.

While embodiments of the invention will be described in which the vector friendly instruction format supports the following: a 64 byte vector operand length (or size) with 32 bit (4 byte) or 64 bit (8 byte) data element widths (or sizes) (and thus, a 64 byte vector consists of either 16 doubleword-size elements or alternatively, 8 quadword-size elements); a 64 byte vector operand length (or size) with 16 bit (2 byte) or 8 bit (1 byte) data element widths (or sizes); a 32 byte vector operand length (or size) with 32 bit (4 byte), 64 bit (8 byte), 16 bit (2 byte), or 8 bit (1 byte) data element widths (or sizes); and a 16 byte vector operand length (or size) with 32 bit (4 byte), 64 bit (8 byte), 16 bit (2 byte), or 8 bit (1 byte) data element widths (or sizes); alternative embodiments may support more, less and/or different vector operand sizes (e.g., 256 byte vector operands) with more, less, or different data element widths (e.g., 128 bit (16 byte) data element widths).

The class A instruction templates in FIG. 20A include: 1) within the no memory access 2005 instruction templates there is shown a no memory access, full round control type operation 2010 instruction template and a no memory access, data transform type operation 2015 instruction template; and 2) within the memory access 2020 instruction templates there is shown a memory access, temporal 2025 instruction template and a memory access, non-temporal 2030 instruction template. The class B instruction templates in FIG. 20B include: 1) within the no memory access 2005 instruction templates there is shown a no memory access, write mask control, partial round control type operation 2012 instruction template and a no memory access, write mask control, vsize type operation 2017 instruction template; and 2) within the memory access 2020 instruction templates there is shown a memory access, write mask control 2027 instruction template.

The generic vector friendly instruction format 2000 includes the following fields listed below in the order illustrated in FIGS. 20A-20B.

Format field 2040—a specific value (an instruction format identifier value) in this field uniquely identifies the vector friendly instruction format, and thus occurrences of instructions in the vector friendly instruction format in instruction streams. As such, this field is optional in the sense that it is not needed for an instruction set that has only the generic vector friendly instruction format.

Base operation field 2042—its content distinguishes different base operations.

Register index field 2044—its content, directly or through address generation, specifies the locations of the source and destination operands, be they in registers or in memory. These include a sufficient number of bits to select N registers from a PxQ (e.g. 32×512, 16×128, 32×1024, 64×1024) register file. While in one embodiment N may be up to three sources and one destination register, alternative embodiments may support more or less sources and destination registers (e.g., may support up to two sources where one of these sources also acts as the destination, may support up to three sources where one of these sources also acts as the destination, may support up to two sources and one destination).

Modifier field 2046—its content distinguishes occurrences of instructions in the generic vector instruction format that specify memory access from those that do not; that is, between no memory access 2005 instruction templates and memory access 2020 instruction templates. Memory access operations read and/or write to the memory hierarchy (in some cases specifying the source and/or destination addresses using values in registers), while non-memory access operations do not (e.g., the source and destinations are registers). While in one embodiment this field also selects between three different ways to perform memory address calculations, alternative embodiments may support more, less, or different ways to perform memory address calculations.

Augmentation operation field 2050—its content distinguishes which one of a variety of different operations to be performed in addition to the base operation. This field is context specific. In one embodiment of the invention, this field is divided into a class field 2068, an alpha field 2052, and a beta field 2054. The augmentation operation field 2050 allows common groups of operations to be performed in a single instruction rather than 2, 3, or 4 instructions.

Scale field 2060—its content allows for the scaling of the index field's content for memory address generation (e.g., for address generation that uses $2^{scale}*index+base$).

Displacement Field 2062A—its content is used as part of memory address generation (e.g., for address generation that uses $2^{scale}*index+base+displacement$).

Displacement Factor Field 2062B (note that the juxtaposition of displacement field 2062A directly over displacement factor field 2062B indicates one or the other is used)—its content is used as part of address generation; it specifies a displacement factor that is to be scaled by the size of a memory access (N)—where N is the number of bytes in the memory access (e.g., for address generation that uses $2^{scale}*index+base+scaled displacement$). Redundant low-order bits are ignored and hence, the displacement factor field's content is multiplied by the memory operands total size (N) in order to generate the final displacement to be used in calculating an effective address. The value of N is determined by the processor hardware at runtime based on the full opcode field 2074 (described later herein) and the data manipulation field 2054C. The displacement field 2062A and the displacement factor field 2062B are optional in the sense that they are not used for the no memory access 2005 instruction templates and/or different embodiments may implement only one or none of the two.

Data element width field 2064—its content distinguishes which one of a number of data element widths is to be used (in some embodiments for all instructions; in other embodiments for only some of the instructions). This field is optional in the sense that it is not needed if only one data element width is supported and/or data element widths are supported using some aspect of the opcodes.

Write mask field 2070—its content controls, on a per data element position basis, whether that data element position in the destination vector operand reflects the result of the base operation and augmentation operation. Class A instruction templates support merging-writemasking, while class B instruction templates support both merging- and zeroing-writemasking. When merging, vector masks allow any set of elements in the destination to be protected from updates during the execution of any operation (specified by the base operation and the augmentation operation); in other one embodiment, preserving the old value of each element of the destination where the corresponding mask bit has a 0. In contrast, when zeroing vector masks allow any set of elements in the destination to be zeroed during the execution of any operation (specified by the base operation and the augmentation operation); in one embodiment, an element of the destination is set to 0 when the corresponding mask bit has a 0 value. A subset of this functionality is the ability to control the vector length of the operation being performed (that is, the span of elements being modified, from the first to the last one); however, it is not necessary that the elements that are modified be consecutive. Thus, the write mask field 2070 allows for partial vector operations, including loads, stores, arithmetic, logical, etc. While embodiments of the invention are described in which the write mask field's 2070 content selects one of a number of write mask registers that contains the write mask to be used (and thus the write mask field's 2070 content indirectly identifies that masking to be performed), alternative embodiments instead or additional allow the mask write field's 2070 content to directly specify the masking to be performed.

Immediate field 2072—its content allows for the specification of an immediate. This field is optional in the sense that is it not present in an implementation of the generic vector friendly format that does not support immediate and it is not present in instructions that do not use an immediate. Class field 2068—its content distinguishes between different classes of instructions. With reference to FIGS. 20A-B, the contents of this field select between class A and class B instructions. In FIGS. 20A-B, rounded corner squares are used to indicate a specific value is present in a field (e.g., class A 2068A and class B 2068B for the class field 2068 respectively in FIGS. 20A-B).

Instruction Templates of Class A

In the case of the non-memory access 2005 instruction templates of class A, the alpha field 2052 is interpreted as an RS field 2052A, whose content distinguishes which one of the different augmentation operation types are to be performed (e.g., round 2052A.1 and data transform 2052A.2 are respectively specified for the no memory access, round type operation 2010 and the no memory access, data transform type operation 2015 instruction templates), while the beta field 2054 distinguishes which of the operations of the specified type is to be performed. In the no memory access 2005 instruction templates, the scale field 2060, the displacement field 2062A, and the displacement scale filed 2062B are not present.

No-Memory Access Instruction Templates—Full Round Control Type Operation

In the no memory access full round control type operation 2010 instruction template, the beta field 2054 is interpreted as a round control field 2054A, whose content(s) provide static rounding. While in the described embodiments of the invention the round control field 2054A includes a suppress all floating point exceptions (SAE) field 2056 and a round operation control field 2058, alternative embodiments may support may encode both these concepts into the same field or only have one or the other of these concepts/fields (e.g., may have only the round operation control field 2058).

SAE field 2056—its content distinguishes whether or not to disable the exception event reporting; when the SAE field's 2056 content indicates suppression is enabled, a given instruction does not report any kind of floating-point exception flag and does not raise any floating point exception handler.

Round operation control field 2058—its content distinguishes which one of a group of rounding operations to perform (e.g., Round-up, Round-down, Round-towards-zero and Round-to-nearest). Thus, the round operation control field 2058 allows for the changing of the rounding mode on a per instruction basis. In one embodiment of the invention where a processor includes a control register for specifying rounding modes, the round operation control field's 2050 content overrides that register value.

No Memory Access Instruction Templates—Data Transform Type Operation

In the no memory access data transform type operation 2015 instruction template, the beta field 2054 is interpreted as a data transform field 2054B, whose content distinguishes which one of a number of data transforms is to be performed (e.g., no data transform, swizzle, broadcast).

In the case of a memory access 2020 instruction template of class A, the alpha field 2052 is interpreted as an eviction hint field 2052B, whose content distinguishes which one of the eviction hints is to be used (in FIG. 20A, temporal 2052B.1 and non-temporal 2052B.2 are respectively specified for the memory access, temporal 2025 instruction template and the memory access, non-temporal 2030 instruction template), while the beta field 2054 is interpreted as a data manipulation field 2054C, whose content distinguishes which one of a number of data manipulation operations (also known as primitives) is to be performed (e.g., no manipulation; broadcast; up conversion of a source; and down conversion of a destination). The memory access 2020 instruction templates include the scale field 2060, and optionally the displacement field 2062A or the displacement scale field 2062B.

Vector memory instructions perform vector loads from and vector stores to memory, with conversion support. As with regular vector instructions, vector memory instructions transfer data from/to memory in a data element-wise fashion, with the elements that are actually transferred is dictated by the contents of the vector mask that is selected as the write mask.

Memory Access Instruction Templates—Temporal

Temporal data is data likely to be reused soon enough to benefit from caching. This is, however, a hint, and different processors may implement it in different ways, including ignoring the hint entirely.

Memory Access Instruction Templates—Non-Temporal

Non-temporal data is data unlikely to be reused soon enough to benefit from caching in the 1st-level cache and should be given priority for eviction. This is, however, a hint, and different processors may implement it in different ways, including ignoring the hint entirely.

Instruction Templates of Class B

In the case of the instruction templates of class B, the alpha field 2052 is interpreted as a write mask control (Z) field 2052C, whose content distinguishes whether the write masking controlled by the write mask field 2070 should be a merging or a zeroing.

In the case of the non-memory access 2005 instruction templates of class B, part of the beta field 2054 is interpreted as an RL field 2057A, whose content distinguishes which one of the different augmentation operation types are to be performed (e.g., round 2057A.1 and vector length (VSIZE) 2057A.2 are respectively specified for the no memory access, write mask control, partial round control type operation 2012 instruction template and the no memory access, write mask control, VSIZE type operation 2017 instruction template), while the rest of the beta field 2054 distinguishes which of the operations of the specified type is to be performed. In the no memory access 2005 instruction templates, the scale field 2060, the displacement field 2062A, and the displacement scale filed 2062B are not present.

In the no memory access, write mask control, partial round control type operation 2010 instruction template, the rest of the beta field 2054 is interpreted as a round operation field 2059A and exception event reporting is disabled (a given instruction does not report any kind of floating-point exception flag and does not raise any floating point exception handler).

Round operation control field 2059A—just as round operation control field 2058, its content distinguishes which one of a group of rounding operations to perform (e.g., Round-up, Round-down, Round-towards-zero and Round-to-nearest). Thus, the round operation control field 2059A allows for the changing of the rounding mode on a per instruction basis. In one embodiment of the invention where a processor includes a control register for specifying rounding modes, the round operation control field's 2050 content overrides that register value.

In the no memory access, write mask control, VSIZE type operation 2017 instruction template, the rest of the beta field 2054 is interpreted as a vector length field 2059B, whose content distinguishes which one of a number of data vector lengths is to be performed on (e.g., 128, 256, or 512 byte).

In the case of a memory access 2020 instruction template of class B, part of the beta field 2054 is interpreted as a broadcast field 2057B, whose content distinguishes whether or not the broadcast type data manipulation operation is to be performed, while the rest of the beta field 2054 is interpreted the vector length field 2059B. The memory access 2020 instruction templates include the scale field 2060, and optionally the displacement field 2062A or the displacement scale field 2062B.

With regard to the generic vector friendly instruction format 2000, a full opcode field 2074 is shown including the format field 2040, the base operation field 2042, and the data element width field 2064. While one embodiment is shown where the full opcode field 2074 includes all of these fields, the full opcode field 2074 includes less than all of these fields in embodiments that do not support all of them. The full opcode field 2074 provides the operation code (opcode).

The augmentation operation field 2050, the data element width field 2064, and the write mask field 2070 allow these features to be specified on a per instruction basis in the generic vector friendly instruction format.

The combination of write mask field and data element width field create typed instructions in that they allow the mask to be applied based on different data element widths.

The various instruction templates found within class A and class B are beneficial in different situations. In some embodiments of the invention, different processors or different cores within a processor may support only class A, only class B, or both classes. For instance, a high performance general purpose out-of-order core intended for general-purpose computing may support only class B, a core intended primarily for graphics and/or scientific (throughput) computing may support only class A, and a core intended for both may support both (of course, a core that has some mix of templates and instructions from both classes but not all templates and instructions from both classes is within the purview of the invention). Also, a single processor may include multiple cores, all of which support the same class or in which different cores support different class. For instance, in a processor with separate graphics and general purpose cores, one of the graphics cores intended primarily for graphics and/or scientific computing may support only class A, while one or more of the general purpose cores may be high performance general purpose cores with out of order execution and register renaming intended for general-purpose computing that support only class B. Another processor that does not have a separate graphics core, may include one more general purpose in-order or out-of-order cores that support both class A and class B. Of course, features from one class may also be implement in the other class in different embodiments of the invention. Programs written in a high level language would be put (e.g., just in time compiled or statically compiled) into an variety of different executable forms, including: 1) a form having only instructions of the class(es) supported by the target processor for execution; or 2) a form having alternative routines written using different combinations of the instructions of all classes and having control flow code that selects the routines to execute based on the instructions supported by the processor which is currently executing the code.

Exemplary Specific Vector Friendly Instruction Format

FIG. 21 is a block diagram illustrating an exemplary specific vector friendly instruction format according to embodiments of the invention. FIG. 21 shows a specific vector friendly instruction format 2100 that is specific in the sense that it specifies the location, size, interpretation, and order of the fields, as well as values for some of those fields. The specific vector friendly instruction format 2100 may be used to extend the x86 instruction set, and thus some of the fields are similar or the same as those used in the existing x86 instruction set and extension thereof (e.g., AVX). This format remains consistent with the prefix encoding field, real opcode byte field, MOD R/M field, SIB field, displacement field, and immediate fields of the existing x86 instruction set with extensions. The fields from FIG. 20 into which the fields from FIG. 21 map are illustrated.

It should be understood that, although embodiments of the invention are described with reference to the specific vector friendly instruction format 2100 in the context of the generic vector friendly instruction format 2000 for illustrative purposes, the invention is not limited to the specific vector friendly instruction format 2100 except where claimed. For example, the generic vector friendly instruction format 2000 contemplates a variety of possible sizes for the various fields, while the specific vector friendly instruction format 2100 is shown as having fields of specific sizes. By way of specific example, while the data element width field 2064 is illustrated as a one bit field in the specific vector friendly instruction format 2100, the invention is not so limited (that is, the generic vector friendly instruction format 2000 contemplates other sizes of the data element width field 2064).

The generic vector friendly instruction format 2000 includes the following fields listed below in the order illustrated in FIG. 21A.

EVEX Prefix (Bytes 0-3) 2102—is encoded in a four-byte form.

Format Field 2040 (EVEX Byte 0, bits [7:0])—the first byte (EVEX Byte 0) is the format field 2040 and it contains 0x62 (the unique value used for distinguishing the vector friendly instruction format in one embodiment of the invention).

The second-fourth bytes (EVEX Bytes 1-3) include a number of bit fields providing specific capability.

REX field 2105 (EVEX Byte 1, bits [7-5])—consists of a EVEX.R bit field (EVEX Byte 1, bit [7]—R), EVEX.X bit field (EVEX byte 1, bit [6]—X), and 2057BEX byte 1, bit [5]—B). The EVEX.R, EVEX.X, and EVEX.B bit fields provide the same functionality as the corresponding VEX bit fields, and are encoded using is complement form, i.e. ZMM0 is encoded as 1111B, ZMM15 is encoded as 0000B. Other fields of the instructions encode the lower bits of the register indexes as is known in the art (rrr, xxx, and bbb), so that Rrrr, Xxxx, and Bbbb may be formed by adding EVEX.R, EVEX.X, and EVEX.B.

REX' field 2010—this is the first part of the REX' field 2010 and is the EVEX.R' bit field (EVEX Byte 1, bit [4]—R') that is used to encode either the upper 16 or lower 16 of the extended 32 register set. In one embodiment of the invention, this bit, along with others as indicated below, is stored in bit inverted format to distinguish (in the well-known x86 32-bit mode) from the BOUND instruction, whose real opcode byte is 62, but does not accept in the MOD R/M field (described below) the value of 11 in the MOD field; alternative embodiments of the invention do not store this and the other indicated bits below in the inverted format. A value of 1 is used to encode the lower 16 registers. In other words, R'Rrrr is formed by combining EVEX.R', EVEX.R, and the other RRR from other fields.

Opcode map field 2115 (EVEX byte 1, bits [3:0]—mmmm)—its content encodes an implied leading opcode byte (0F, 0F 38, or 0F 3).

Data element width field 2064 (EVEX byte 2, bit [7]—W)—is represented by the notation EVEX.W. EVEX.W is used to define the granularity (size) of the datatype (either 32-bit data elements or 64-bit data elements).

EVEX.vvvv 2120 (EVEX Byte 2, bits [6:3]—vvvv)—the role of EVEX.vvvv may include the following: 1) EVEX.vvvv encodes the first source register operand, specified in inverted (1s complement) form and is valid for instructions with 2 or more source operands; 2) EVEX.vvvv encodes the destination register operand, specified in is complement form for certain vector shifts; or 3) EVEX.vvvv does not encode any operand, the field is reserved and should contain 1111b. Thus, EVEX.vvvv field 2120 encodes the 4 low-order bits of the first source register specifier stored in inverted (1s complement) form. Depending on the instruction, an extra different EVEX bit field is used to extend the specifier size to 32 registers.

EVEX.U 2068 Class field (EVEX byte 2, bit [2]—U)—If EVEX.U=0, it indicates class A or EVEX.U0; if EVEX.0=1, it indicates class B or EVEX.U1.

Prefix encoding field 2125 (EVEX byte 2, bits [1:0]—pp)—provides additional bits for the base operation field. In addition to providing support for the legacy SSE instructions in the EVEX prefix format, this also has the benefit of compacting the SIMD prefix (rather than requiring a byte to express the SIMD prefix, the EVEX prefix requires only 2 bits). In one embodiment, to support legacy SSE instructions that use a SIMD prefix (66H, F2H, F3H) in both the legacy format and in the EVEX prefix format, these legacy SIMD prefixes are encoded into the SIMD prefix encoding field; and at runtime are expanded into the legacy SIMD prefix prior to being provided to the decoder's PLA (so the PLA can execute both the legacy and EVEX format of these legacy instructions without modification). Although newer instructions could use the EVEX prefix encoding field's content directly as an opcode extension, certain embodiments expand in a similar fashion for consistency but allow for different meanings to be specified by these legacy SIMD prefixes. An alternative embodiment may redesign the PLA to support the 2 bit SIMD prefix encodings, and thus not require the expansion.

Alpha field 2052 (EVEX byte 3, bit [7]—EH; also known as EVEX.EH, EVEX.rs, EVEX.RL, EVEX.write mask control, and EVEX.N; also illustrated with α)—as previously described, this field is context specific.

Beta field 2054 (EVEX byte 3, bits [6:4]—SSS, also known as EVEX.$s_{2-0}$, EVEX.$r_{2-0}$, EVEX.rr1, EVEX.LL0, EVEX.LLB; also illustrated with βββ)—as previously described, this field is context specific.

REX' field 2010—this is the remainder of the REX' field and is the EVEX.V' hit field (EVEX Byte 3, bit [3]—V') that may be used to encode either the upper 16 or lower 16 of the extended 32 register set. This bit is stored in bit inverted format. A value of 1 is used to encode the lower 16 registers. In other words, V'VVVV is formed by combining EVEX.V', EVEX.vvvv.

Write mask field 2070 (EVEX byte 3, bits [2:0]—kkk)—its content specifies the index of a register in the write mask registers as previously described. In one embodiment of the invention, the specific value EVEX kkk=000 has a special behavior implying no write mask is used for the particular instruction (this may be implemented in a variety of ways including the use of a write mask hardwired to all ones or hardware that bypasses the masking hardware).

Real Opcode Field 2130 (Byte 4) is also known as the opcode byte. Part of the opcode is specified in this field.

MOD R/M Field 2140 (Byte 5) includes MOD field 2142, Reg field 2144, and R/M field 2146. As previously described, the MOD field's 2142 content distinguishes between memory access and non-memory access operations. The role of Reg field 2144 can be summarized to two situations: encoding either the destination register operand or a source register operand, or be treated as an opcode extension and not used to encode any instruction operand. The role of R/M field 2146 may include the following: encoding the instruction operand that references a memory address, or encoding either the destination register operand or a source register operand.

Scale, Index, Base (SIB) Byte (Byte 6)—As previously described, the scale field's 2050 content is used for memory address generation. SIB.xxx 2154 and SIB.bbb 2156—the contents of these fields have been previously referred to with regard to the register indexes Xxxx and Bbbb.

Displacement field 2062A (Bytes 7-10)—when MOD field 2142 contains 10, bytes 7-10 are the displacement field 2062A, and it works the same as the legacy 32-bit displacement (disp32) and works at byte granularity.

Displacement factor field 2062B (Byte 7)—when MOD field 2142 contains 01, byte 7 is the displacement factor field 2062B. The location of this field is that same as that of the legacy x86 instruction set 8-bit displacement (disp8), which works at byte granularity. Since disp8 is sign extended, it can only address between −128 and 127 bytes offsets; in terms of 64 byte cache lines, disp8 uses 8 bits that can be set to only four really useful values −128, −64, 0, and 64; since a greater range is often needed, disp32 is used; however, disp32 requires 4 bytes. In contrast to disp8 and disp32, the displacement factor field 2062B is a reinterpretation of disp8; when using displacement factor field 2062B, the actual displacement is determined by the content of the displacement factor field multiplied by the size of the memory operand access (N). This type of displacement is referred to as disp8*N. This reduces the average instruction length (a single byte of used for the displacement but with a much greater range). Such compressed displacement is based on the assumption that the effective displacement is multiple of the granularity of the memory access, and hence, the redundant low-order bits of the address offset do not need to be encoded. In other words, the displacement factor field 2062B substitutes the legacy x86 instruction set 8-bit displacement. Thus, the displacement factor field 2062B is encoded the same way as an x86 instruction set 8-bit displacement (so no changes in the ModRM/SIB encoding rules) with the only exception that disp8 is overloaded to disp8*N. In other words, there are no changes in the encoding rules or encoding lengths but only in the interpretation of the displacement value by hardware (which needs to scale the displacement by the size of the memory operand to obtain a byte-wise address offset).

Immediate field 2072 operates as previously described.

Full Opcode Field

FIG. 21B is a block diagram illustrating the fields of the specific vector friendly instruction format 2100 that make up the full opcode field 2074 according to one embodiment of the invention. Specifically, the full opcode field 2074 includes the format field 2040, the base operation field 2042, and the data element width (W) field 2064. The base operation field 2042 includes the prefix encoding field 2125, the opcode map field 2115, and the real opcode field 2130.

Register Index Field

FIG. 21C is a block diagram illustrating the fields of the specific vector friendly instruction format 2100 that make up the register index field 2044 according to one embodiment of the invention. Specifically, the register index field 2044 includes the REX field 2105, the REX' field 2110, the MODR/M.reg field 2144, the MODR/M.r/m field 2146, the VVVV field 2120, xxx field 2154, and the bbb field 2156.

Augmentation Operation Field

FIG. 21D is a block diagram illustrating the fields of the specific vector friendly instruction format 2100 that make up the augmentation operation field 2050 according to one embodiment of the invention. When the class (U) field 2068 contains 0, it signifies EVEX.U0 (class A 2068A); when it contains 1, it signifies EVEX.U1 (class B 2068B). When U=0 and the MOD field 2142 contains 11 (signifying a no memory access operation), the alpha field 2052 (EVEX byte 3, bit [7]—EH) is interpreted as the rs field 2052A. When the rs field 2052A contains a 1 (round 2052A.1), the beta field 2054 (EVEX byte 3, bits [6:4]—SSS) is interpreted as the round control field 2054A. The round control field 2054A includes a one bit SAE field 2056 and a two bit round operation field 2058. When the rs field 2052A contains a 0 (data transform 2052A.2), the beta field 2054 (EVEX byte 3, bits [6:4]—SSS) is interpreted as a three bit data transform field 2054B. When U=0 and the MOD field 2142 contains 00, 01, or 10 (signifying a memory access operation), the alpha field 2052 (EVEX byte 3, bit [7]—EH) is interpreted as the eviction hint (EH) field 2052B and the beta field 2054 (EVEX byte 3, bits [6:4]—SSS) is interpreted as a three bit data manipulation field 2054C.

When U=1, the alpha field 2052 (EVEX byte 3, bit [7]—EH) is interpreted as the write mask control (Z) field 2052C. When U=1 and the MOD field 2142 contains 11 (signifying a no memory access operation), part of the beta field 2054 (EVEX byte 3, bit [4]—$S_0$) is interpreted as the RL field 2057A; when it contains a 1 (round 2057A.1) the rest of the beta field 2054 (EVEX byte 3, bit [6-5]—$S_{2-1}$) is interpreted as the round operation field 2059A, while when the RL field 2057A contains a 0 (VSIZE 2057.A2) the rest of the beta field 2054 (EVEX byte 3, bit [6-5]—$S_{2-1}$) is interpreted as the vector length field 2059B (EVEX byte 3, bit [6-5]—$L_{1-0}$). When U=1 and the MOD field 2142 contains 00, 01, or 10 (signifying a memory access operation), the beta field 2054 (EVEX byte 3, bits [6:4]—SSS) is interpreted as the vector length field 2059B (EVEX byte 3, bit [6-5]—$L_{1-0}$) and the broadcast field 2057B (EVEX byte 3, bit [4]—B).

Exemplary Register Architecture

FIG. 22 is a block diagram of a register architecture 2200 according to one embodiment of the invention. In the embodiment illustrated, there are 32 vector registers 2210 that are 512 bits wide; these registers are referenced as zmm0 through zmm31. The lower order 256 bits of the lower 16 zmm registers are overlaid on registers ymm0-16. The lower order 128 bits of the lower 16 zmm registers (the lower order 128 bits of the ymm registers) are overlaid on registers xmm0-15. The specific vector friendly instruction format 2100 operates on these overlaid register file as illustrated in the below tables.

| Adjustable Vector Length | Class | Operations | Registers |
| --- | --- | --- | --- |
| Instruction Templates that do not include the vector length field 2059B | A (FIG. 20A; U = 0) | 2010, 2015, 2025, 2030 | zmm registers (the vector length is 64 byte) |
| | B (FIG. 20B; U = 1) | 2012 | zmm registers (the vector length is 64 byte) |
| Instruction templates that do include the vector length field 2059B | B (FIG. 20B; U = 1) | 2017, 2027 | zmm, ymm, or xmm registers (the vector length is 64 byte, 32 byte, or 16 byte) depending on the vector length field 2059B |

In other words, the vector length field 2059B selects between a maximum length and one or more other shorter lengths, where each such shorter length is half the length of the preceding length; and instructions templates without the vector length field 2059B operate on the maximum vector length. Further, in one embodiment, the class B instruction templates of the specific vector friendly instruction format 2100 operate on packed or scalar single/double-precision floating point data and packed or scalar integer data. Scalar operations are operations performed on the lowest order data element position in an zmm/ymm/xmm register; the higher order data element positions are either left the same as they were prior to the instruction or zeroed depending on the embodiment.

Write mask registers 2215—in the embodiment illustrated, there are 8 write mask registers (k0 through k7), each 64 bits in size. In an alternate embodiment, the write mask registers 2215 are 16 bits in size. As previously described, in one embodiment of the invention, the vector mask register k0 cannot be used as a write mask; when the encoding that would normally indicate k0 is used for a write mask, it selects a hardwired write mask of 0xFFFF, effectively disabling write masking for that instruction.

General-purpose registers 2225—in the embodiment illustrated, there are sixteen 64-bit general-purpose registers that are used along with the existing x86 addressing modes to address memory operands. These registers are referenced by the names RAX, RBX, RCX, RIX, RBP, RSI, RDI, RSP, and R8 through R15.

Scalar floating point stack register file (x87 stack) 2245, on which is aliased the MMX packed integer flat register file 2250—in the embodiment illustrated, the x87 stack is an eight-element stack used to perform scalar floating-point operations on 32/64/80-bit floating point data using the x87 instruction set extension; while the MMX registers are used to perform operations on 64-bit packed integer data, as well as to hold operands for some operations performed between the MMX and XMM registers.

Alternative embodiments of the invention may use wider or narrower registers. Additionally, alternative embodiments of the invention may use more, less, or different register files and registers.

Exemplary Core Architectures, Processors, and Computer Architectures

Processor cores may be implemented in different ways, for different purposes, and in different processors. For instance, implementations of such cores may include: 1) a general purpose in-order core intended for general-purpose computing; 2) a high performance general purpose out-of-order core intended for general-purpose computing; 3) a special purpose core intended primarily for graphics and/or scientific (throughput) computing. Implementations of different processors may include: 1) a CPU including one or more general purpose in-order cores intended for general-purpose computing and/or one or more general purpose out-of-order cores intended for general-purpose computing; and 2) a coprocessor including one or more special purpose cores intended primarily for graphics and/or scientific (throughput). Such different processors lead to different computer system architectures, which may include: 1) the coprocessor on a separate chip from the CPU; 2) the coprocessor on a separate die in the same package as a CPU; 3) the coprocessor on the same die as a CPU (in which case, such a coprocessor is sometimes referred to as special purpose logic, such as integrated graphics and/or scientific (throughput) logic, or as special purpose cores); and 4) a system on a chip that may include on the same die the described CPU (sometimes referred to as the application core(s) or application processor(s)), the above described coprocessor, and additional functionality. Exemplary core architectures are described next, followed by descriptions of exemplary processors and computer architectures.

Exemplary Core Architectures
In-Order and Out-of-Order Core Block Diagram

FIG. 23A is a block diagram illustrating both an exemplary in-order pipeline and an exemplary register renaming, out-of-order issue/execution pipeline according to embodiments of the invention. FIG. 23B is a block diagram illustrating both an exemplary embodiment of an in-order architecture core and an exemplary register renaming, out-of-order issue/execution architecture core to be included in a processor according to embodiments of the invention. The solid lined boxes in FIGS. 23A-B illustrate the in-order pipeline and in-order core, while the optional addition of the dashed lined boxes illustrates the register renaming, out-of-order issue/execution pipeline and core. Given that the in-order aspect is a subset of the out-of-order aspect, the out-of-order aspect will be described.

In FIG. 23A, a processor pipeline 2300 includes a fetch stage 2302, a length decode stage 2304, a decode stage 2306, an allocation stage 2308, a renaming stage 2310, a scheduling (also known as a dispatch or issue) stage 2312, a register read/memory read stage 2314, an execute stage 2316, a write back/memory write stage 2318, an exception handling stage 2322, and a commit stage 2324. FIG. 23B shows processor core 2390 including a front end unit 2330 coupled to an execution engine unit 2350, and both are coupled to a memory unit 2370. The core 2390 may be a reduced instruction set computing (RISC) core, a complex instruction set computing (CISC) core, a very long instruction word (VLIW) core, or a hybrid or alternative core type. As yet another option, the core 2390 may be a special-purpose core, such as, for example, a network or communication core, compression engine, coprocessor core, general purpose computing graphics processing unit (GPGPU) core, graphics core, or the like.

The front end unit 2330 includes a branch prediction unit 2332 coupled to an instruction cache unit 2334, which is coupled to an instruction translation lookaside buffer (TLB) 2336, which is coupled to an instruction fetch unit 2338, which is coupled to a decode unit 2340. The decode unit 2340 (or decoder) may decode instructions, and generate as an output one or more micro-operations, micro-code entry points, microinstructions, other instructions, or other control signals, which are decoded from, or which otherwise reflect, or are derived from, the original instructions. The decode unit 2340 may be implemented using various different mechanisms. Examples of suitable mechanisms include, but are not limited to, look-up tables, hardware implementations, programmable logic arrays (PLAs), microcode read only memories (ROMs), etc. In one embodiment, the core 2390 includes a microcode ROM or other medium that stores microcode for certain macroinstructions (e.g., in decode unit 2340 or otherwise within the front end unit 2330). The decode unit 2340 is coupled to a rename/allocator unit 2352 in the execution engine unit 2350.

The execution engine unit 2350 includes the rename/allocator unit 2352 coupled to a retirement unit 2354 and a set of one or more scheduler unit(s) 2356. The scheduler unit(s) 2356 represents any number of different schedulers, including reservations stations, central instruction window, etc. The scheduler unit(s) 2356 is coupled to the physical register file(s) unit(s) 2358. Each of the physical register file(s) units 2358 represents one or more physical register files, different ones of which store one or more different data types, such as scalar integer, scalar floating point, packed integer, packed floating point, vector integer, vector floating point, status (e.g., an instruction pointer that is the address of the next instruction to be executed), etc. In one embodiment, the physical register file(s) unit 2358 comprises a vector registers unit, a write mask registers unit, and a scalar registers unit. These register units may provide architectural vector registers, vector mask registers, and general purpose registers. The physical register file(s) unit(s) 2358 is overlapped by the retirement unit 2354 to illustrate various ways in which register renaming and out-of-order execution may be implemented (e.g., using a reorder buffer(s) and a retirement register file(s); using a future file(s), a history buffer(s), and a retirement register file(s); using a register maps and a pool of registers; etc.). The retirement unit 2354 and the physical register file(s) unit(s) 2358 are coupled to the execution cluster(s) 2360. The execution cluster(s) 2360 includes a set of one or more execution units 2362 and a set of one or more memory access units 2364. The execution units 2362 may perform various operations (e.g., shifts, addition, subtraction, multiplication) and on various types of data (e.g., scalar floating point, packed integer, packed floating point, vector integer, vector floating point). While some embodiments may include a number of execution units dedicated to specific functions or sets of functions, other embodiments may include only one execution unit or multiple execution units that all perform all functions. The scheduler unit(s) 2356, physical register file(s) unit(s) 2358, and execution cluster(s) 2360 are shown as being possibly plural because certain embodiments create separate pipelines for certain types of data/operations (e.g., a scalar integer pipeline, a scalar floating point/packed integer/packed floating point/vector integer/vector floating point pipeline, and/or a memory access pipeline that each have their own scheduler unit, physical register file(s) unit, and/or execution cluster—and in the case of a separate memory access pipeline, certain embodiments are implemented in which only the execution cluster of this pipeline has the memory access unit(s) 2364). It should also be understood that where separate pipelines are used, one or more of these pipelines may be out-of-order issue/execution and the rest in-order.

The set of memory access units 2364 is coupled to the memory unit 2370, which includes a data TLB unit 2372 coupled to a data cache unit 2374 coupled to a level 2 (L2) cache unit 2376. In one exemplary embodiment, the memory access units 2364 may include a load unit, a store address unit, and a store data unit, each of which is coupled to the data TLB unit 2372 in the memory unit 2370. The instruction cache unit 2334 is further coupled to a level 2 (L2) cache unit 2376 in the memory unit 2370. The L2 cache unit 2376 is coupled to one or more other levels of cache and eventually to a main memory.

By way of example, the exemplary register renaming, out-of-order issue/execution core architecture may implement the pipeline 2300 as follows: 1) the instruction fetch 2338 performs the fetch and length decoding stages 2302 and 2304; 2) the decode unit 2340 performs the decode stage 2306; 3) the rename/allocator unit 2352 performs the allocation stage 2308 and renaming stage 2310; 4) the scheduler unit(s) 2356 performs the schedule stage 2312; 5) the physical register file(s) unit(s) 2358 and the memory unit 2370 perform the register read/memory read stage 2314; the execution cluster 2360 perform the execute stage 2316; 6) the memory unit 2370 and the physical register file(s) unit(s) 2358 perform the write back/memory write stage 2318; 7) various units may be involved in the exception handling stage 2322; and 8) the retirement unit 2354 and the physical register file(s) unit(s) 2358 perform the commit stage 2324.

The core 2390 may support one or more instructions sets (e.g., the x86 instruction set (with some extensions that have been added with newer versions); the MIPS instruction set of MIPS Technologies of Sunnyvale, Calif.; the ARM instruction set (with optional additional extensions such as NEON) of ARM Holdings of Sunnyvale, Calif.), including the instruction(s) described herein. In one embodiment, the core 2390 includes logic to support a packed data instruction set extension (e.g., AVX1, AVX2), thereby allowing the operations used by many multimedia applications to be performed using packed data.

It should be understood that the core may support multithreading (executing two or more parallel sets of operations or threads), and may do so in a variety of ways including time sliced multithreading, simultaneous multithreading (where a single physical core provides a logical core for each of the threads that physical core is simultaneously multithreading), or a combination thereof (e.g., time sliced fetching and decoding and simultaneous multithreading thereafter such as in the Intel® Hyperthreading technology).

While register renaming is described in the context of out-of-order execution, it should be understood that register renaming may be used in an in-order architecture. While the illustrated embodiment of the processor also includes separate instruction and data cache units 2334/2374 and a shared L2 cache unit 2376, alternative embodiments may have a single internal cache for both instructions and data, such as, for example, a Level 1 (L1) internal cache, or multiple levels of internal cache. In some embodiments, the system may include a combination of an internal cache and an external cache that is external to the core and/or the processor. Alternatively, all of the cache may be external to the core and/or the processor.

Specific Exemplary in-Order Core Architecture

Figure 24B:
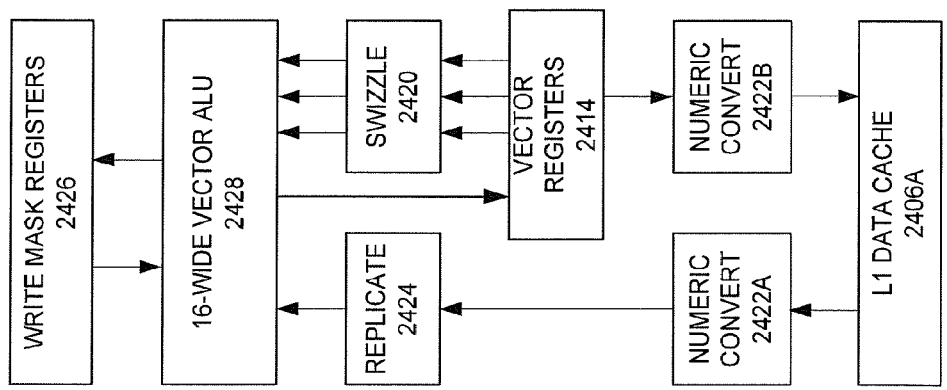
FIG. 24B is an expanded view of part of the processor core in FIG. 24A according to embodiments of the invention.
Figure 24A:
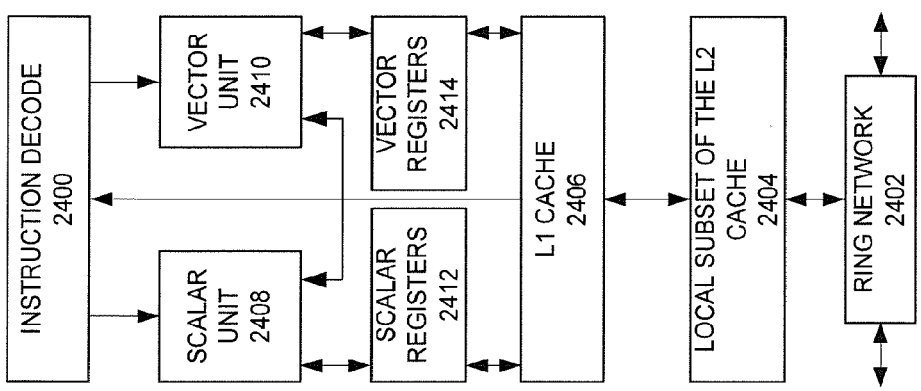
FIG. 24A is a block diagram of a single processor core, along with its connection to the on-die interconnect network and with its local subset of the Level 2 (L2) cache, according to embodiments of the invention.

FIGS. 24A-B illustrate a block diagram of a more specific exemplary in-order core architecture, which core would be one of several logic blocks (including other cores of the same type and/or different types) in a chip. The logic blocks communicate through a high-bandwidth interconnect network (e.g., a ring network) with some fixed function logic, memory I/O interfaces, and other necessary I/O logic, depending on the application.

FIG. 24A is a block diagram of a single processor core, along with its connection to the on-die interconnect network 2402 and with its local subset of the Level 2 (L2) cache 2404, according to embodiments of the invention. In one embodiment, an instruction decoder 2400 supports the x86 instruction set with a packed data instruction set extension. An L1 cache 2406 allows low-latency accesses to cache memory into the scalar and vector units. While in one embodiment (to simplify the design), a scalar unit 2408 and a vector unit 2410 use separate register sets (respectively, scalar registers 2412 and vector registers 2414) and data transferred between them is written to memory and then read back in from a level 1 (L1) cache 2406, alternative embodiments of the invention may use a different approach (e.g., use a single register set or include a communication path that allow data to be transferred between the two register files without being written and read back).

The local subset of the L2 cache 2404 is part of a global L2 cache that is divided into separate local subsets, one per processor core. Each processor core has a direct access path to its own local subset of the L2 cache 2404. Data read by a processor core is stored in its L2 cache subset 2404 and can be accessed quickly, in parallel with other processor cores accessing their own local L2 cache subsets. Data written by a processor core is stored in its own L2 cache subset 2404 and is flushed from other subsets, if necessary. The ring network ensures coherency for shared data. The ring network is bi-directional to allow agents such as processor cores, L2 caches and other logic blocks to communicate with each other within the chip. Each ring data-path is 1012-bits wide per direction.

FIG. 24B is an expanded view of part of the processor core in FIG. 24A according to embodiments of the invention. FIG. 24B includes an L1 data cache 2406A part of the L1 cache 2404, as well as more detail regarding the vector unit 2410 and the vector registers 2414. Specifically, the vector unit 2410 is a 16-wide vector processing unit (VPU) (see the 16-wide ALU 2428), which executes one or more of integer, single-precision float, and double-precision float instructions. The VPU supports swizzling the register inputs with swizzle unit 2420, numeric conversion with numeric convert units 2422A-B, and replication with replication unit 2424 on the memory input. Write mask registers 2426 allow predicating resulting vector writes.

Processor with Integrated Memory Controller and Graphics

Figure 25:
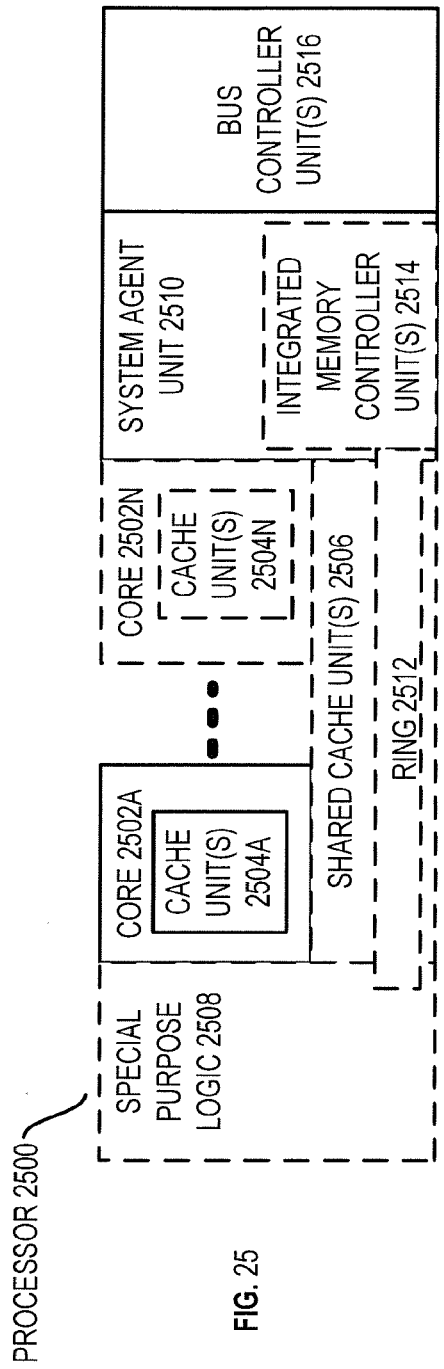
FIG. 25 is a block diagram of a processor that may have more than one core, may have an integrated memory controller, and may have integrated graphics according to embodiments of the invention.

FIG. 25 is a block diagram of a processor 2500 that may have more than one core, may have an integrated memory controller, and may have integrated graphics according to embodiments of the invention. The solid lined boxes in FIG. 25 illustrate a processor 2500 with a single core 2502A, a system agent 2510, a set of one or more bus controller units 2516, while the optional addition of the dashed lined boxes illustrates an alternative processor 2500 with multiple cores 2502A-N, a set of one or more integrated memory controller unit(s) 2514 in the system agent unit 2510, and special purpose logic 2508.

Thus, different implementations of the processor 2500 may include: 1) a CPU with the special purpose logic 2508 being integrated graphics and/or scientific (throughput) logic (which may include one or more cores), and the cores 2502A-N being one or more general purpose cores (e.g., general purpose in-order cores, general purpose out-of-order cores, a combination of the two); 2) a coprocessor with the cores 2502A-N being a large number of special purpose cores intended primarily for graphics and/or scientific (throughput); and 3) a coprocessor with the cores 2502A-N being a large number of general purpose in-order cores. Thus, the processor 2500 may be a general-purpose processor, coprocessor or special-purpose processor, such as, for example, a network or communication processor, compression engine, graphics processor, GPGPU (general purpose graphics processing unit), a high-throughput many integrated core (MIC) coprocessor (including 30 or more cores), embedded processor, or the like. The processor may be implemented on one or more chips. The processor 2500 may be a part of and/or may be implemented on one or more substrates using any of a number of process technologies, such as, for example, BiCMOS, CMOS, or NMOS. The memory hierarchy includes one or more levels of cache within the cores, a set or one or more shared cache units 2506, and external memory (not shown) coupled to the set of integrated memory controller units 2514. The set of shared cache units 2506 may include one or more mid-level caches, such as level 2 (L2), level 3 (L3), level 4 (L4), or other levels of cache, a last level cache (LLC), and/or combinations thereof. While in one embodiment a ring based interconnect unit 2512 interconnects the integrated graphics logic 2508, the set of shared cache units 2506, and the system agent unit 2510/integrated memory controller unit(s) 2514, alternative embodiments may use any number of well-known techniques for interconnecting such units. In one embodiment, coherency is maintained between one or more cache units 2506 and cores 2502-A-N.

In some embodiments, one or more of the cores 2502A-N are capable of multi-threading. The system agent 2510 includes those components coordinating and operating cores 2502A-N. The system agent unit 2510 may include for example a power control unit (PCU) and a display unit. The PCU may be or include logic and components needed for regulating the power state of the cores 2502A-N and the integrated graphics logic 2508. The display unit is for driving one or more externally connected displays.

The cores 2502A-N may be homogenous or heterogeneous in terms of architecture instruction set; that is, two or more of the cores 2502A-N may be capable of execution the same instruction set, while others may be capable of executing only a subset of that instruction set or a different instruction set.

Exemplary Computer Architectures

Figure 26:
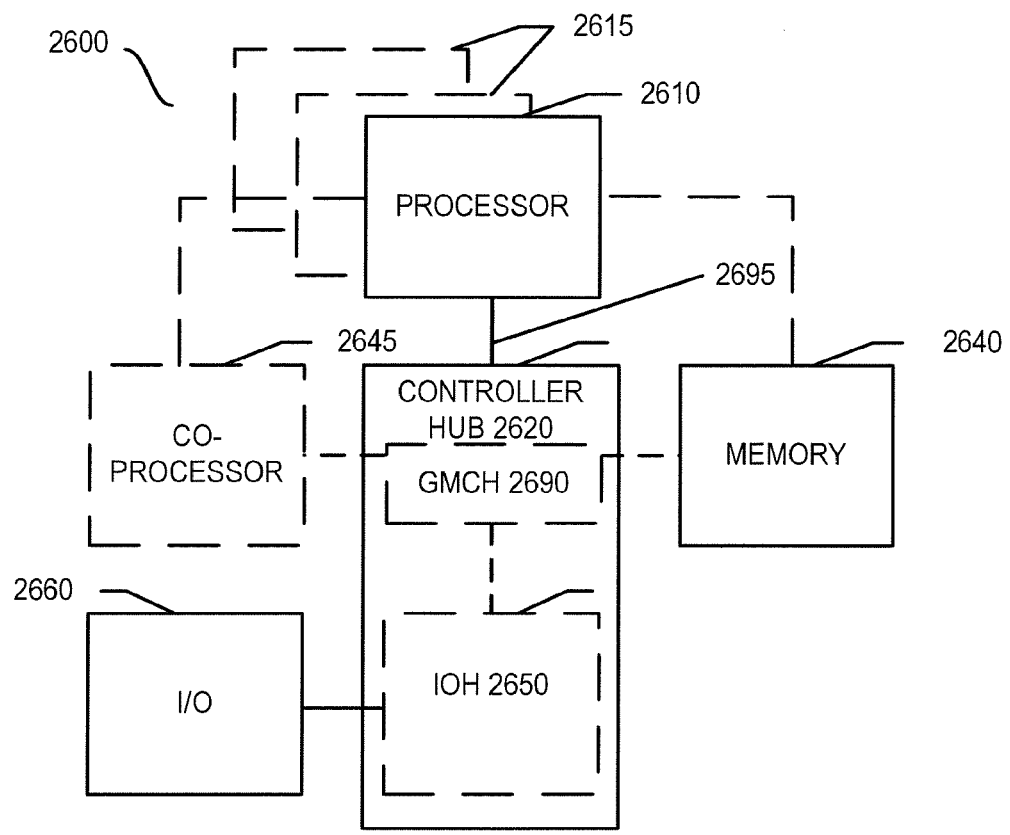
FIG. 26, shown is a block diagram of a system in accordance with one embodiment of the present invention.

FIGS. 26-29 are block diagrams of exemplary computer architectures. Other system designs and configurations known in the arts for laptops, desktops, handheld PCs, personal digital assistants, engineering workstations, servers, network devices, network hubs, switches, embedded processors, digital signal processors (DSPs), graphics devices, video game devices, set-top boxes, micro controllers, cell phones, portable media players, hand held devices, and various other electronic devices, are also suitable. In general, a huge variety of systems or electronic devices capable of incorporating a processor and/or other execution logic as disclosed herein are generally suitable. Referring now to FIG. 26, shown is a block diagram of a system 2600 in accordance with one embodiment of the present invention. The system 2600 may include one or more processors 2610, 2615, which are coupled to a controller hub 2620. In one embodiment the controller hub 2620 includes a graphics memory controller hub (GMCH) 2690 and an Input/Output Hub (IOH) 2650 (which may be on separate chips); the GMCH 2690 includes memory and graphics controllers to which are coupled memory 2640 and a coprocessor 2645; the IOH 2650 is couples input/output (I/O) devices 2660 to the GMCH 2690. Alternatively, one or both of the memory and graphics controllers are integrated within the processor (as described herein), the memory 2640 and the coprocessor 2645 are coupled directly to the processor 2610, and the controller hub 2620 in a single chip with the IOH 2650.

The optional nature of additional processors 2615 is denoted in FIG. 26 with broken lines. Each processor 2610, 2615 may include one or more of the processing cores described herein and may be some version of the processor 2500.

The memory 2640 may be, for example, dynamic random access memory (DRAM), phase change memory (PCM), or a combination of the two. For at least one embodiment, the controller hub 2620 communicates with the processor(s) 2610, 2615 via a multi-drop bus, such as a frontside bus (FSB), point-to-point interface such as QuickPath Interconnect (QPI), or similar connection 2695.

In one embodiment, the coprocessor 2645 is a special-purpose processor, such as, for example, a high-throughput MIC processor, a network or communication processor, compression engine, graphics processor, GPGPU, embedded processor, or the like. In one embodiment, controller hub 2620 may include an integrated graphics accelerator.

There can be a variety of differences between the physical resources 2610, 2615 in terms of a spectrum of metrics of merit including architectural, microarchitectural, thermal, power consumption characteristics, and the like.

In one embodiment, the processor 2610 executes instructions that control data processing operations of a general type. Embedded within the instructions may be coprocessor instructions. The processor 2610 recognizes these coprocessor instructions as being of a type that should be executed by the attached coprocessor 2645. Accordingly, the processor 2610 issues these coprocessor instructions (or control signals representing coprocessor instructions) on a coprocessor bus or other interconnect, to coprocessor 2645. Coprocessor(s) 2645 accept and execute the received coprocessor instructions.

Figure 27:
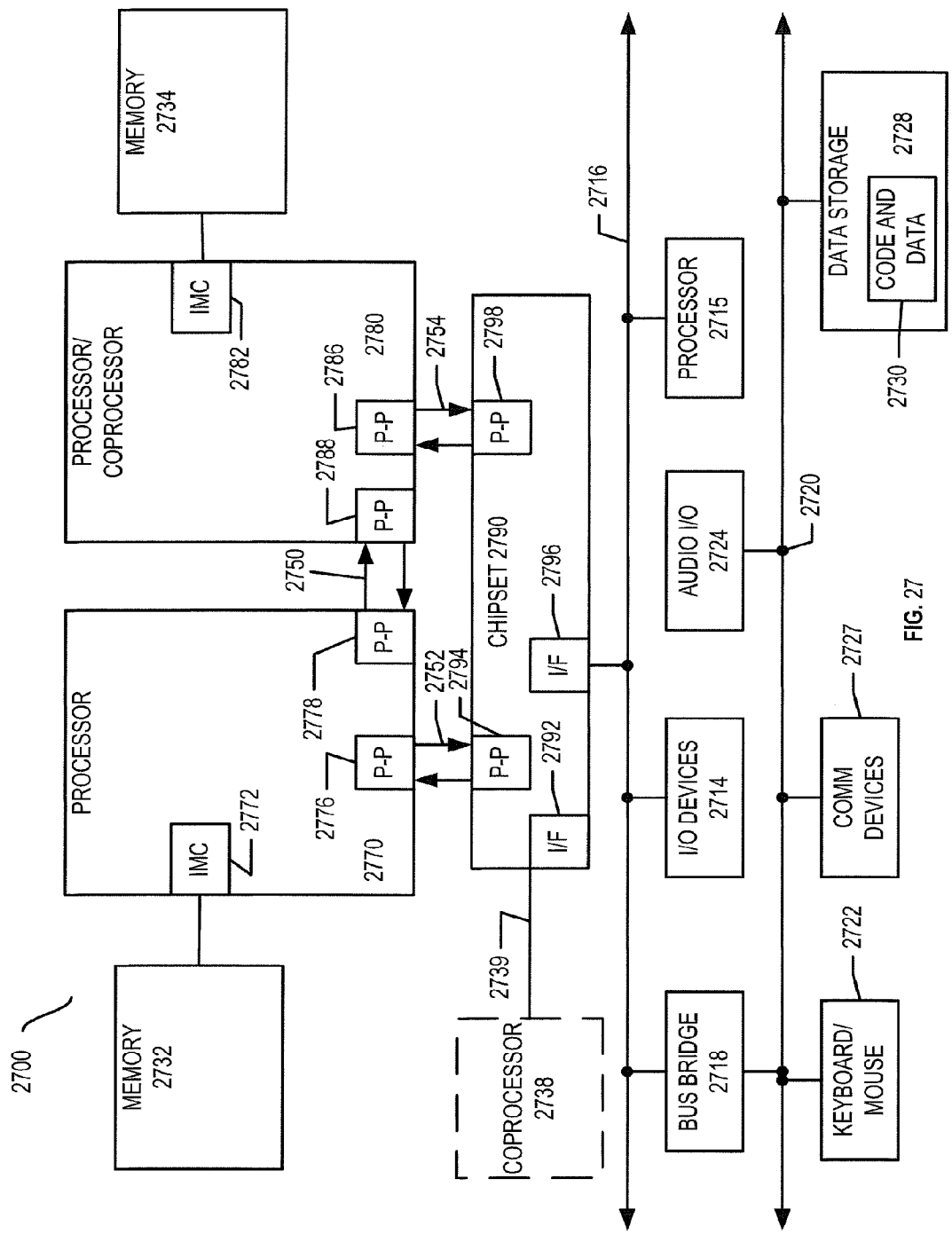
FIG. 27, shown is a block diagram of a first more specific exemplary system in accordance with an embodiment of the present invention.

Referring now to FIG. 27, shown is a block diagram of a first more specific exemplary system 2700 in accordance with an embodiment of the present invention. As shown in FIG. 27, multiprocessor system 2700 is a point-to-point interconnect system, and includes a first processor 2770 and a second processor 2780 coupled via a point-to-point interconnect 2750. Each of processors 2770 and 2780 may be some version of the processor 2500. In one embodiment of the invention, processors 2770 and 2780 are respectively processors 2610 and 2615, while coprocessor 2738 is coprocessor 2645. In another embodiment, processors 2770 and 2780 are respectively processor 2610 coprocessor 2645.

Processors 2770 and 2780 are shown including integrated memory controller (IMC) units 2772 and 2782, respectively. Processor 2770 also includes as part of its bus controller units point-to-point (P-P) interfaces 2776 and 2778; similarly, second processor 2780 includes P-P interfaces 2786 and 2788. Processors 2770, 2780 may exchange information via a point-to-point (P-P) interface 2750 using P-P interface circuits 2778, 2788. As shown in FIG. 27, IMCs 2772 and 2782 couple the processors to respective memories, namely a memory 2732 and a memory 2734, which may be portions of main memory locally attached to the respective processors.

Processors 2770, 2780 may each exchange information with a chipset 2790 via individual P-P interfaces 2752, 2754 using point to point interface circuits 2776, 2794, 2786, 2798. Chipset 2790 may optionally exchange information with the coprocessor 2738 via a high-performance interface 2739. In one embodiment, the coprocessor 2738 is a special-purpose processor, such as, for example, a high-throughput MIC processor, a network or communication processor, compression engine, graphics processor, GPGPU, embedded processor, or the like.

A shared cache (not shown) may be included in either processor or outside of both processors, yet connected with the processors via P-P interconnect, such that either or both processors' local cache information may be stored in the shared cache if a processor is placed into a low power mode.

Chipset 2790 may be coupled to a first bus 2716 via an interface 2796. In one embodiment, first bus 2716 may be a Peripheral Component Interconnect (PCI) bus, or a bus such as a PCI Express bus or another third generation I/O interconnect bus, although the scope of the present invention is not so limited.

As shown in FIG. 27, various I/O devices 2714 may be coupled to first bus 2716, along with a bus bridge 2718 which couples first bus 2716 to a second bus 2720. In one embodiment, one or more additional processor(s) 2715, such as coprocessors, high-throughput MIC processors, GPGPU's, accelerators (such as, e.g., graphics accelerators or digital signal processing (DSP) units), field programmable gate arrays, or any other processor, are coupled to first bus 2716. In one embodiment, second bus 2720 may be a low pin count (LPC) bus. Various devices may be coupled to a second bus 2720 including, for example, a keyboard and/or mouse 2722, communication devices 2727 and a storage unit 2728 such as a disk drive or other mass storage device which may include instructions/code and data 2730, in one embodiment. Further, an audio I/O 2724 may be coupled to the second bus 2720. Note that other architectures are possible. For example, instead of the point-to-point architecture of FIG. 27, a system may implement a multi-drop bus or other such architecture.

Figure 28:
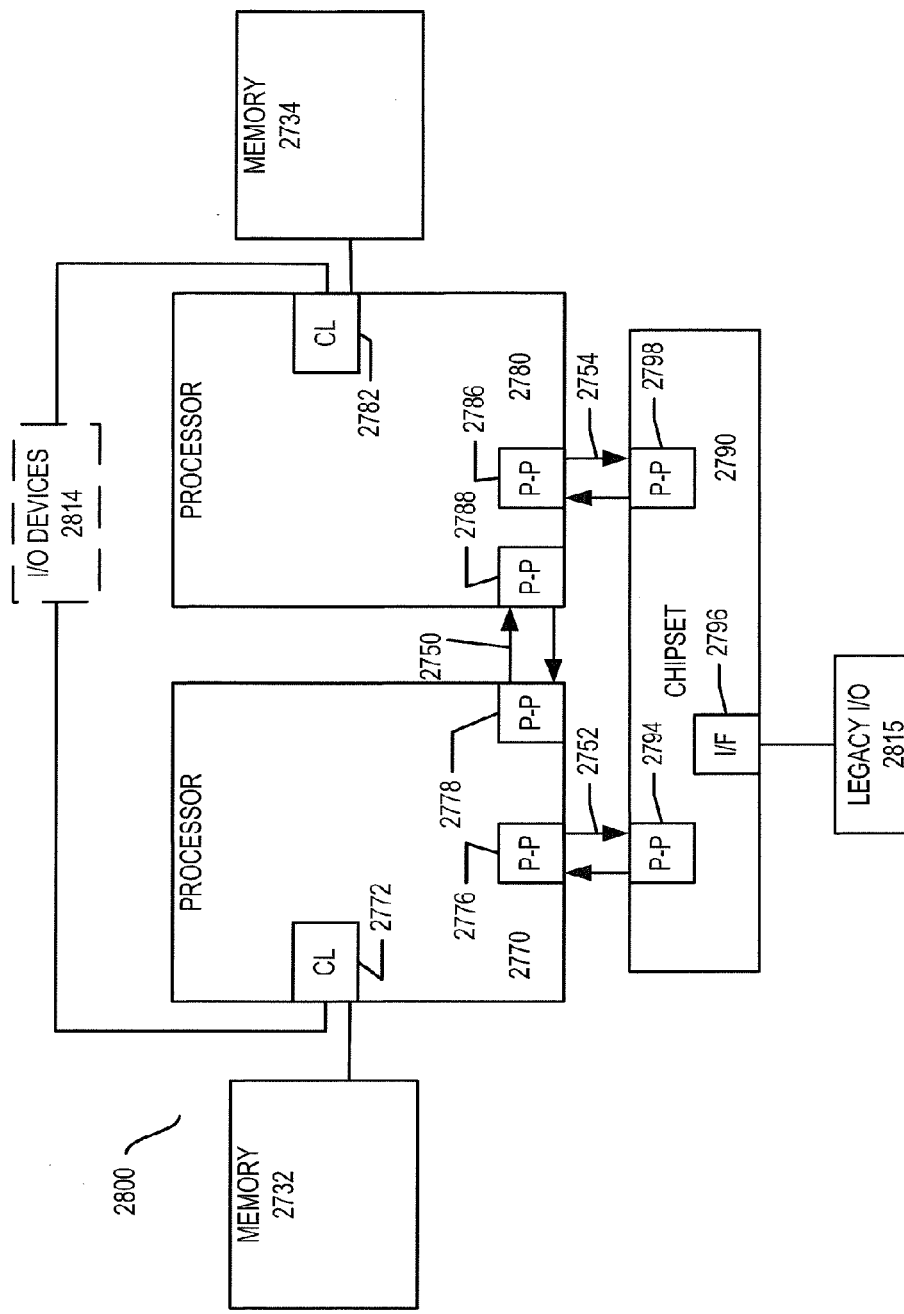
FIG. 28, shown is a block diagram of a second more specific exemplary system in accordance with an embodiment of the present invention.

Referring now to FIG. 28, shown is a block diagram of a second more specific exemplary system 2800 in accordance with an embodiment of the present invention. Like elements in FIGS. 27 and 28 bear like reference numerals, and certain aspects of FIG. 27 have been omitted from FIG. 28 in order to avoid obscuring other aspects of FIG. 28.

FIG. 28 illustrates that the processors 2770, 2780 may include integrated memory and I/O control logic ("CL") 2772 and 2782, respectively. Thus, the CL 2772, 2782 include integrated memory controller units and include I/O control logic. FIG. 28 illustrates that not only are the memories 2732, 2734 coupled to the CL 2772, 2782, but also that I/O devices 2814 are also coupled to the control logic 2772, 2782. Legacy I/O devices 2815 are coupled to the chipset 2790.

Figure 29:
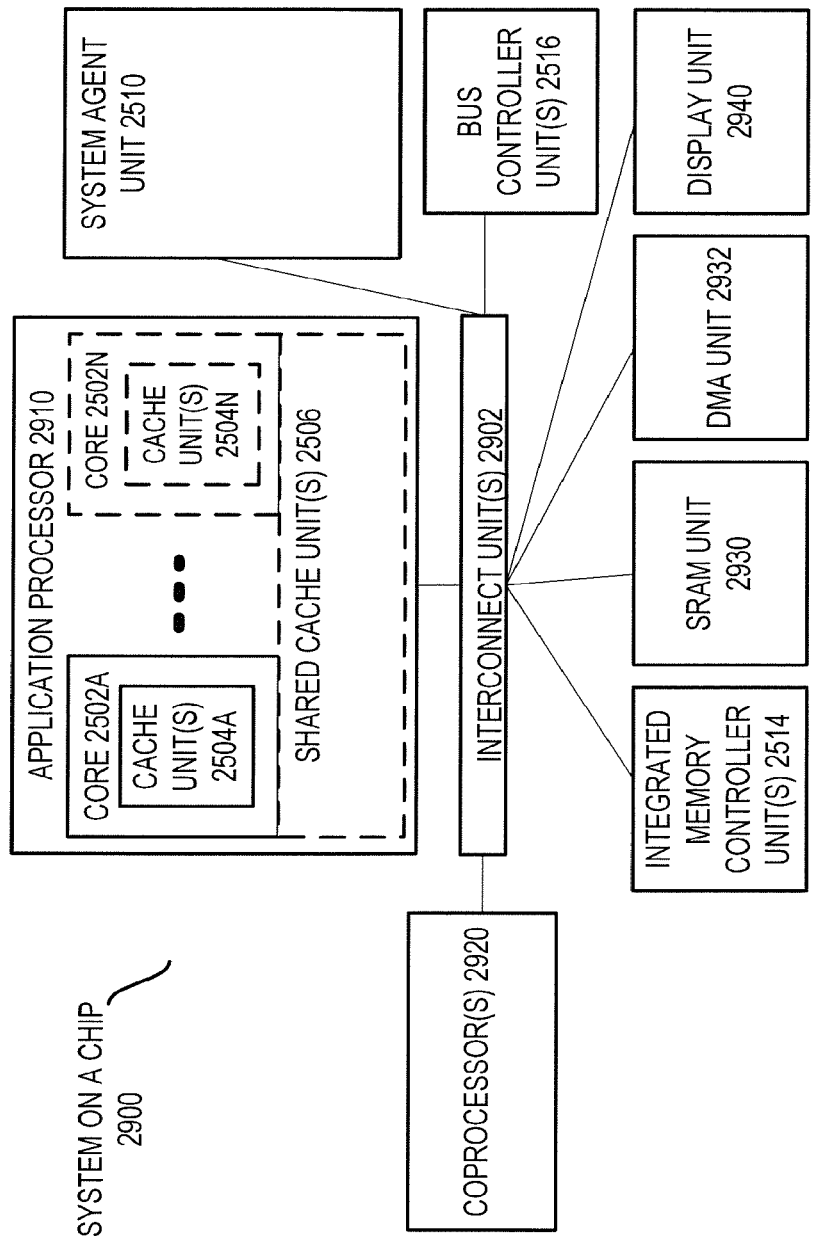
FIG. 29, shown is a block diagram of a SoC in accordance with an embodiment of the present invention.

Referring now to FIG. 29, shown is a block diagram of a SoC 2900 in accordance with an embodiment of the present invention. Similar elements in FIG. 25 bear like reference numerals. Also, dashed lined boxes are optional features on more advanced SoCs. In FIG. 29, an interconnect unit(s) 2902 is coupled to: an application processor 2910 which includes a set of one or more cores 202A-N and shared cache unit(s) 2506; a system agent unit 2510; a bus controller unit(s) 2516; an integrated memory controller unit(s) 2514; a set or one or more coprocessors 2920 which may include integrated graphics logic, an image processor, an audio processor, and a video processor; an static random access memory (SRAM) unit 2930; a direct memory access (DMA) unit 2932; and a display unit 2940 for coupling to one or more external displays. In one embodiment, the coprocessor(s) 2920 include a special-purpose processor, such as, for example, a network or communication processor, compression engine, GPGPU, a high-throughput MIC processor, embedded processor, or the like.

Embodiments of the mechanisms disclosed herein may be implemented in hardware, software, firmware, or a combination of such implementation approaches. Embodiments of the invention may be implemented as computer programs or program code executing on programmable systems comprising at least one processor, a storage system (including volatile and non-volatile memory and/or storage elements), at least one input device, and at least one output device.

Program code, such as code 2730 illustrated in FIG. 27, may be applied to input instructions to perform the functions described herein and generate output information. The output information may be applied to one or more output devices, in known fashion. For purposes of this application, a processing system includes any system that has a processor, such as, for example; a digital signal processor (DSP), a microcontroller, an application specific integrated circuit (ASIC), or a microprocessor.

The program code may be implemented in a high level procedural or object oriented programming language to communicate with a processing system. The program code may also be implemented in assembly or machine language, if desired. In fact, the mechanisms described herein are not limited in scope to any particular programming language. In any case, the language may be a compiled or interpreted language.

One or more aspects of at least one embodiment may be implemented by representative instructions stored on a machine-readable medium which represents various logic within the processor, which when read by a machine causes the machine to fabricate logic to perform the techniques described herein. Such representations, known as "IP cores" may be stored on a tangible, machine readable medium and supplied to various customers or manufacturing facilities to load into the fabrication machines that actually make the logic or processor.

Such machine-readable storage media may include, without limitation, non-transitory, tangible arrangements of articles manufactured or formed by a machine or device, including storage media such as hard disks, any other type of disk including floppy disks, optical disks, compact disk read-only memories (CD-ROMs), compact disk rewritable's (CD-RWs), and magneto-optical disks, semiconductor devices such as read-only memories (ROMs), random access memories (RAMs) such as dynamic random access memories (DRAMs), static random access memories (SRAMs), erasable programmable read-only memories (EPROMs), flash memories, electrically erasable programmable read-only memories (EEPROMs), phase change memory (PCM), magnetic or optical cards, or any other type of media suitable for storing electronic instructions.

Accordingly, embodiments of the invention also include non-transitory, tangible machine-readable media containing instructions or containing design data, such as Hardware Description Language (HDL), which defines structures, circuits, apparatuses, processors and/or system features described herein. Such embodiments may also be referred to as program products.

Emulation (Including Binary Translation, Code Morphing, Etc.)

In some cases, an instruction converter may be used to convert an instruction from a source instruction set to a target instruction set. For example, the instruction converter may translate (e.g., using static binary translation, dynamic binary translation including dynamic compilation), morph, emulate, or otherwise convert an instruction to one or more other instructions to be processed by the core. The instruction converter may be implemented in software, hardware, firmware, or a combination thereof. The instruction converter may be on processor, off processor, or part on and part off processor.

Figure 30:
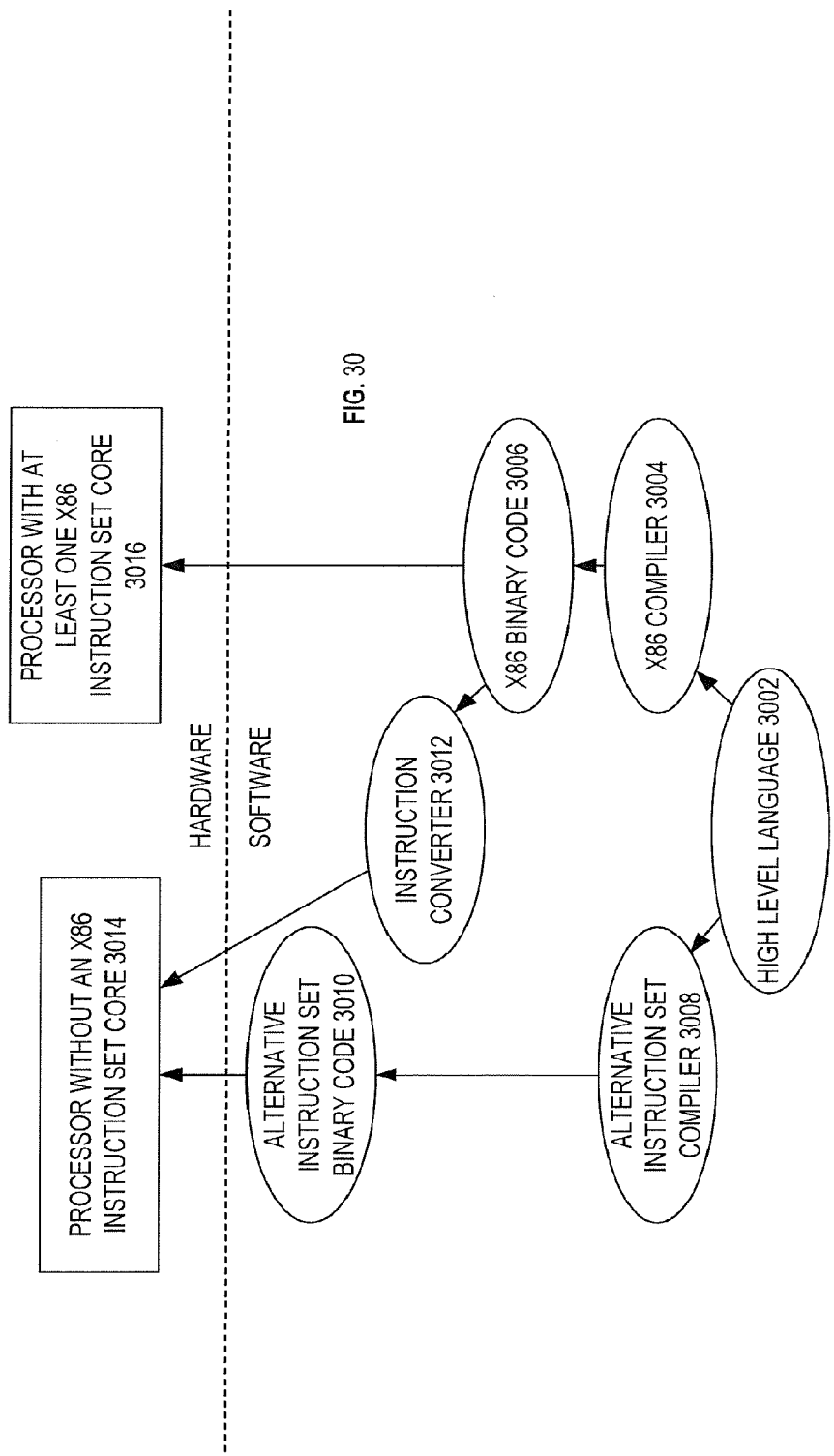
FIG. 30 is a block diagram contrasting the use of a software instruction converter to convert binary instructions in a source instruction set to binary instructions in a target instruction set according to embodiments of the invention.

FIG. 30 is a block diagram contrasting the use of a software instruction converter to convert binary instructions in a source instruction set to binary instructions in a target instruction set according to embodiments of the invention. In the illustrated embodiment, the instruction converter is a software instruction converter, although alternatively the instruction converter may be implemented in software, firmware, hardware, or various combinations thereof. FIG. 30 shows a program in a high level language 3002 may be compiled using an x86 compiler 3004 to generate x86 binary code 3006 that may be natively executed by a processor with at least one x86 instruction set core 3016. The processor with at least one x86 instruction set core 3016 represents any processor that can perform substantially the same functions as an Intel processor with at least one x86 instruction set core by compatibly executing or otherwise processing (1) a substantial portion of the instruction set of the Intel x86 instruction set core or (2) object code versions of applications or other software targeted to run on an Intel processor with at least one x86 instruction set core, in order to achieve substantially the same result as an Intel processor with at least one x86 instruction set core. The x86 compiler 3004 represents a compiler that is operable to generate x86 binary code 3006 (e.g., object code) that can, with or without additional linkage processing, be executed on the processor with at least one x86 instruction set core 3016. Similarly, FIG. 30 shows the program in the high level language 3002 may be compiled using an alternative instruction set compiler 3008 to generate alternative instruction set binary code 3010 that may be natively executed by a processor without at least one x86 instruction set core 3014 (e.g., a processor with cores that execute the MIPS instruction set of MIPS Technologies of Sunnyvale, Calif. and/or that execute the ARM instruction set of ARM Holdings of Sunnyvale, Calif.). The instruction converter 3012 is used to convert the x86 binary code 3006 into code that may be natively executed by the processor without an x86 instruction set core 3014. This converted code is not likely to be the same as the alternative instruction set binary code 3010 because an instruction converter capable of this is difficult to make; however, the converted code will accomplish the general operation and be made up of instructions from the alternative instruction set. Thus, the instruction converter 3012 represents software, firmware, hardware, or a combination thereof that, through emulation, simulation or any other process, allows a processor or other electronic device that does not have an x86 instruction set processor or core to execute the x86 binary code 3006.

In the description and claims, the terms "coupled" and/or "connected," along with their derivatives, have be used. It should be understood that these terms are not intended as synonyms for each other. Rather, in particular embodiments, "connected" may be used to indicate that two or more elements are in direct physical or electrical contact with each other. "Coupled" may mean that two or more elements are in direct physical or electrical contact. However, "coupled" may also mean that two or more elements are not in direct contact with each other, but yet still co-operate or interact with each other. For example, an execution unit may be coupled with a register or a decoder through one or more intervening components. In the figures, arrows are used to show couplings and/or connections.

In the description and claims, the term "logic" may have been used. As used herein, the term logic may include hardware, firmware, software, or various combinations thereof. Examples of logic include integrated circuitry, application specific integrated circuits, analog circuits, digital circuits, programmed logic devices, memory devices including instructions, etc. In some embodiments, the logic may include transistors and/or gates potentially along with other circuitry components.

In the description above, specific details have been set forth in order to provide a thorough understanding of the embodiments. However, other embodiments may be practiced without some of these specific details. The scope of the invention is not to be determined by the specific examples provided above but only by the claims below. All equivalent relationships to those illustrated in the drawings and described in the specification are encompassed within embodiments. In other instances, well-known circuits, structures, devices, and operations have been shown in block diagram form or without detail in order to avoid obscuring the understanding of the description. Where multiple components have been shown and described, in some cases these multiple components may be incorporated into one component. Where a single component has been shown and described, where possible this single component may be separated into two or more components if desired.

Certain methods disclosed herein have been shown and described in a basic form, although operations may optionally be added to and/or removed from the methods. In addition, a particular order of the operations may have been shown and/or described, although alternate embodiments may perform certain operations in different order, combine certain operations, overlap certain operations, etc.

Certain operations may be performed by hardware components and/or may be embodied in a machine-executable or circuit-executable instruction that may be used to cause and/or result in a hardware component (e.g., a processor, portion of a processor, circuit, etc.) programmed with the instruction performing the operations. The hardware component may include a general-purpose or special-purpose hardware component. The operations may be performed by a combination of hardware, software, and/or firmware. The hardware component may include specific or particular logic (e.g., circuitry potentially combined with software and/or firmware) that is operable to execute and/or process the instruction and store a result in response to the instruction (e.g., in response to one or more microinstructions or other control signals derived from the instruction).

Reference throughout this specification to "one embodiment," "an embodiment," "one or more embodiments,"

"some embodiments," for example, indicates that a particular feature may be included in the practice of the invention but is not necessarily required to be. Similarly, in the description various features are sometimes grouped together in a single embodiment, Figure, or description thereof for the purpose of streamlining the disclosure and aiding in the understanding of various inventive aspects. This method of disclosure, however, is not to be interpreted as reflecting an intention that the invention requires more features than are expressly recited in each claim. Rather, as the following claims reflect, inventive aspects lie in less than all features of a single disclosed embodiment. Thus, the claims following the Detailed Description are hereby expressly incorporated into this Detailed Description, with each claim standing on its own as a separate embodiment of the invention.

What is claimed is:

1. A method comprising:
receiving an instruction, the instruction indicating a first source having packed state matrix data elements including at least one set of four state matrix data elements that represent a complete set of four inputs to a G function of a cryptographic hashing algorithm, the cryptographic hashing algorithm using a state matrix having sixteen state matrix data elements and alternating between updating state matrix data elements in columns and diagonals of the state matrix, the instruction also indicating a second source having packed data elements that represent message and constant data; and
storing a result in a destination indicated by the instruction in response to the instruction, the result having packed updated state matrix data elements including at least one set of four updated state matrix data elements, each of the four updated state matrix data elements in the one set representing a corresponding one of the four state matrix data elements in the one set of the first source updated by the G function.

2. The method of claim 1, wherein the cryptographic hashing algorithm is a BLAKE hashing algorithm.

3. The method of claim 1, wherein the G function includes at least four exclusive or (xor) operations, six addition operations, and four rotation operations.

4. The method of claim 1, wherein storing comprises storing the result having the set of the four updated state matrix data elements which represent one of a complete column and a complete diagonal of the state matrix.

5. The method of claim 1, wherein storing comprises storing the result having at least eight updated state matrix data elements which represent one of at least two complete columns and at least two complete diagonals of the state matrix.

6. The method of claim 1, wherein receiving comprises receiving the instruction indicating the first source having all of the sixteen state matrix data elements, and wherein storing comprises storing the result including sixteen updated state matrix data elements each representing a corresponding one of the sixteen state matrix data elements of the first source that has been updated by the G function.

7. The method of claim 1, wherein receiving comprises receiving the instruction indicating all of the sixteen state matrix data elements, and wherein storing comprises storing the result including at least eight updated state matrix data elements each representing a corresponding one of at least eight of the sixteen state matrix data elements of the first source that has been updated by the G function.

8. The method of claim 1, wherein receiving comprises receiving the instruction indicating the second source having data elements that each represent an exclusive or (xor) of message data and constant data.

9. An apparatus comprising:
a plurality of packed data registers; and
an execution unit coupled with the plurality of the packed data registers, the execution unit operable, in response to an instruction indicating a first source having packed state matrix data elements including at least one set of four state matrix data elements that represent a complete set of four inputs to a G function of a cryptographic hashing algorithm, the instruction also indicating a second source having packed data elements that represent message and constant data, the execution unit to store a result in a destination indicated by the instruction, the result having packed updated state matrix data elements including at least one set of four updated state matrix data elements, each of the four updated state matrix data elements in the one set representing a corresponding one of the four state matrix data elements in the one set of the first source that has been updated by the G function,
wherein the cryptographic hashing algorithm is to use a state matrix having sixteen state matrix data elements and is to alternate between updating state matrix data elements in columns and diagonals of the state matrix.

10. The apparatus of claim 9, wherein the cryptographic hashing algorithm is a BLAKE hashing algorithm.

11. The apparatus of claim 9, wherein the G function includes at least four exclusive or (xor) operations, six addition operations, and four rotation operations.

12. The apparatus of claim 9, wherein the execution unit is to store the result having the set of the four updated state matrix data elements which are to represent one of a complete column and a complete diagonal of the state matrix.

13. The apparatus of claim 9, wherein the execution unit is to store the result having at least eight updated state matrix data elements which are to represent one of at least two complete columns and at least two complete diagonals of the state matrix.

14. The apparatus of claim 9, wherein the instruction is to indicate the first source having a plurality of sets of four state matrix data elements, where each set of the four state matrix data elements represents a different complete set of four inputs to a different corresponding instance of the G function, and wherein the execution unit is to store the result including a plurality of sets of four updated state matrix data elements, each set of the four updated state matrix data elements to correspond to a different one of the plurality of sets of the four state matrix data elements of the first source and to include updated state matrix data elements updated by the G function.

15. The apparatus of claim 9, wherein the result is to include four sets of four updated state matrix data elements each.

16. The apparatus of claim 9, wherein the instruction is to indicate the first source having all of the sixteen state matrix data elements, and wherein the execution unit is to store the result including sixteen updated state matrix data elements that each are to represent a corresponding one of the sixteen state matrix data elements of the first source updated by the G function.

17. The apparatus of claim 9, wherein the instruction is to indicate all of the sixteen state matrix data elements, and wherein the execution unit is to store the result including at least eight updated state matrix data elements that each are to represent a corresponding one of eight of the sixteen state matrix data elements of the first source updated by the G function.

18. A system comprising:
an interconnect;
a processor coupled with the interconnect, the processor to receive an instruction indicating a first source having packed state matrix data elements including at least one set of four state matrix data elements that represent a complete set of four inputs to a G function of a BLAKE secure hashing algorithm, the instruction also indicating a second source having packed data elements that represent message and constant data, the processor operable, in response to the instruction, to store a result in a destination indicated by the instruction, the result having packed updated state matrix data elements including at least one set of four updated state matrix data elements, each of the four updated state matrix data elements in the one set representing a corresponding one of the four state matrix data elements in the one set of the first source that has been updated by the G function; and
a dynamic random access memory (DRAM) coupled with the interconnect.

19. The system of claim 18, wherein the processor is to store the result having at least eight updated state matrix data elements which are to represent one of at least two complete columns and at least two complete diagonals of the state matrix.

20. The system of claim 18, wherein the instruction is to indicate all of the sixteen state matrix data elements, and wherein the processor is to store the result including at least eight updated state matrix data elements that each are to represent a corresponding one of at least eight of the sixteen state matrix data elements of the first source updated by the G function.

21. The method of claim 1, wherein the instruction comprises a column step instruction, and further comprising executing a subsequent diagonal step instruction that indicates the destination of the column step instruction as a source, and wherein no intervening instructions between the column step instruction and the subsequent diagonal step instruction rearrange an order of the packed updated state matrix data elements in the result of the column step instruction prior to the diagonal step instruction accessing them.

22. The method of claim 1, wherein the instruction comprises a diagonal step instruction, and further comprising executing a subsequent column step instruction that indicates the destination of the diagonal step instruction as a source, and wherein no intervening instructions between the diagonal step instruction and the column step instruction rearrange an order of the packed updated state matrix data elements in the result of the diagonal step instruction prior to the column step instruction accessing them.

* * * * *